(12) United States Patent
Mizuno et al.

(10) Patent No.: US 7,903,313 B2
(45) Date of Patent: Mar. 8, 2011

(54) MICRO MOVABLE ELEMENT

(75) Inventors: Yoshihiro Mizuno, Kawasaki (JP); Norinao Kouma, Kawasaki (JP); Hisao Okuda, Kawasaki (JP); Hiromitsu Soneda, Kawasaki (JP); Tsuyoshi Matsumoto, Kawasaki (JP); Osamu Tsuboi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 246 days.

(21) Appl. No.: 12/397,462

(22) Filed: Mar. 4, 2009

(65) Prior Publication Data

US 2009/0225387 A1 Sep. 10, 2009

(30) Foreign Application Priority Data

Mar. 4, 2008 (JP) ................... 2008-053054

(51) Int. Cl.
*G02B 26/08* (2006.01)
(52) U.S. Cl. .................................... 359/221.2
(58) Field of Classification Search ............... 359/221.2, 359/223.1–226.2; 257/704
See application file for complete search history.

(56) References Cited

U.S. PATENT DOCUMENTS

| 2006/0119216 | A1 | 6/2006 | Kouma et al. |
| 2008/0042260 | A1* | 2/2008 | Jeong et al. ................... 257/704 |
| 2008/0205021 | A1 | 8/2008 | Mizuno et al. |
| 2009/0001487 | A1 | 1/2009 | Mizuno et al. |

FOREIGN PATENT DOCUMENTS

| JP | 2003-019700 A | 1/2003 |
| JP | 2004-341364 A | 12/2004 |
| JP | 2006-072252 A | 3/2006 |
| JP | 2006-162663 A | 6/2006 |
| JP | 2007-286037 | 11/2007 |
| JP | 2008-207311 A | 9/2008 |
| JP | 2009-016383 A | 1/2009 |

OTHER PUBLICATIONS

U.S. Appl. No. 12/249,677, filed Oct. 10, 2008; Corresponds to JP2007-286037, Foreign Patent No. 3.

* cited by examiner

*Primary Examiner* — Euncha P Cherry
(74) *Attorney, Agent, or Firm* — Westerman, Hattori, Daniels & Adrian, LLP

(57) ABSTRACT

A micro movable element including a movable portion; first and second driving electrodes; first and second conductor portions electrically connected to the first and second driving electrodes, respectively; an intermediate insulating portion disposed between the first conductor portion and the second conductor portion; and a partly laminated structure portion including the first conductor portion, the intermediate insulating portion and the second conductor portion, wherein the first conductor portion has an opposed face making contact with the intermediate insulating portion, a side face adjacent to the opposed face and an edge portion forming the boundary between the opposed face and the side face, part of the edge portion opposed to the second conductor portion is covered with an insulating film, and parts of the first and second driving electrodes are not covered with an insulating film.

13 Claims, 56 Drawing Sheets

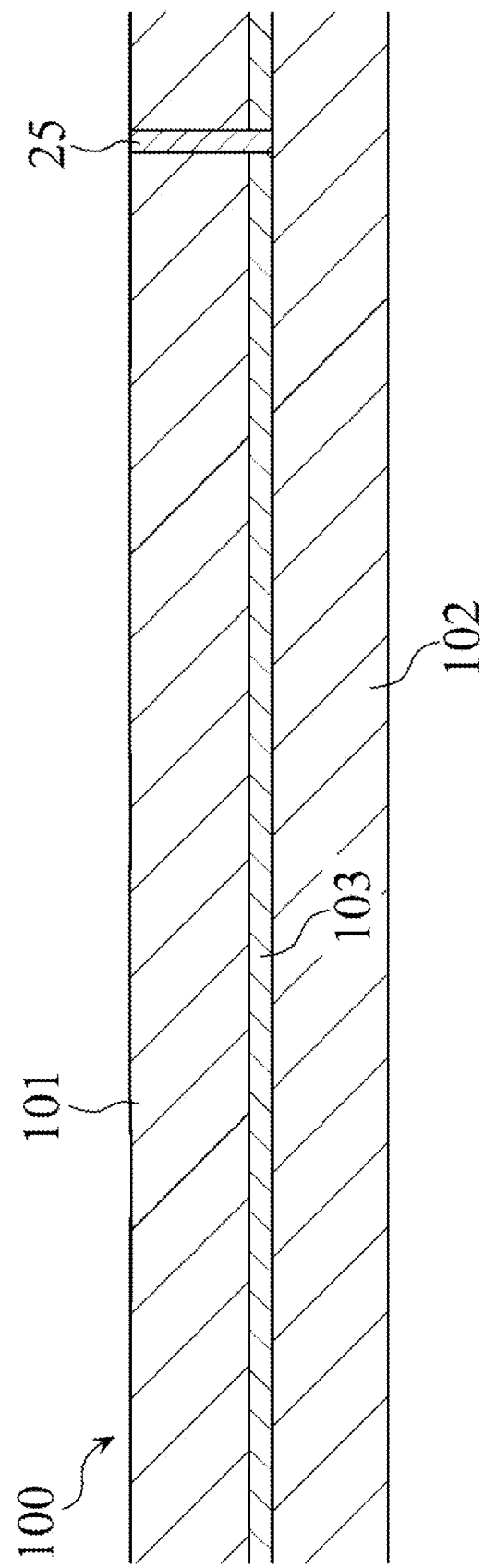

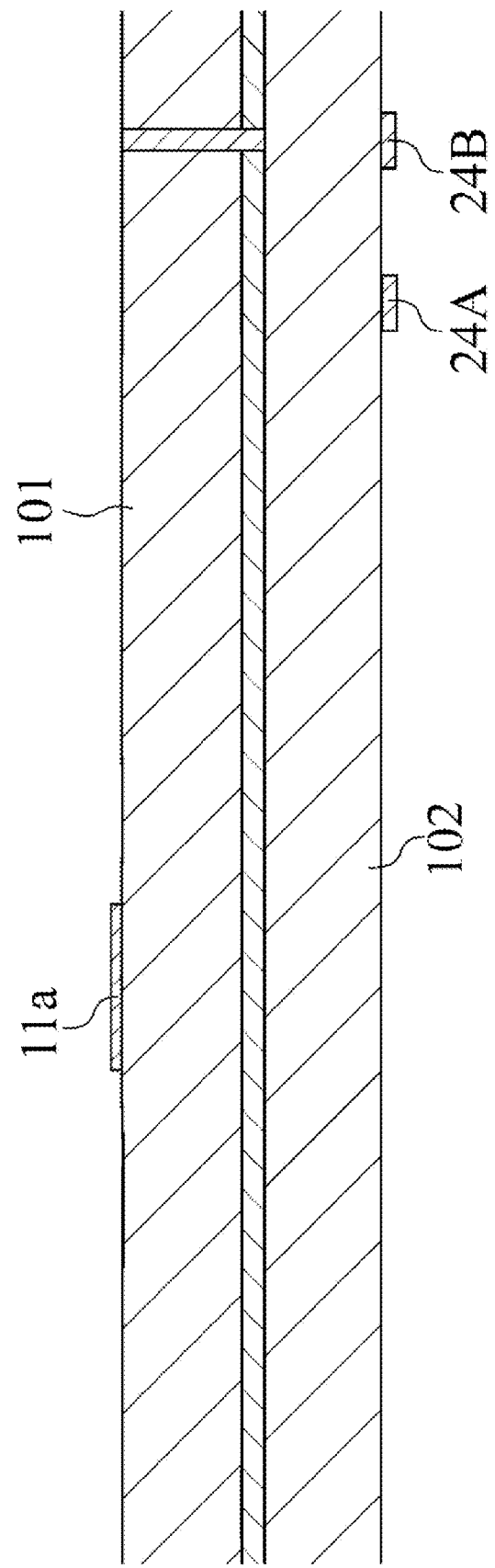

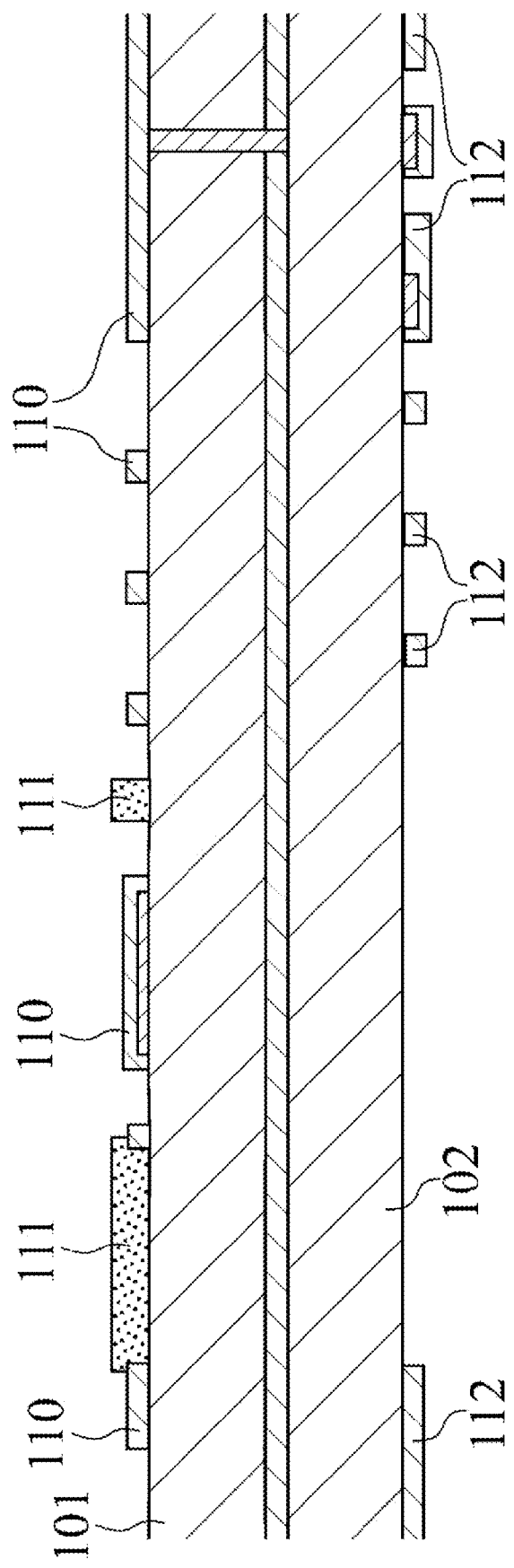

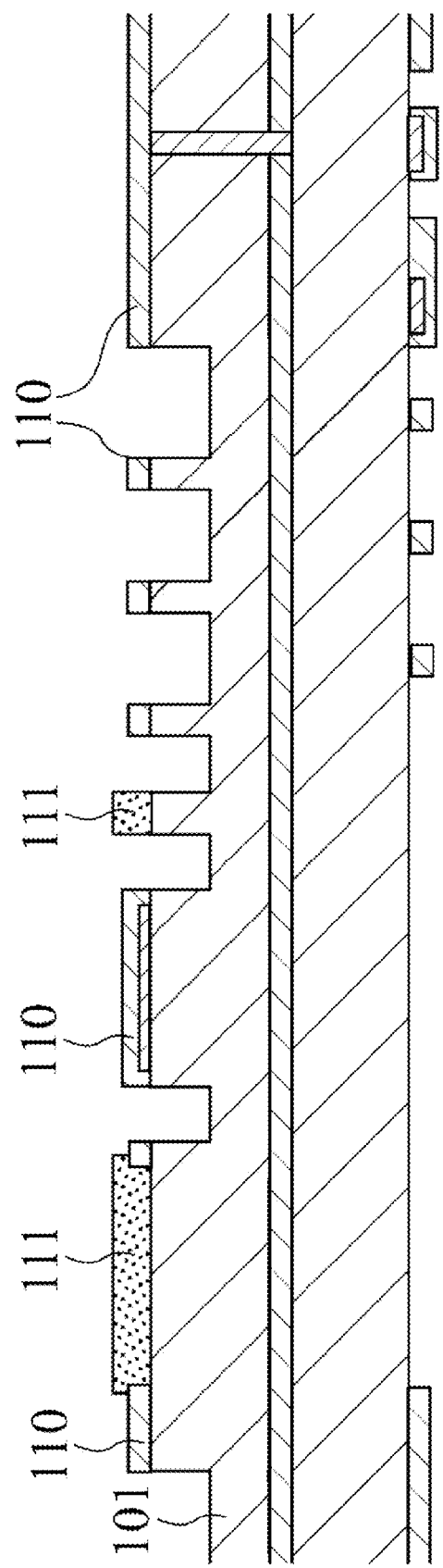

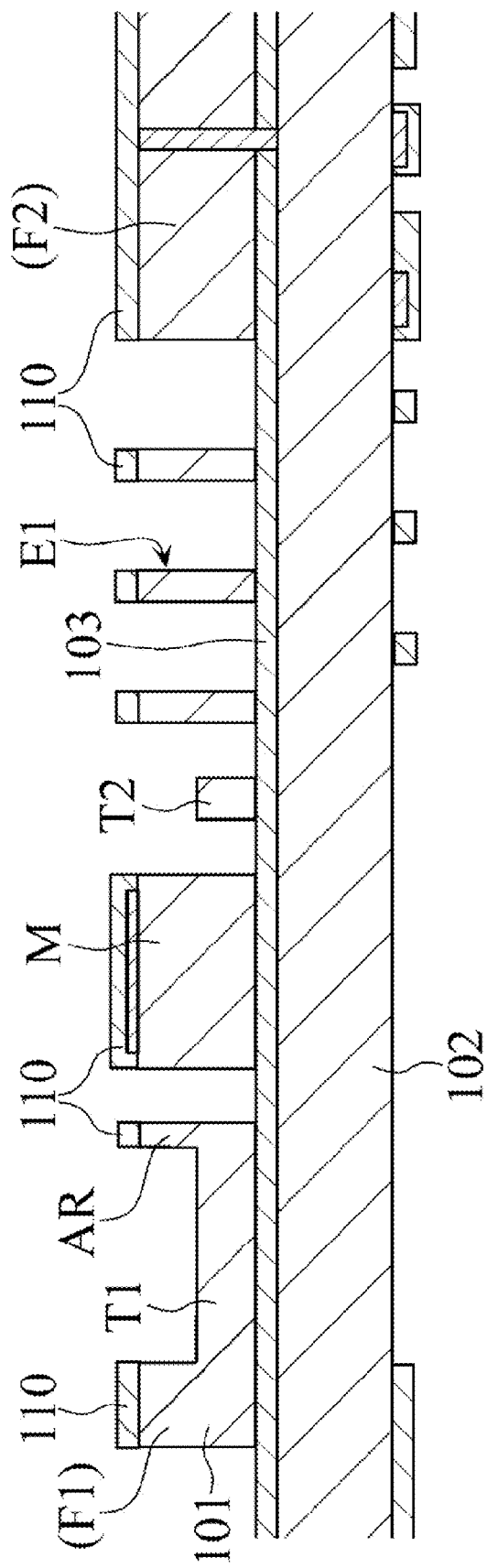

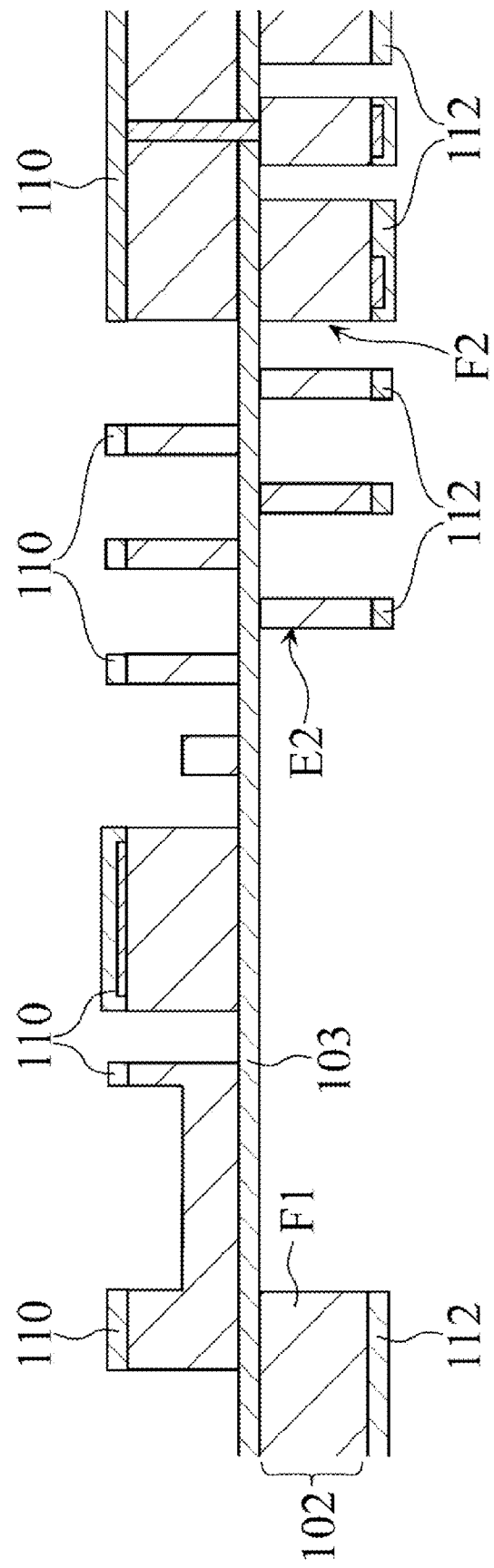

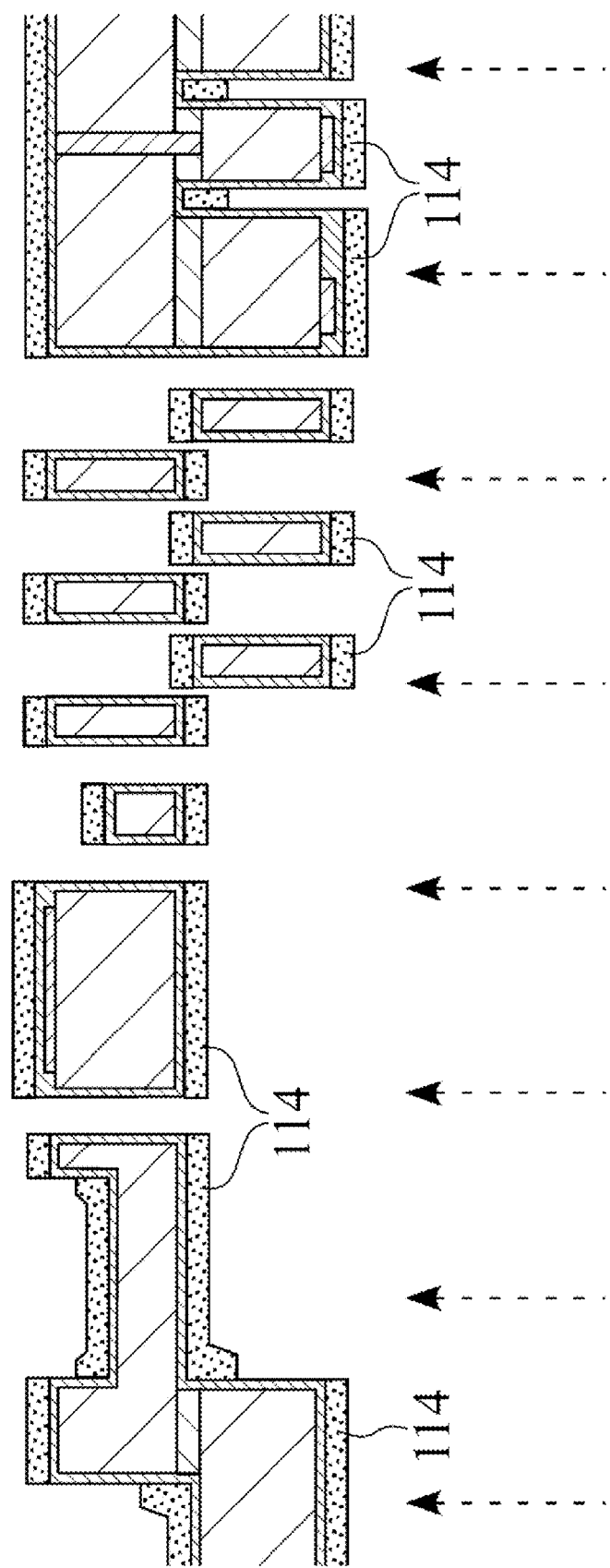

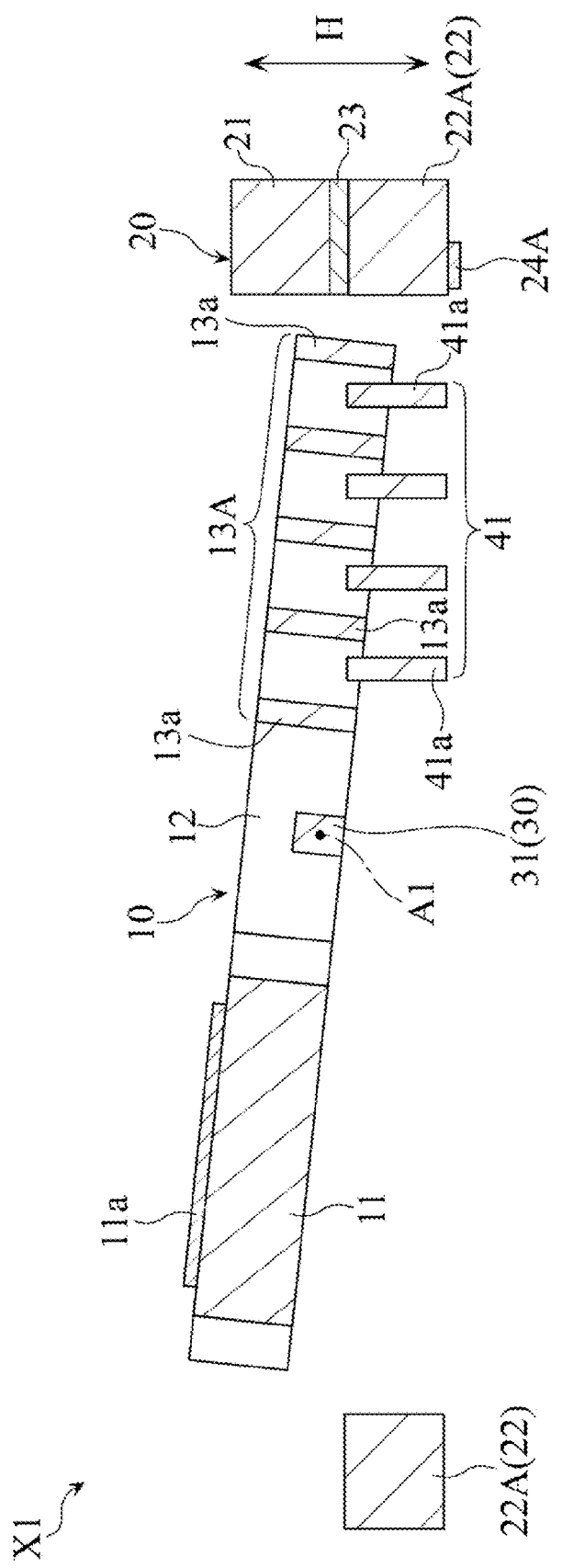

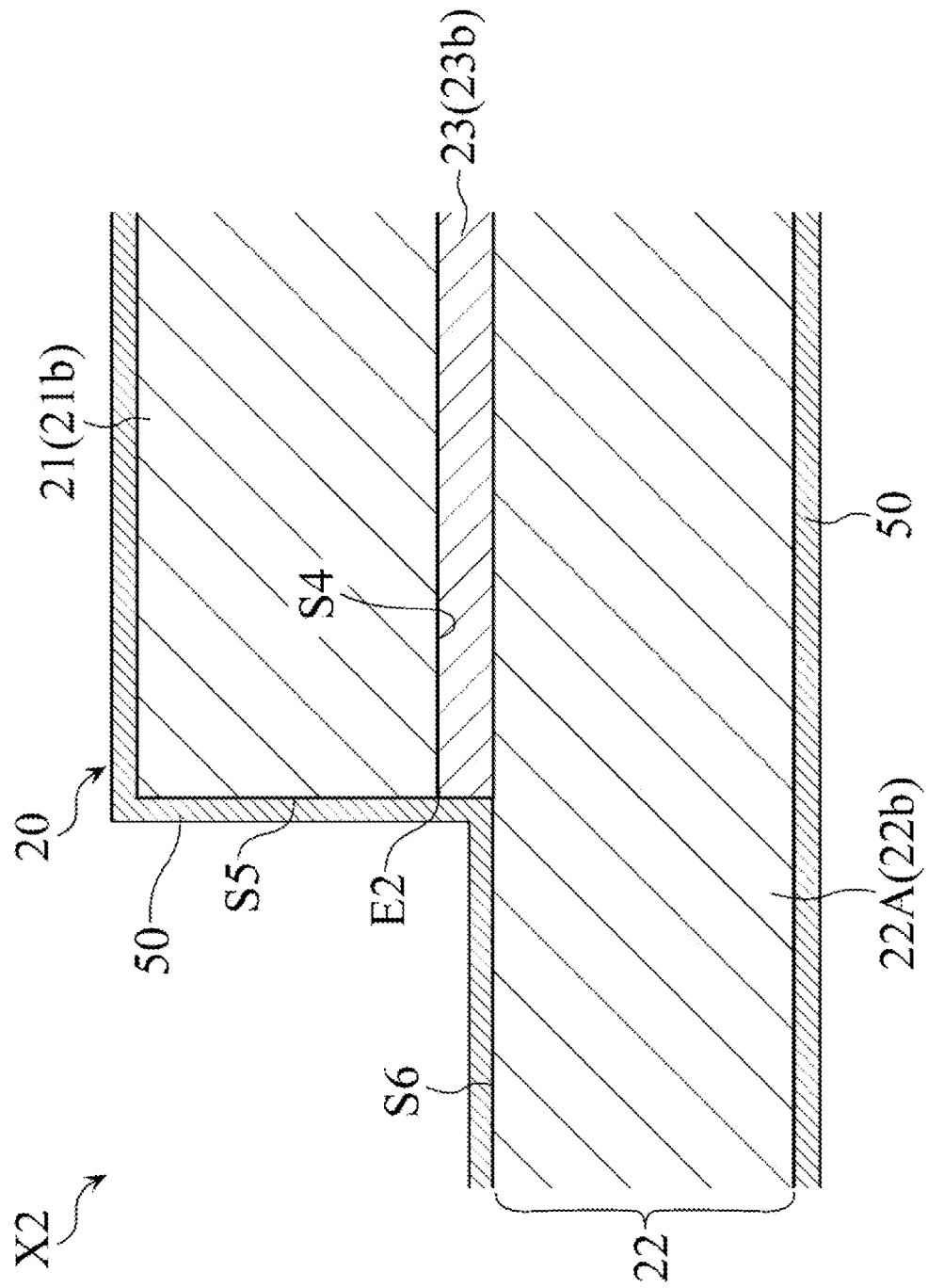

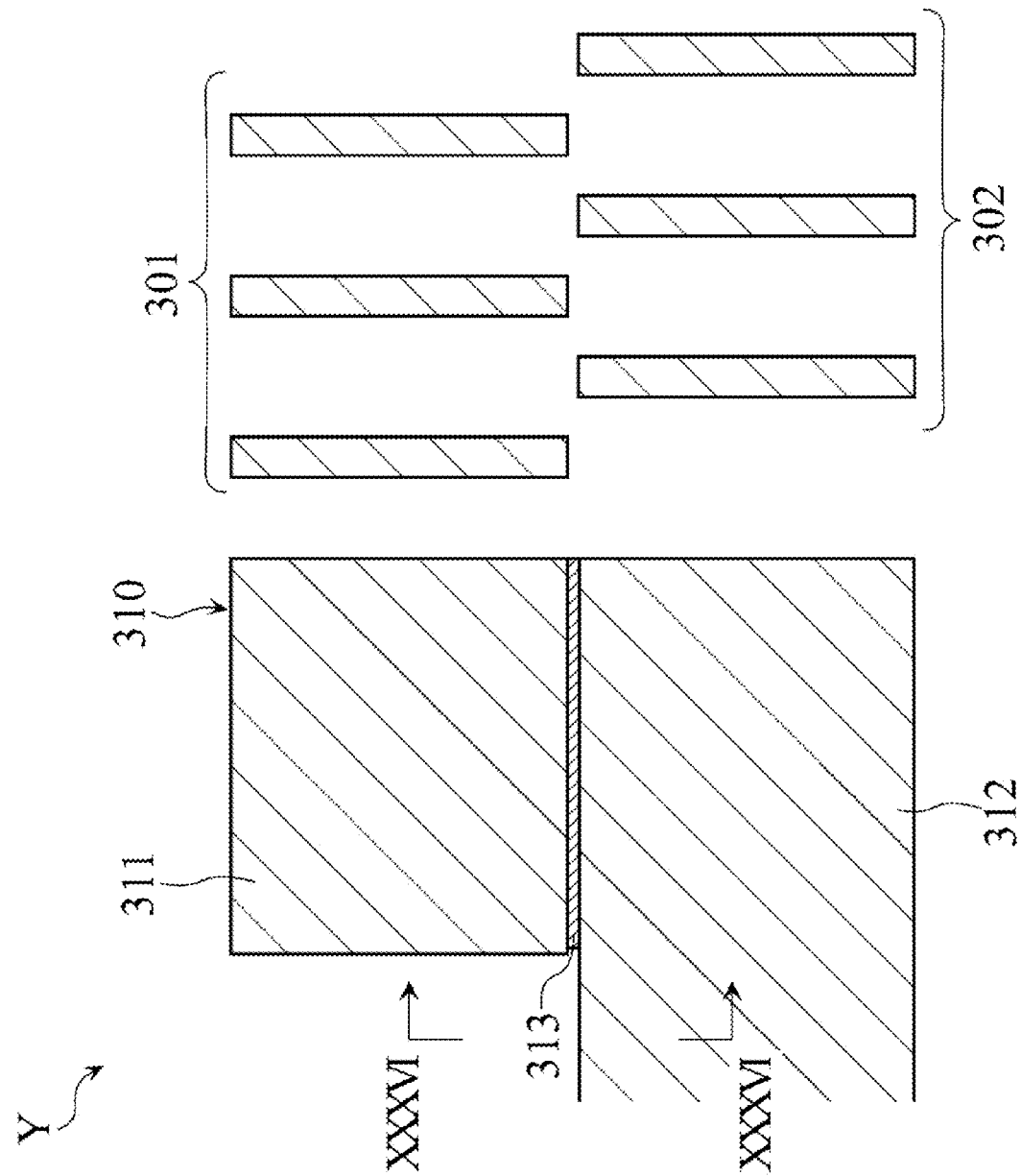

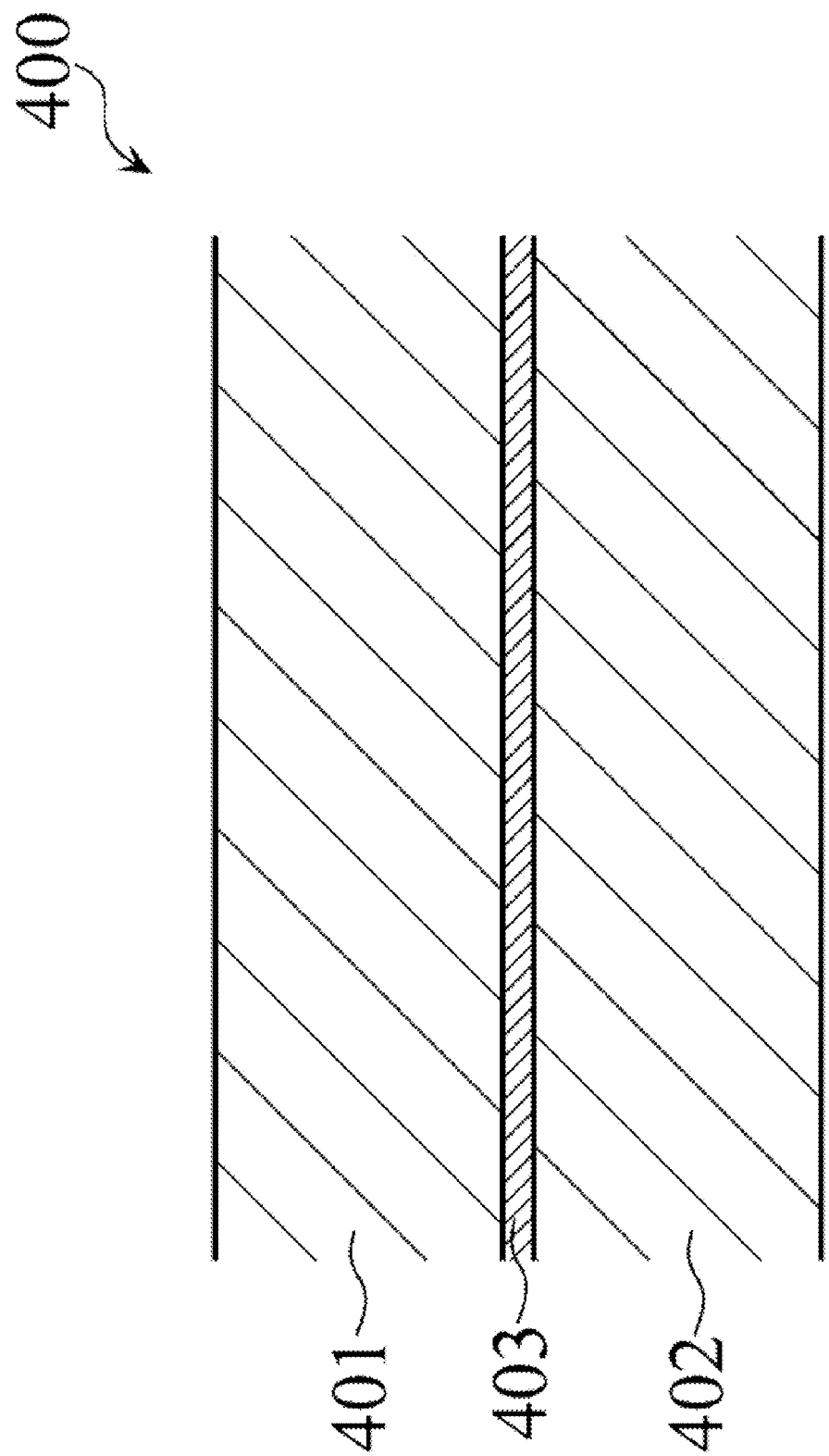

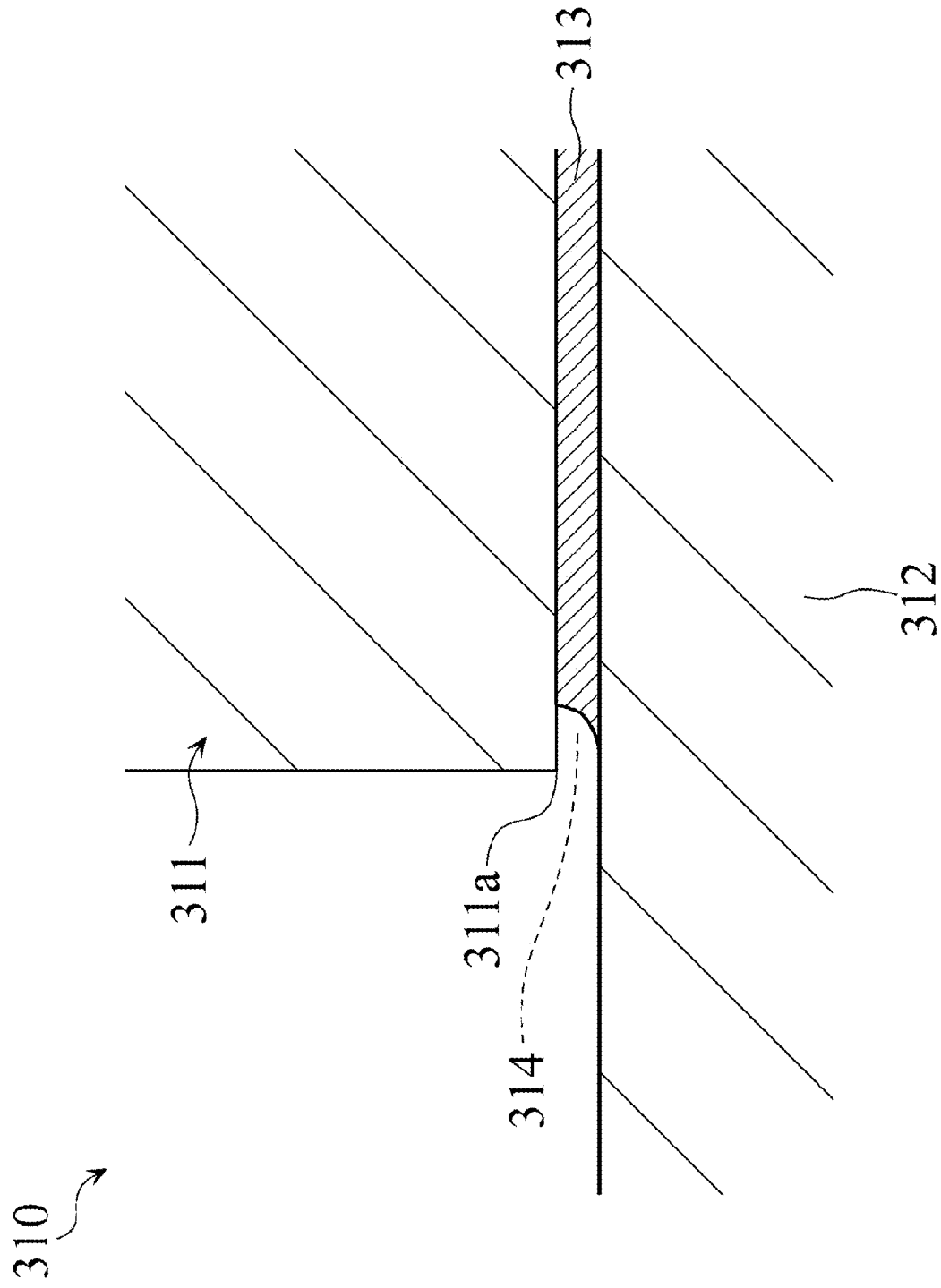

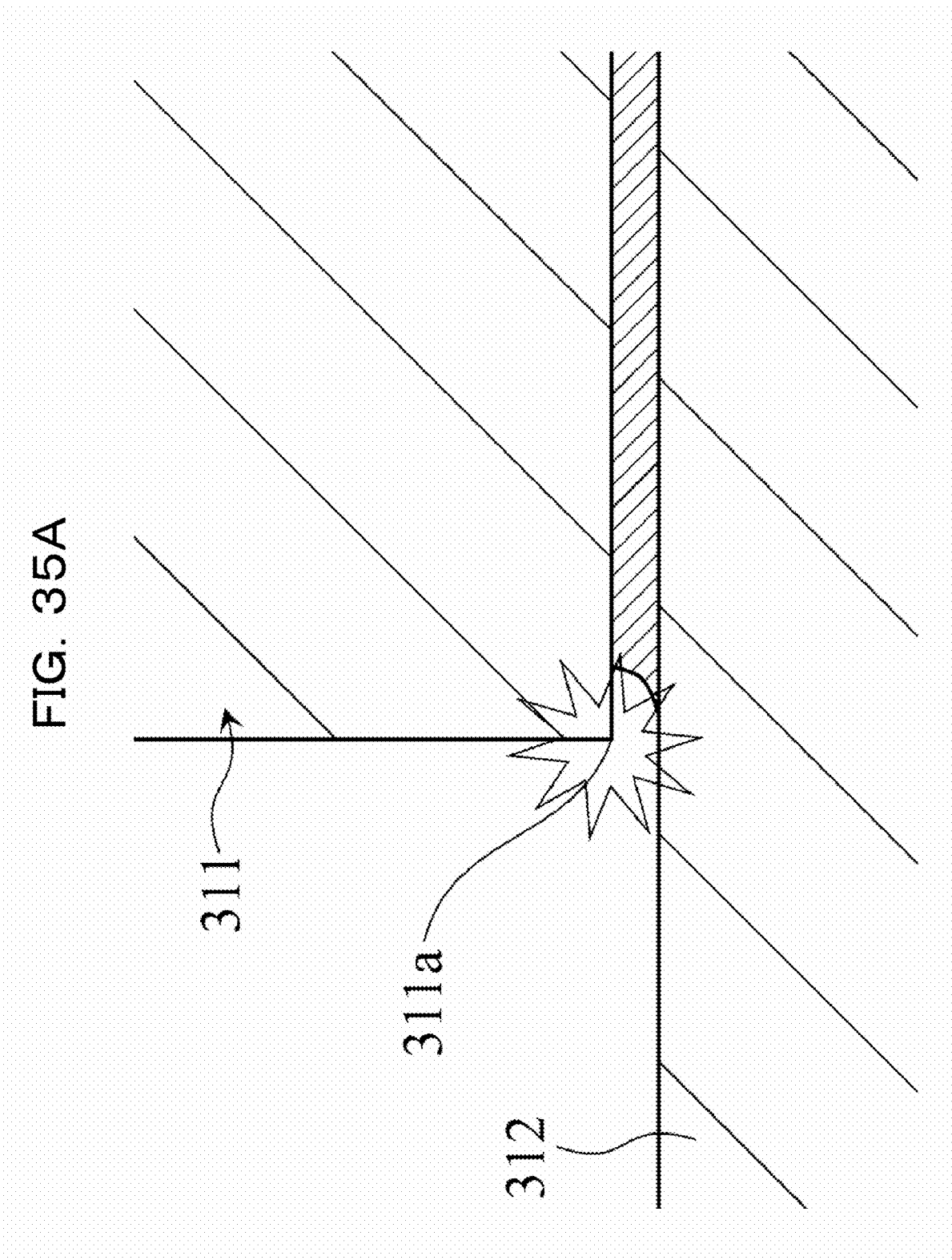

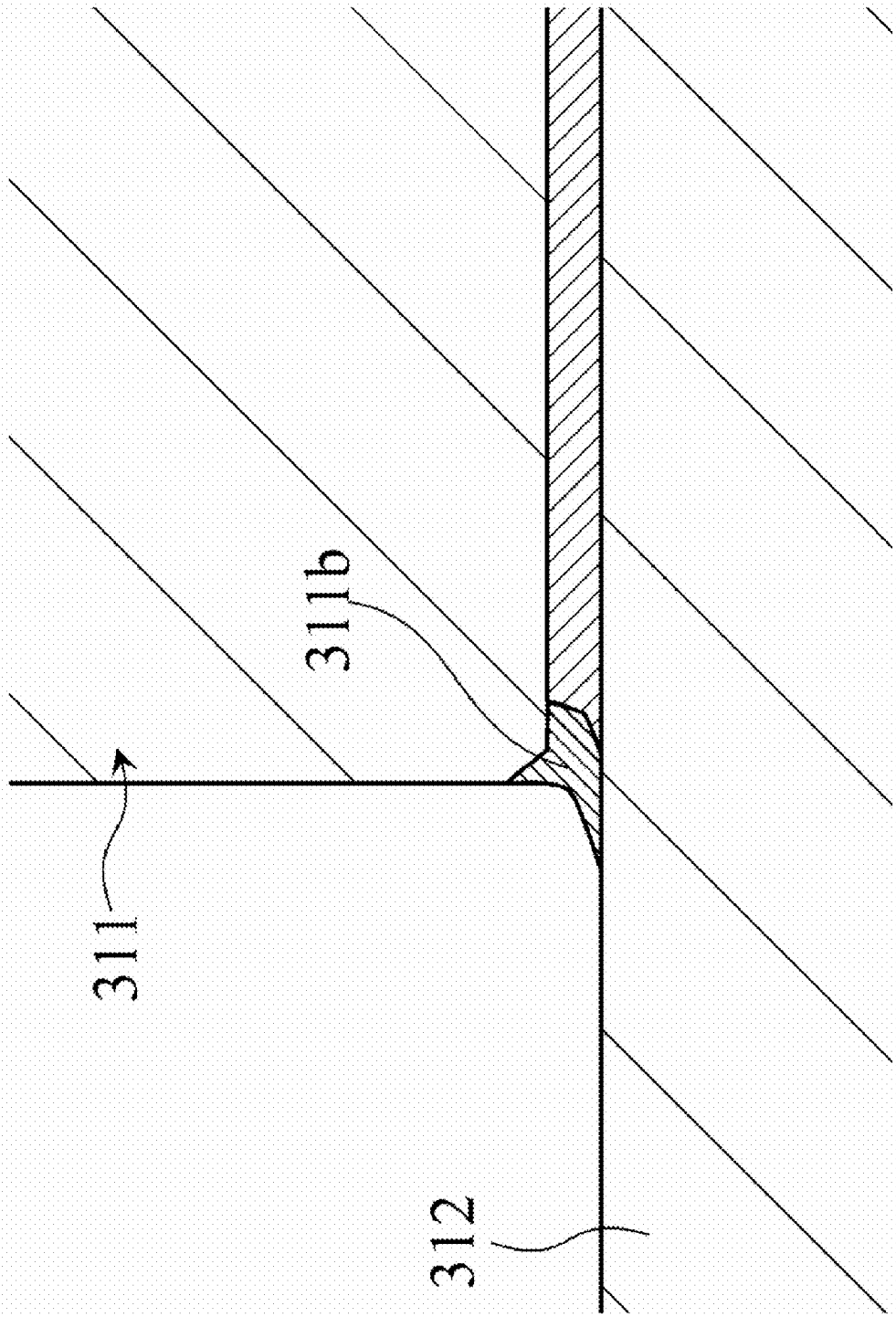

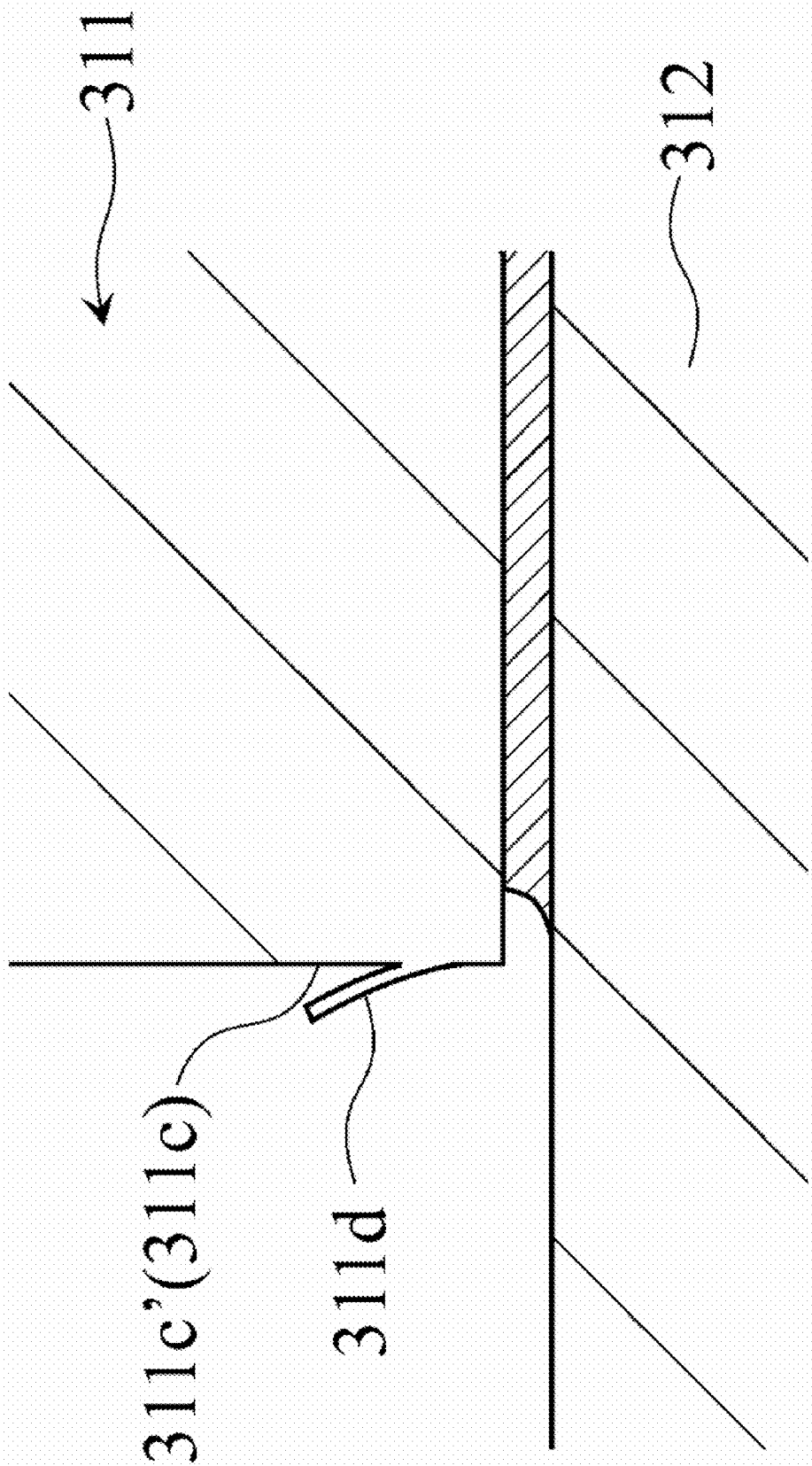

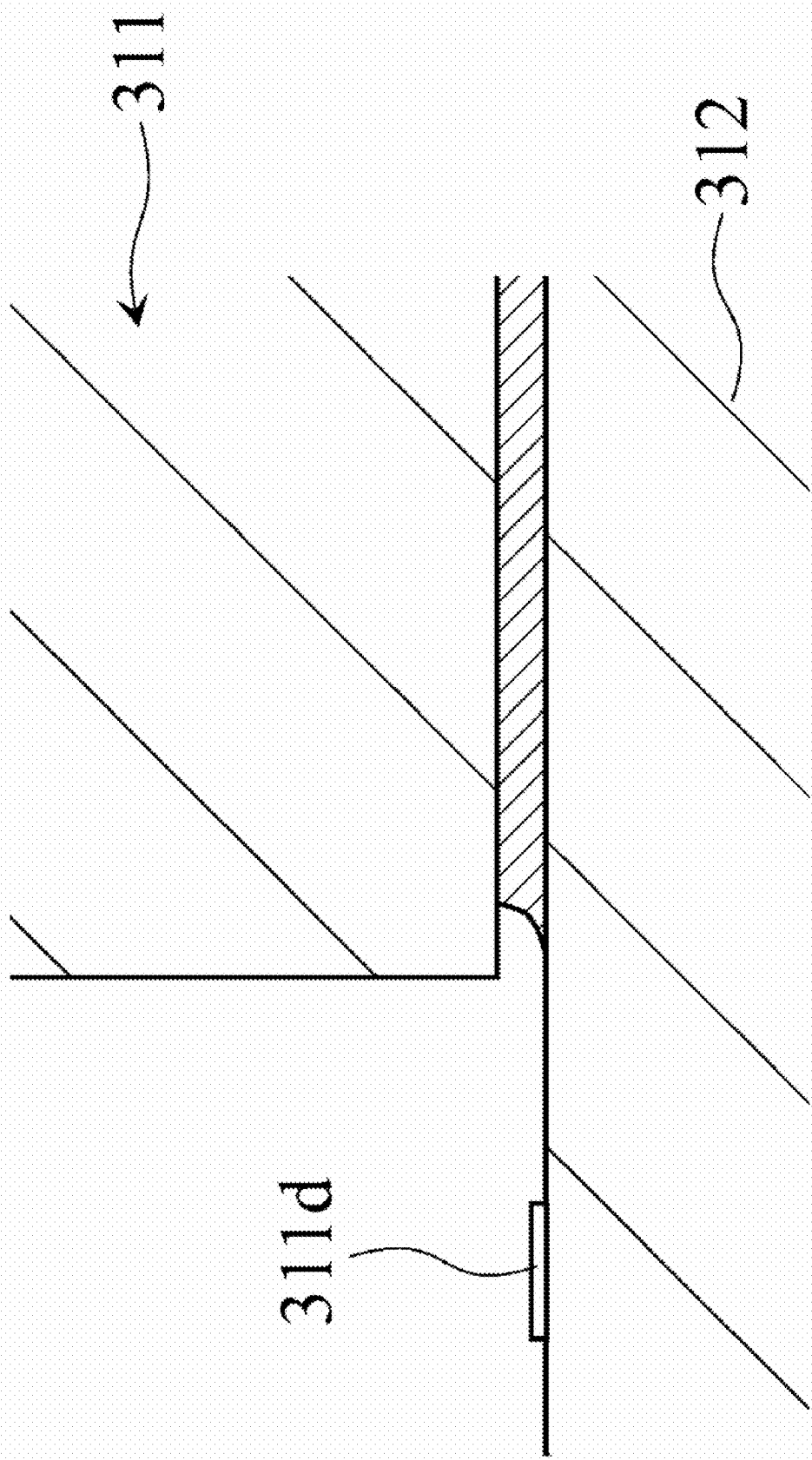

MICRO MOVABLE ELEMENT

CROSS-REFERENCE TO RELATED APPLICATIONS

This application is based upon and claims the benefit of priority of the prior Japanese Patent Application No. 2008-53054, filed on Mar. 4, 2008, the entire contents of which are incorporated herein by reference.

FIELD

The present embodiment relates to a micro movable element produced using the micromachining technology.

BACKGROUND

In recent years, micro structures produced using the micromachining technology are attracting attention in various technical fields, and the application of elements having micro structures is being promoted. Such a micro structure includes a micro movable element having a minute movable or vibrating portion and is configured as a micromirror element, an acceleration sensor, an angular velocity sensor or the like. The micromirror element is used as an element having an optical reflection function in the fields of optical disc technology and optical communication technology, for example. The acceleration sensor and the angular velocity sensor are used for the attitude control in robots and vehicles and for image stabilization in cameras, for example. JP-A-2003-19700, JP-A-2004-341364 and JP-A-2006-72252 disclose these micromirror elements.

SUMMARY

A micro movable element according to the present embodiment includes a movable portion; a first driving electrode for driving the movable portion; a second driving electrode for driving the movable portion; a first conductor portion electrically connected to the first driving electrode; a second conductor portion electrically connected to the second driving electrode; an intermediate insulating portion disposed between the first conductor portion and the second conductor portion; and a partly laminated structure portion having the first conductor portion, the intermediate insulating portion and the second conductor portion, wherein the first conductor portion has an opposed face making contact with the intermediate insulating portion, a side face adjacent to the opposed face and an edge portion forming the boundary between the opposed face and the side face, at least part of the edge portion opposed to the second conductor portion is covered with an insulating film, and at least parts of the first and second driving electrodes are not covered with an insulating film.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIGS. 8A to 8D illustrate some steps in a method for producing the micro movable element according to the first embodiment;

FIGS. 9A to 9D illustrate steps subsequent to those illustrated in FIGS. 8A to 8D;

FIGS. 10A to 10C illustrate steps subsequent to those illustrated in FIGS. 9A to 9D;

FIG. 12 is a sectional view taken on line III-III of FIG. 1 at the time of driving;

FIG. 16 is yet still another sectional view of the micro movable element according to the second embodiment;

FIG. 31 is a fragmentary sectional view of a conventional micro movable element;

FIGS. 32A to 32D illustrate some steps in a method for producing the conventional micro movable element illustrated in FIG. 31;

FIG. 33 is a fragmentary enlarged view of FIG. 31;

FIGS. 35A and 35B illustrate problems that may occur owing to discharge in the conventional micro movable element illustrated in FIG. 31;

FIGS. 38A to 38C illustrate problems that may occur owing to a silicon fraction in the conventional micro movable element illustrated in FIG. 31.

DESCRIPTION OF EMBODIMENTS

Comparison Example 1

Figure 1:
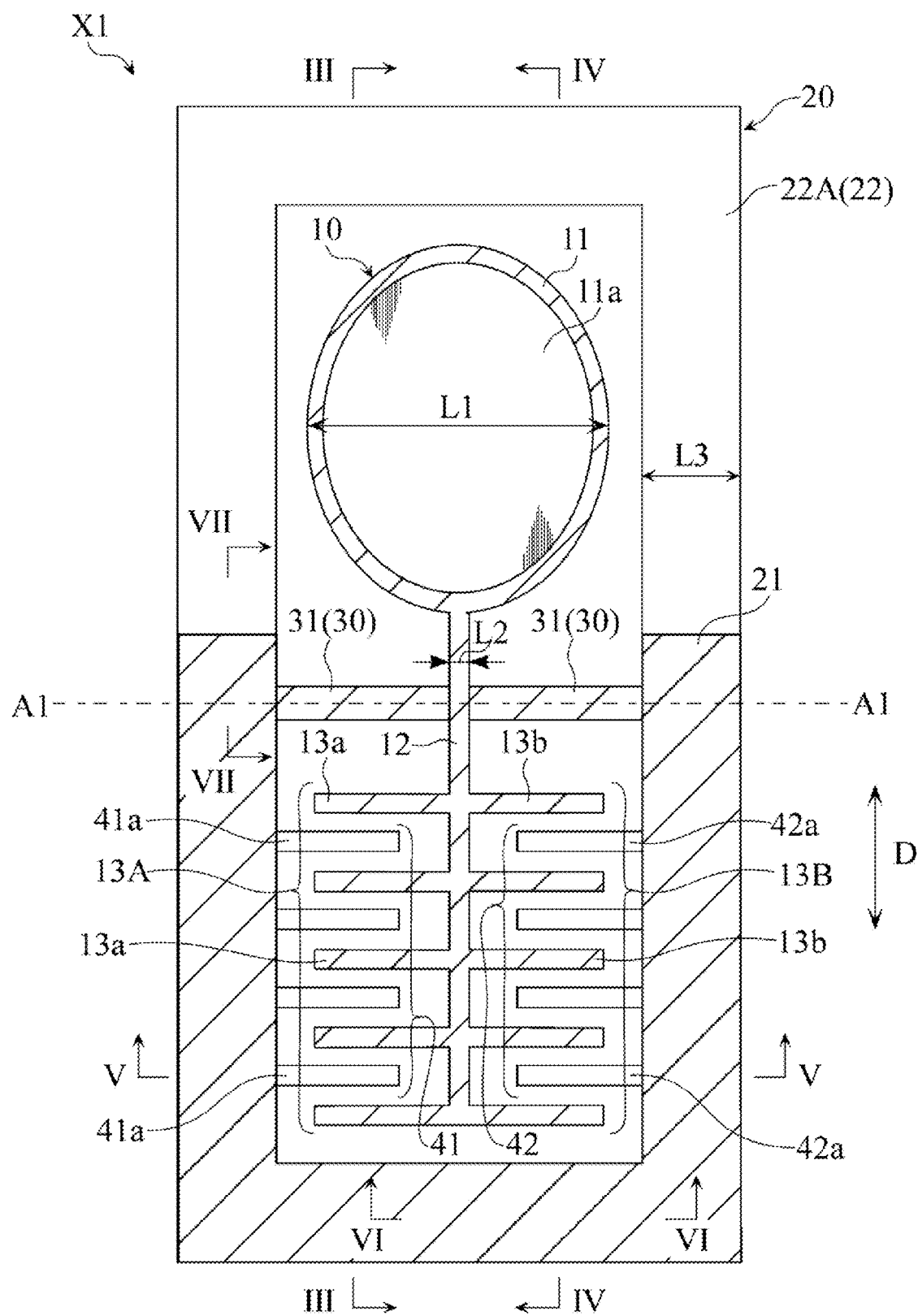
FIG. 1 is a plan view of a micro movable element according to a first embodiment.

FIG. 31 is a fragmentary sectional view of a micro movable element Y. The micro movable element Y is, for example, a micromirror element, an acceleration sensor or an angular velocity sensor, equipped with a movable portion (not illustrated) and driving electrodes 301 and 302 for generating a driving force (electrostatic attractive force) for driving the movable portion. In addition, the micro movable element Y partly includes a partly laminated structure portion 310 having a conductor portion 311, a conductor portion 312 and an intermediate insulating portion 313. The conductor portions 311 and 312 constitute part of an electrically-conducting path in the micro movable element Y having functions. The conductor portion 311 is electrically connected to the driving electrode 301, and the conductor portion 312 is electrically connected to the driving electrode 302. Different potentials are applied to the respective conductor portions 311 and 312 when the element is driven (when a voltage is applied across the driving electrodes 301 and 302). In other words, when the element is driven, a significant potential difference is generated between the conductor portions 311 and 312 of the micro movable element Y.

Figure 32B:
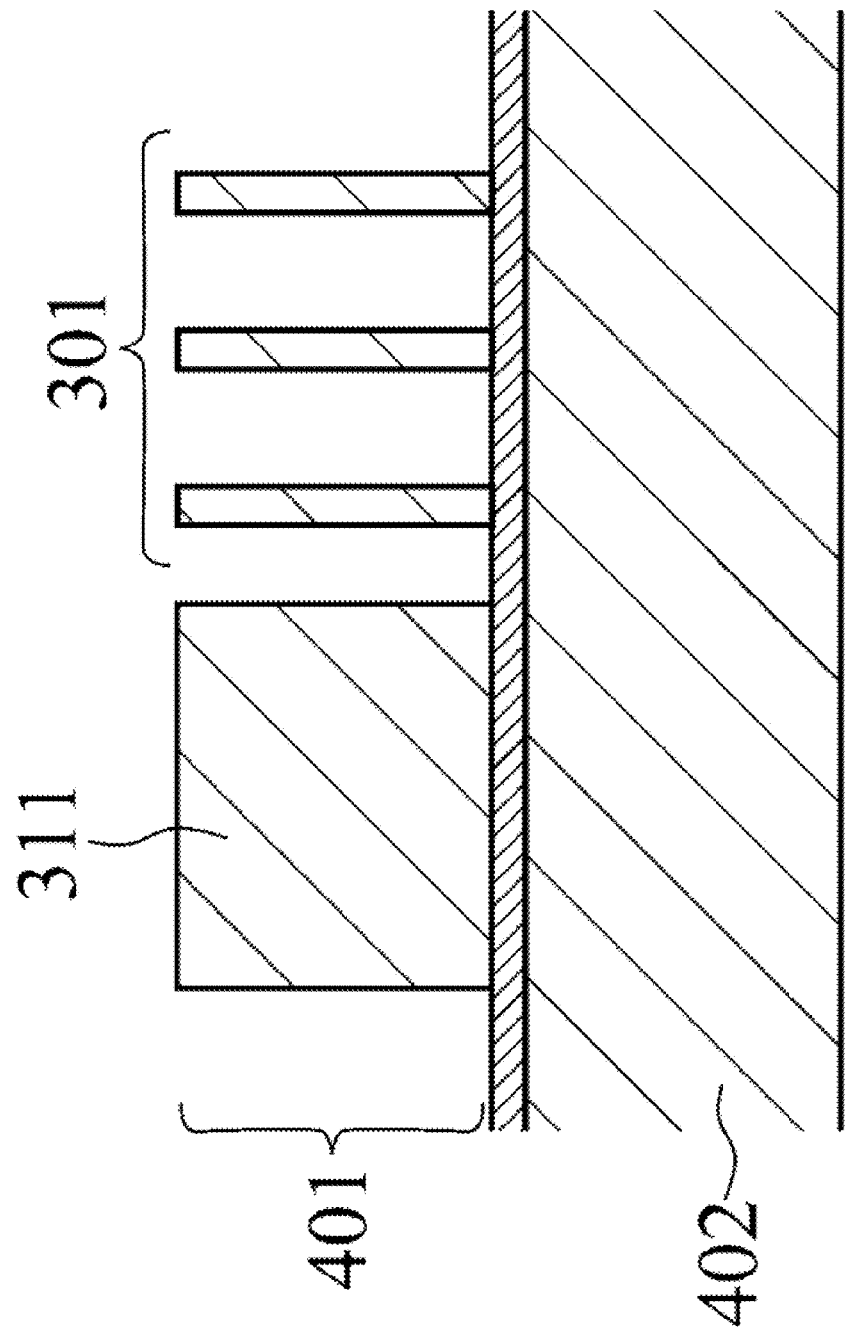

FIGS. 32A to 32D illustrate some steps in a method for producing the micro movable element Y with changes in the fragmentary cross-sections of the portions corresponding to those illustrated in FIG. 31. In the production of the micro movable element Y, such a material substrate 400 as illustrated in FIG. 32A is first prepared. The material substrate 400 is an SOI (silicon-on-insulator) wafer having a laminated structure including silicon layers 401 and 402 and an intermediate insulating layer 403 disposed between the silicon layers 401 and 402. The silicon layers 401 and 402 are made of a silicon material to which electrical conductivity is imparted by impurity doping. The intermediate insulating layer 403 is made of silicon oxide. The thickness of the silicon layer 401 is, for example, 50 to 100 μm, the thickness of the silicon layer 402 is, for example, 100 to 600 μm, and the thickness of the intermediate insulating layer 403 is, for example, 0.3 to 7 μm.

Next, as illustrated in FIG. 32B, the silicon layer 401 is etched, and portions (including the driving electrode 301 and the conductor portion 311) to be formed in the silicon layer 401 are formed. More specifically, after a resist pattern (not illustrated) is formed on the silicon layer 401, the silicon layer 401 is subjected to anisotropic etching according to the DRIE method while the resist pattern is used as a mask. In the DRIE method, highly anisotropic etching may be carried out in the Bosch process in which the etching performed using SF6 gas and the side wall protection performed using C4F8 gas are carried out alternately.

Figure 32C:
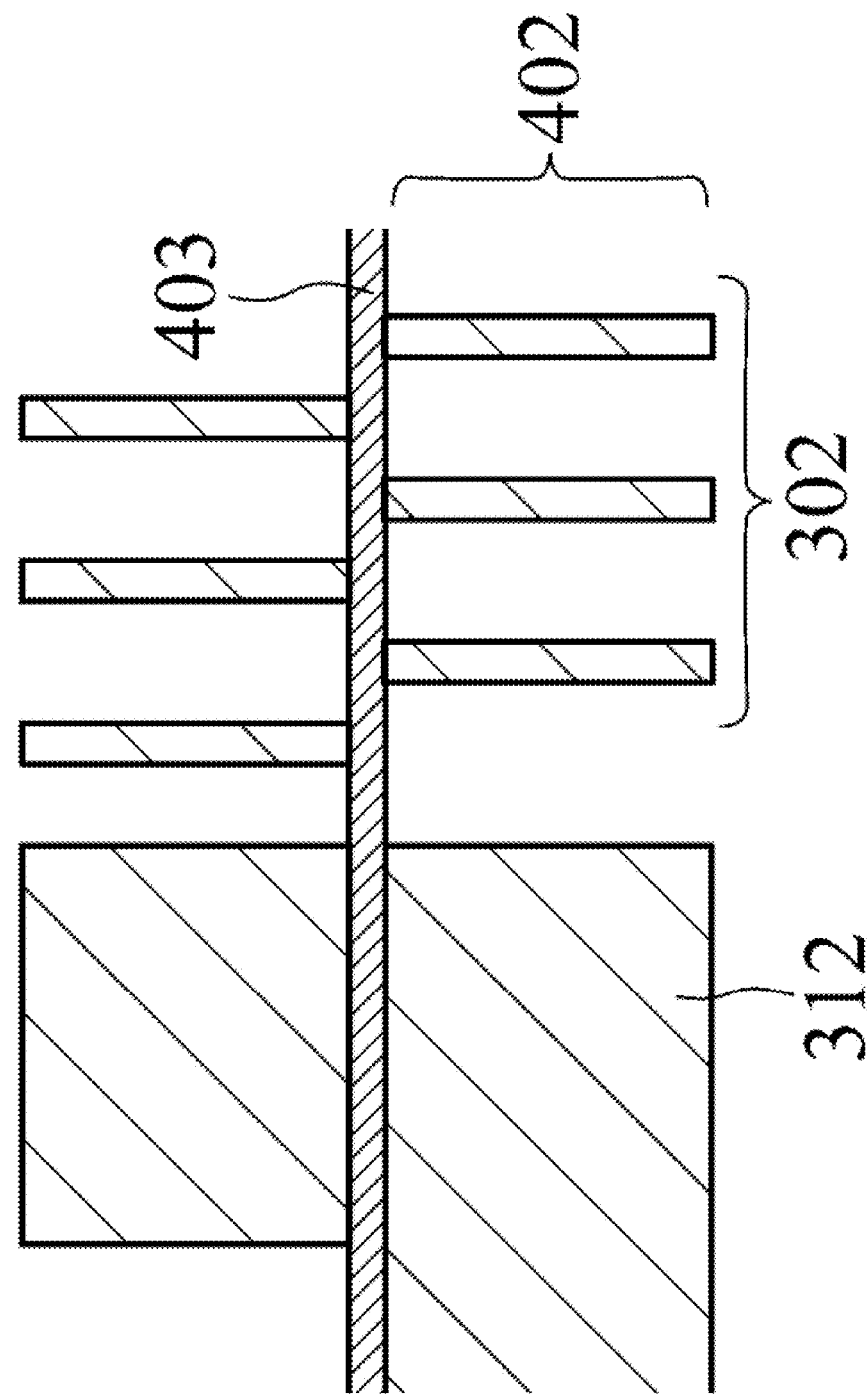

Next, as illustrated in FIG. 32C, the silicon layer 402 is etched, and portions (including the driving electrode 302 and the conductor portion 312) to be formed in the silicon layer are formed. More specifically, after a resist pattern (not illustrated) is formed on the silicon layer 402, the silicon layer 402 is subjected to anisotropic etching according to the DRIE method while the resist pattern is used as a mask.

Figure 32D:
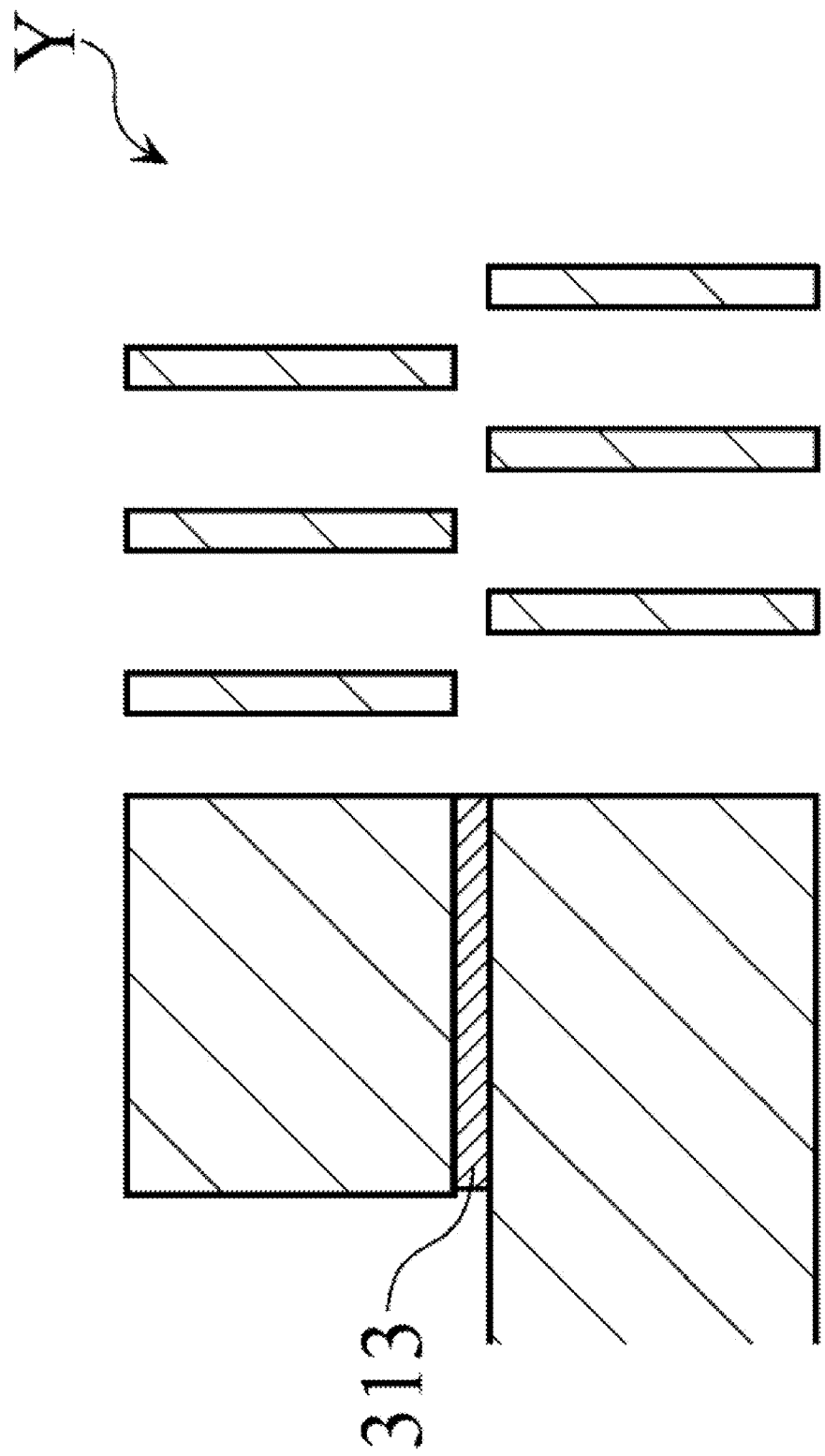

Next, after the resist patterns (not illustrated) on the silicon layers 401 and 402 are removed as necessary, the intermediate insulating layer 403 is subjected to anisotropic etching using the wet etching method as illustrated in FIG. 32D to form the intermediate insulating portion 313. For example, buffered hydrofluoric acid (BHF) containing hydrofluoric acid and ammonium fluoride may be used as an etching solution in this step. The micro movable element Y having the partial structure illustrated in FIG. 31 is produced using the method including the steps described above.

Figure 34:
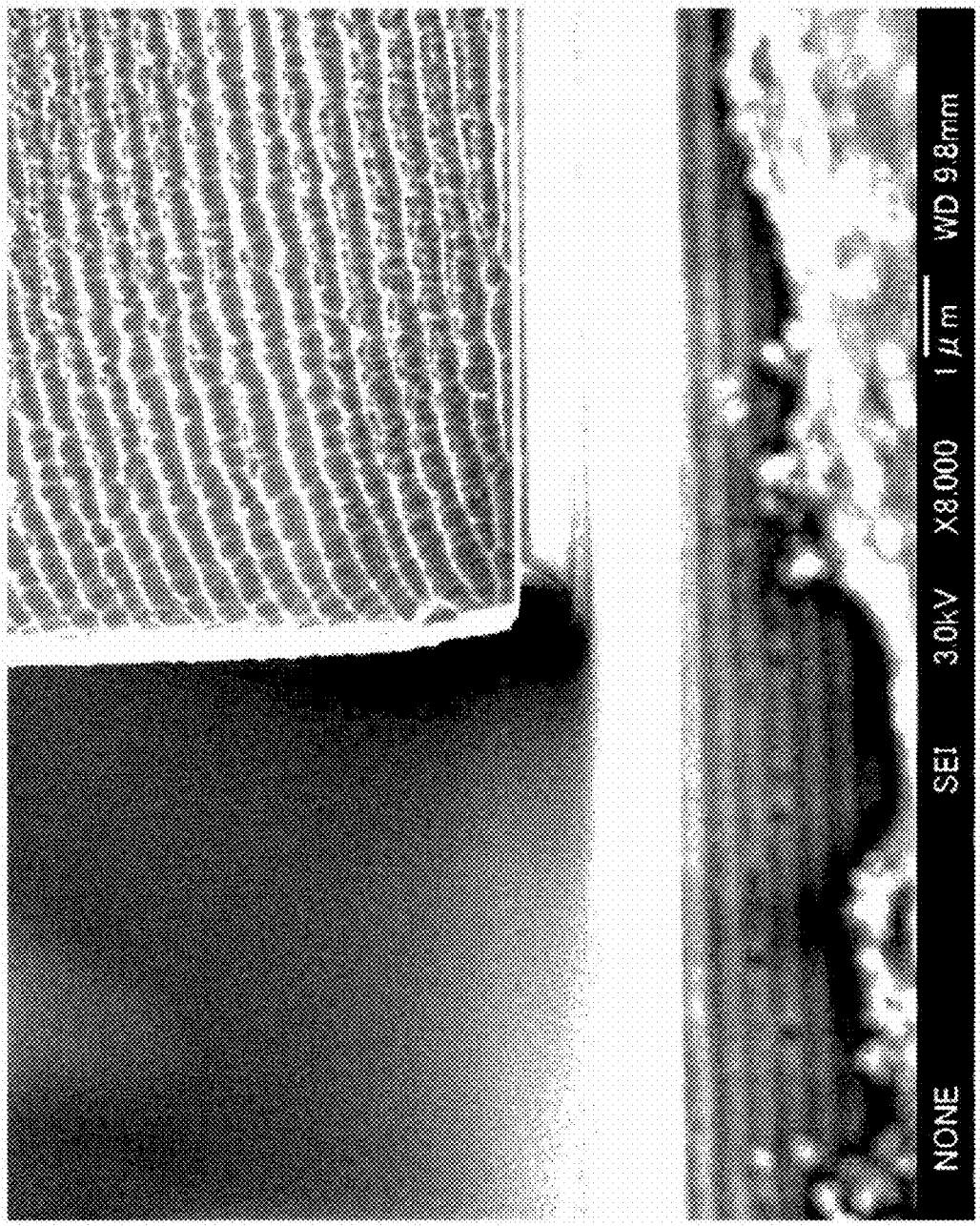
FIG. 34 is a scanning electron micrograph illustrating part of the conventional micro movable element.

FIG. 33 is an enlarged fragmentary view of FIG. 31. FIG. 34 is a local SEM photograph of a micro movable element produced using the method illustrated in FIG. 32 and illustrates the shape of the side face of the partly laminated structure portion 310 illustrated in FIG. 31. As illustrated in FIG. 33 and also illustrated in FIG. 34 corresponding to FIG. 33, the conductor portion 311 has an edge portion 311a that is relatively sharp and exposed. The edge portion 311a is exposed since the intermediate insulating layer 403 being exposed is removed by etching and the intermediate insulating layer 403 disposed between the conductor portions 311 and 312 is partially eroded (in other words, a so-called undercut 314 is formed) in the wet etching step described above referring to FIG. 32D.

When the micro movable element Y having functions is driven, a voltage is applied across the driving electrodes 301 and 302. Hence, a potential difference may be generated between the conductor portion 311 electrically connected to the driving electrode 301 and the conductor portion 312 electrically connected to the driving electrode 302. If the potential difference is generated between the conductor portions 311 and 312, unintended discharge may occur occasionally between the conductor portion 312 extending close to the conductor portion 311 and the exposed edge portion 311a of the conductor portion 311 as illustrated in FIG. 35A. This discharge is more likely to occur as the edge portion 311a is shaper. If this discharge occurs, the edge portion 311a is eluted by the heat generated at the time of the discharge, whereby an electrically-conducting path 311b is formed frequently as illustrated in FIG. 35B. In the state in which the electrically-conducting path 311b is formed, the so-called current leakage occurs, that is, current flows through the electrically-conducting path 311b in the case that a potential difference is generated between the conductor portions 311 and 312 when the element is driven. If this current leakage occurs, no appropriate potential difference is generated between the driving electrodes 301 and 302. For this reason, the current leakage hinders the micro movable element Y having the functions from being driven properly.

Figure 36:
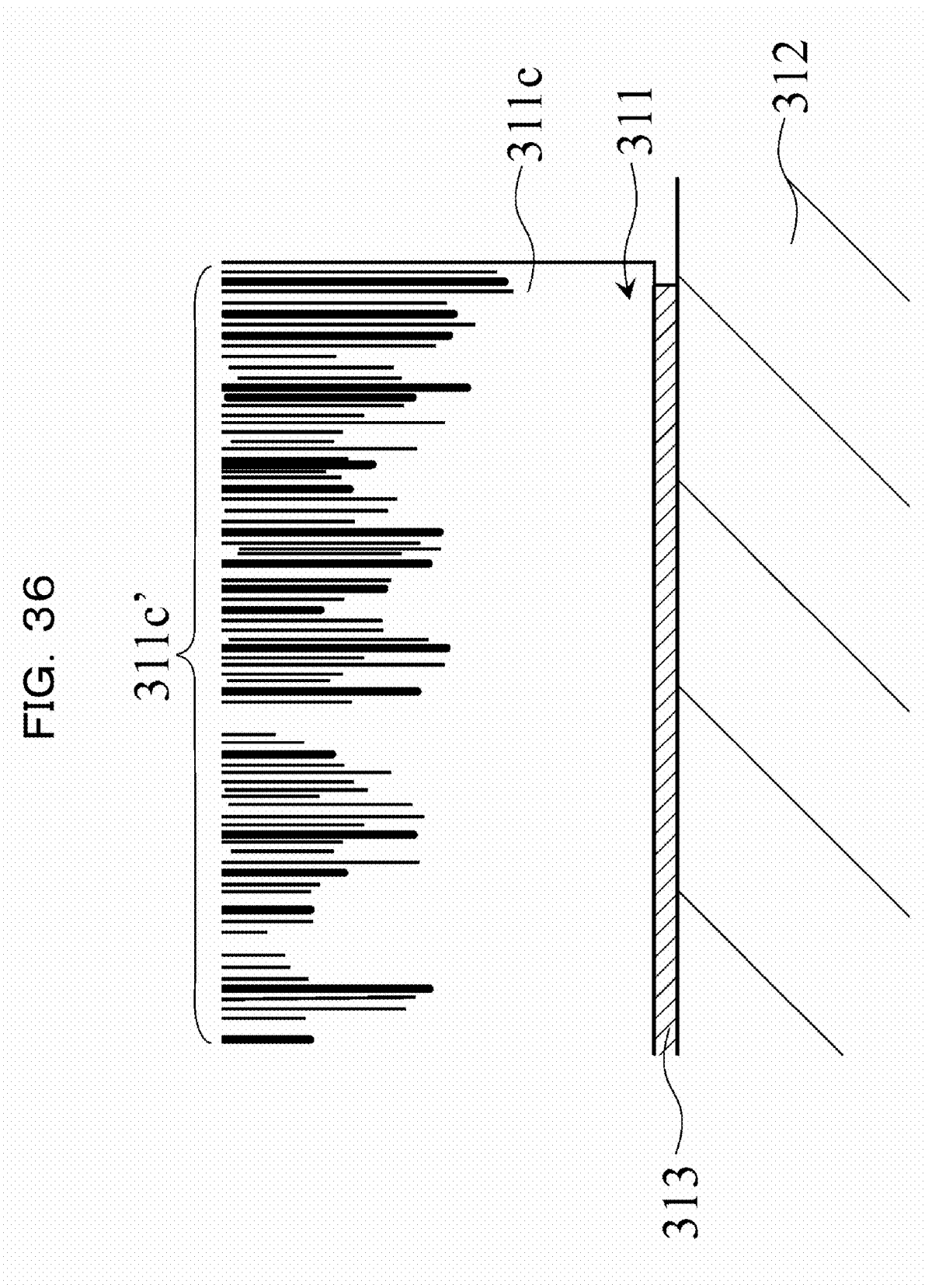
FIG. 36 is an enlarged fragmentary arrow view taken on line XXXVI-XXXVI of FIG. 31.
Figure 37:
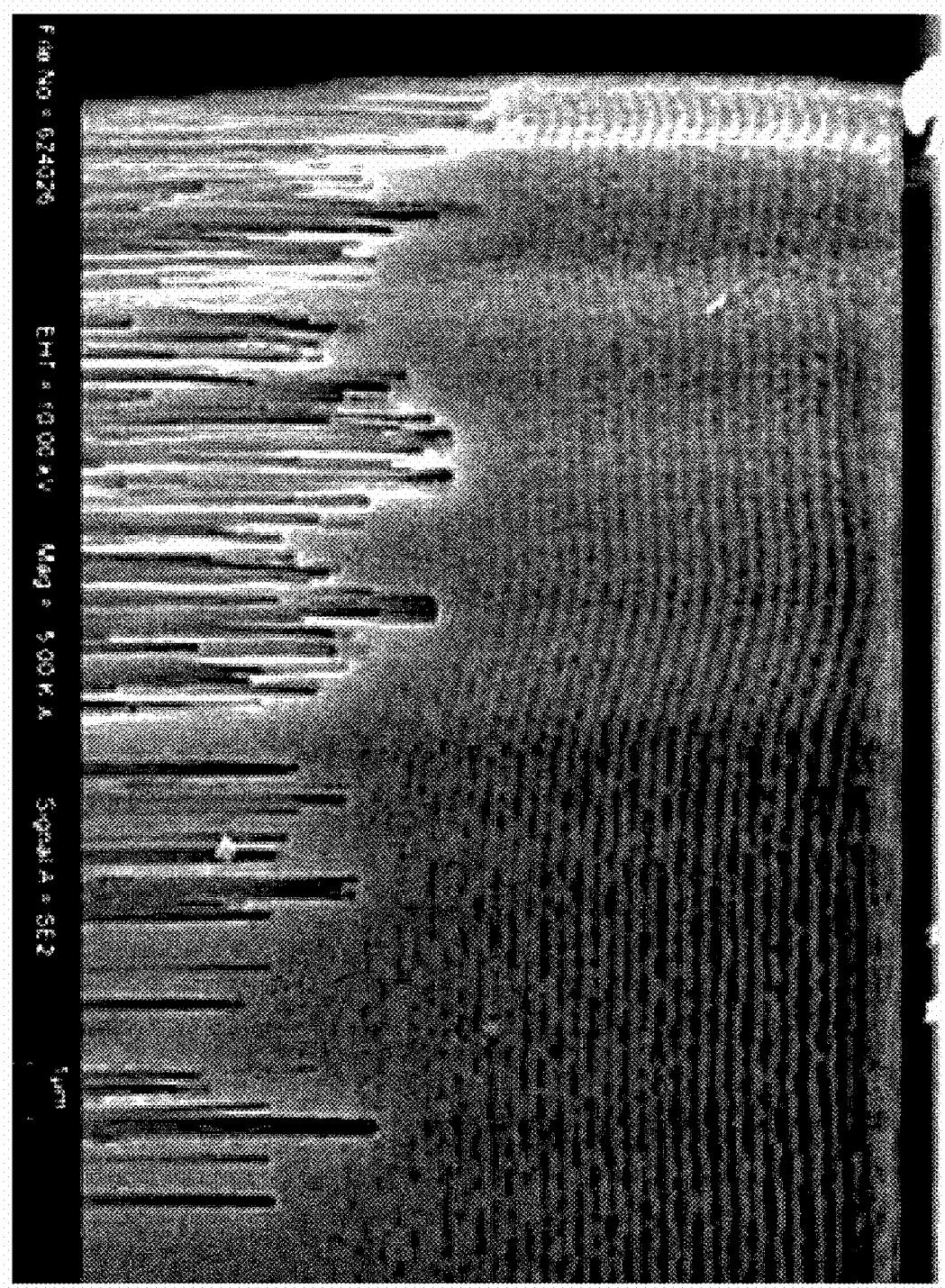
FIG. 37 is a scanning electron micrograph illustrating another part of the conventional micro movable element.

FIG. 36 is an enlarged fragmentary arrow view taken on line XXXVI-XXXVI of FIG. 31. FIG. 37 is a local SEM photograph of a micro movable element produced using the method illustrated in FIG. 32 and illustrates the shape of the side face corresponding to that illustrated in FIG. 36. As illustrated in FIG. 36 and also illustrated in FIG. 37 corresponding to FIG. 36, a rough region 311c' is formed on the side face 311c of the conductor portion 311. Although etching is performed for the silicon layer 401 according to the DRIE method in the step described above referring to FIG. 32B, if the etching is performed according to the DRIE method, the rough region 311c' is formed unintentionally and inevitably on the side face 311c of the conductor portion 311 to be formed.

The etching according to the DRIE method is cycle etching in which the etching performed using SF6 gas and the side wall protection performed using C4F8 gas are repeated alternately many times. For this reason, strictly speaking, the extent to which the etching progresses by virtue of the action of the SF6 gas in the etching process in each cycle and the extent to which the side wall is protected by virtue of the action of the C4F8 gas in the side wall protection process in each cycle are not uniform at sites in which the silicon layer 401 is processed. Furthermore, the shape of the contour of the resist pattern (not illustrated) formed on the silicon layer 401 and used as a mask when the etching according to the DRIE method is performed is accompanied by minute irregularity and roughness from the very beginning. In addition, the resist pattern is degraded as the etching progresses, and the roughness in the shape of the contour of the resist pattern remains unchanged or increases. For these reasons, it is assumed that the unintended rough region 311c' occurs inevitably on the side face 311c of the conductor portion 311.

Figure 38C:
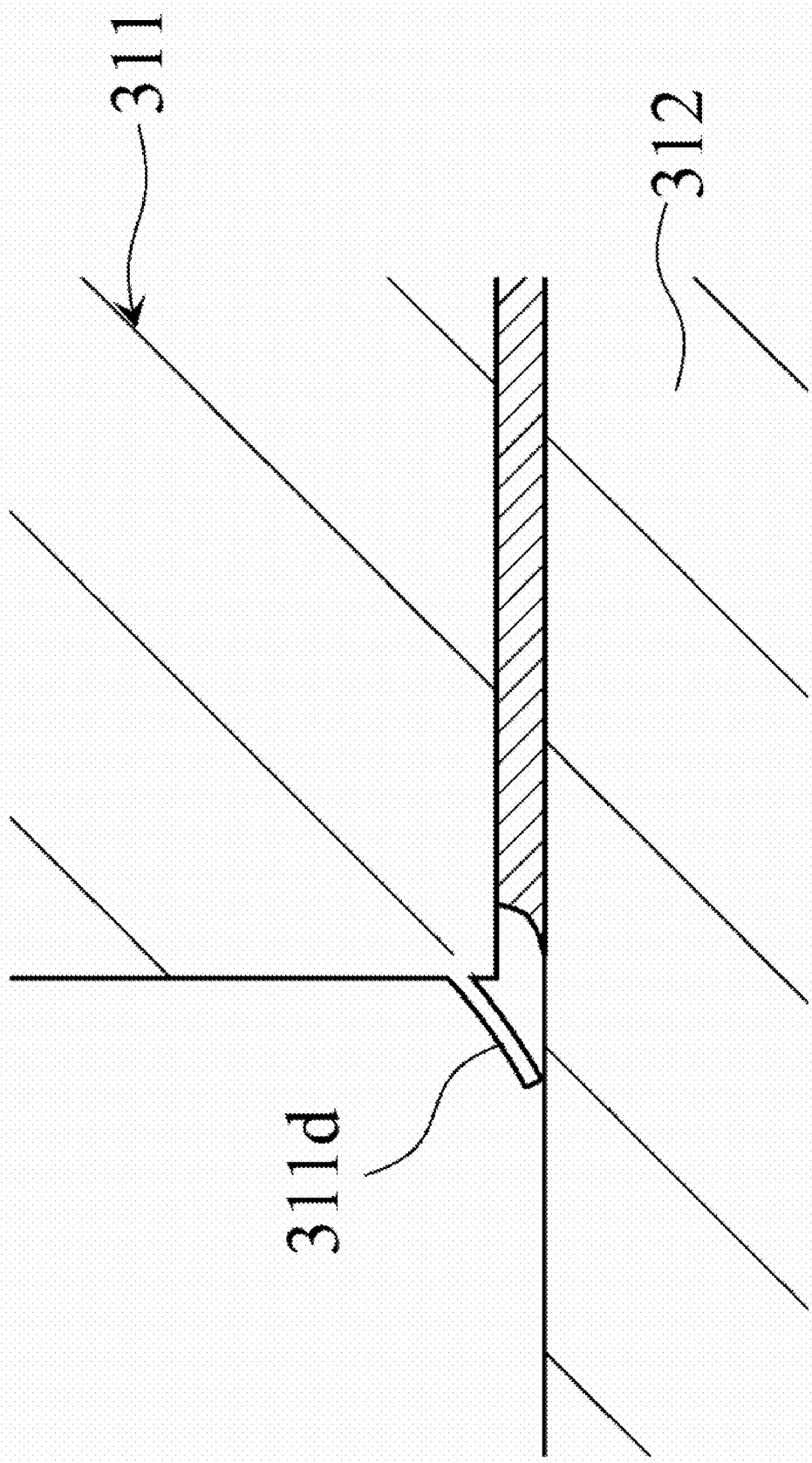

A minute silicon fraction 311d being apt to peel off from the main body of the conductor portion 311 may be present occasionally in the rough region 311c' as illustrated in FIG. 38A. If a potential difference is generated between the conductor portions 311 and 312 when the element is driven, an electrostatic attractive force is exerted to the silicon fraction 311d, and the silicon fraction 311d may be moved as illustrated in FIG. 38B. Owing to the movement of the silicon fraction, instantaneous current leakage will occur between the conductor portions 311 and 312 when the element is driven. Furthermore, if a potential difference is generated between the conductor portions 311 and 312 when the element is driven, an electrostatic attractive force is exerted to the silicon fraction 311d, whereby the silicon fraction 311d may be displaced occasionally so as to bridge the distance between the conductor portions 311 and 312 as illustrated in FIG. 38C. In the state in which the distance between the conductor portions 311 and 312 is bridged using the silicon fraction 311d, current leakage occurs, that is, current flows through the silicon fraction 311d in the case that a potential difference is generated between the conductor portions 311 and 312 when the element is driven. This current leakage hinders the micro movable element Y having the functions from being driven properly.

Comparison Example 2

Figure 39:
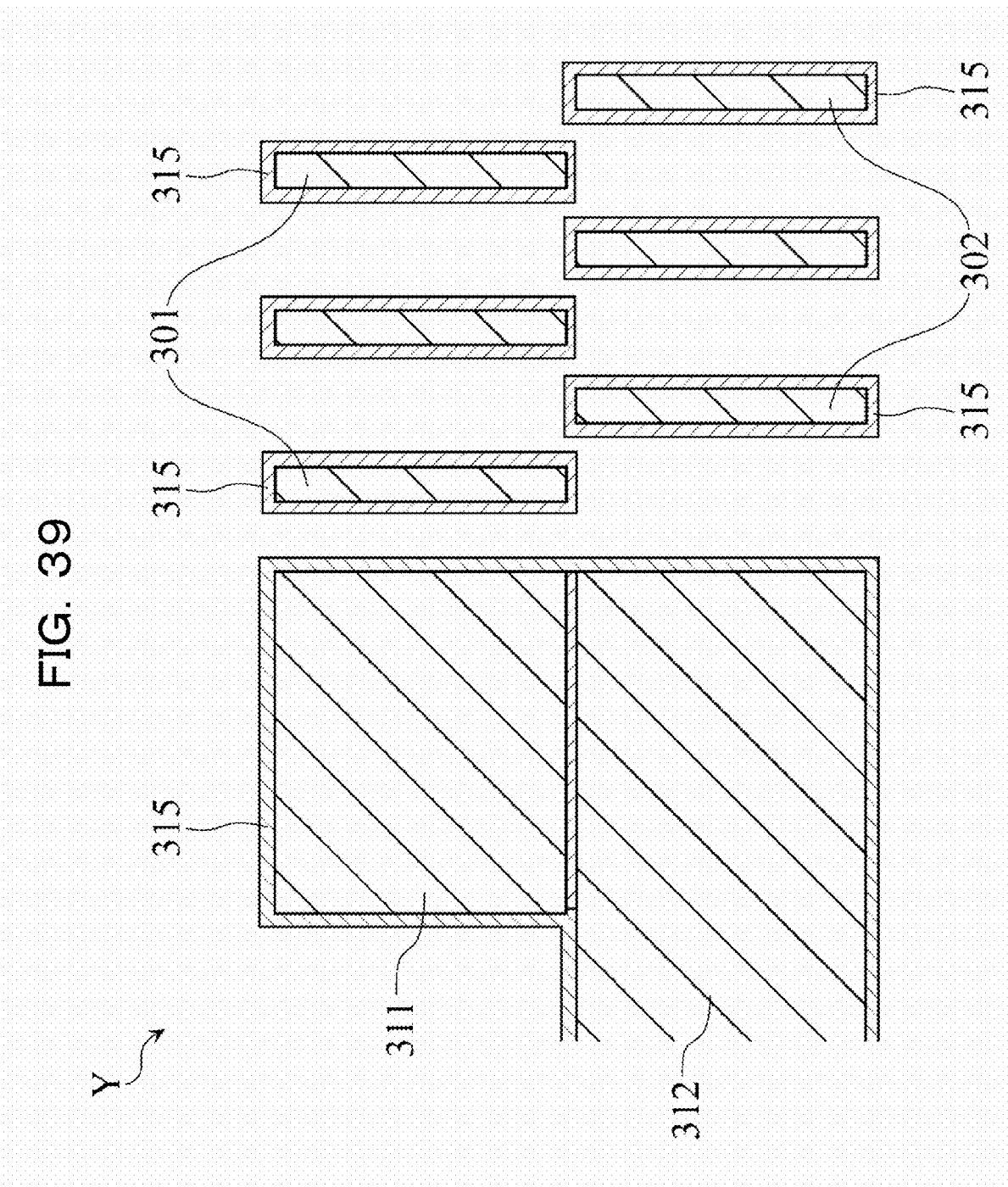
FIG. 39 illustrates the conventional micro movable element illustrated in FIG. 31, conformally coated.

As a method for suppressing the occurrence of the above-mentioned current leakage, a method is conceivable in which the micro movable element Y is wholly coated with a thin insulating film 315 for preventing current from flowing, as illustrated in FIG. 39. However, in the case of this kind of conformal coating, the driving electrodes 301 and 302 of the micro movable element Y are also wholly covered with the insulating film 315, whereby the control of the driving force to be generated between the driving electrodes 301 and 302 is apt to be hindered. This is because the so-called charging occurs on the insulating film 315 when the element is driven. In other words, if a voltage is applied across the driving electrodes 301 and 302 when the element is driven, charge is accumulated on the insulating film 315, which serves as a dielectric substance with which the surfaces of the driving electrodes 301 and 302 are coated, by the action of the electric field generated between the driving electrodes 301 and 302. Moreover, the amount of the charge accumulated on the insulating film 315 may change occasionally depending on the time during which the voltage is applied across the driving electrodes 301 and 302. If this kind of charging occurs on the insulating film 315 existing on the surfaces of the driving electrodes 301 and 302, the electrostatic attractive force (driving force) generated between the driving electrodes 301 and 302 becomes unstable, and the control of the driving force is apt to be hindered. If the control of the driving force is hindered, the control for the displacement amount of the movable portion is hindered, and the functions of the micro movable element Y are also hindered eventually.

Example 1

This example is intended to eliminate the disadvantages encountered in Comparison examples 1 and 2. This example provides a micro movable element suited to suppress the generation of current leakage and also suited to accurately control the driving force generated between the driving electrodes. Furthermore, this example provides an optical switching apparatus equipped with this kind of micro movable element. Moreover, this example provides a method for producing this kind of micro movable element.

According to an aspect of the first example, a micro movable element is provided which is equipped with a movable portion and a first driving electrode and a second driving electrode for driving the movable portion (in other words, for generating an electrostatic attractive force serving as a driving force). This micro movable element includes a partly laminated structure portion having a first conductor portion electrically connected to the first driving electrode, the second conductor portion electrically connected to a second driving electrode and an intermediate insulating portion disposed between the first and second conductor portions. The first conductor portion has an opposed face opposed to the second conductor portion, a side face and an edge portion forming the boundary between the opposed face and the side face. The second conductor portion has an extending face extending beyond the edge portion of the first conductor portion. At least part of the edge portion of the first conductor portion is covered with an insulating film. At least parts of the first and second driving electrodes are not covered with an insulating film. The micro movable element is a microstructure, such as a micromirror element, an acceleration sensor or an angular velocity sensor, equipped with a movable portion. The first and second conductor portions electrically connected to the first and second driving electrodes form part of an electrically-conducting path in the micro movable element having functions. Different potentials may be applied to the first and second driving electrodes when the element is driven. In other words, a potential difference may be generated occasionally between the first conductor portion and the second conductor portion of the micro movable element when the element is driven.

In the micro movable element according to the first aspect, the insulating film covering at least part of the edge portion of the first conductor portion suppresses discharge from occurring between the edge portion of the first conductor portion and the second conductor portion and its extending face when a potential difference is generated between the first and second conductor portions. The insulating film configured as described above suppresses the edge portion from being eluted by the heat generated at the time of discharge and from forming an electrically-conducting path for bridging the distance between the first and second conductor portions, thereby suppressing current from flowing through such an electrically-conducting path (current leakage) in the case that a potential difference is generated between the first and second conductor portions when the element is driven.

In addition, in the case that a potential difference is generated between the first and second conductor portions, the insulating film of the micro movable element suppresses a fraction of the first conductor portion from peeling off from the side face near the edge portion of the first conductor portion. The insulating film configured as described above suppresses current leakage between the first and second conductor portions owing to the movement of the fraction or the film bridging of the distance between the first and second conductor portions via the fraction.

Furthermore, in the micro movable element, at least parts of the first and second driving electrodes for generating an electrostatic attractive force serving as a driving force are not covered with the insulating film. In other words, the first and second driving electrodes are not conformally coated with the insulating film. For this reason, the charging described above with respect to the micro movable element Y may be suppressed or dissolved from occurring in the micro movable element. In the micro movable element configured as described above, a stable driving force may be generated easily using the first and second driving electrodes. Hence, the micro movable element is suited to accurately control the driving force.

As described above, the micro movable element according to the first example is suited to suppress current leakage from occurring and also suited to accurately control the driving force generated between the driving electrodes.

In the first embodiment, it is preferable that the first and second driving electrodes are comb electrodes having multiple electrode teeth arranged in parallel. From the view point of accurate control of the driving force, it is preferable to adopt a pair of comb electrodes serving as a pair of drive electrodes.

It is preferable that the micro movable element is further equipped with a frame and a connection portion for connecting the frame to the movable portion and for determining the axial center line of the rotation operation of the movable portion, that the movable portion has an arm portion extending in a direction intersecting the axial center line, that the multiple electrode teeth of the first driving electrode extend from the arm portion while being spaced mutually in the extension direction of the arm portion, and that some of the electrode teeth on the side of the axial center line among the multiple electrode teeth are covered with an insulating film. Parts of the driving electrodes, hardly charged even if coated with an insulating film, may also be coated with the insulating film as in the case of this configuration.

It is preferable that the first and second driving electrodes are not covered with an insulating film. Furthermore, it is also preferable that the entire surfaces of the first and second driving electrodes are not covered with an insulating film to solve the problem of the charging owing to the existence of the insulating film covering the driving electrodes.

It is preferable that the insulating film is a parylene film, a silicon oxide film or a silicon nitride film. These films are insulating films being excellent in conformality performance. In particular, the parylene film is excellent in conformality performance.

Example 2

A second example provides an optical switching apparatus. This optical switching apparatus is equipped with a micromirror element including a micromirror element according to the first aspect. The optical switching apparatus is, for example, an optical switching apparatus of a space optical coupling type or an optical switching apparatus of a wavelength selection type.

A third embodiment provides a method for producing a micro movable element. This method is a method for producing the micro movable element according to the first aspect by processing a material substrate having a laminated structure including a first conductor layer, a second conductor layer and an insulating layer disposed between the first and second conductor layers. The method includes an insulating film forming step and a removing step. In the insulating film forming step, an insulating film is formed on the surface of the element equipped with the movable portion and the first and second driving electrodes and including the partly laminated structure portion. In the removing step, the insulating film formed at the insulating film forming step is subjected to removing treatment while at least part of the edge portion of the first conductor portion in the partly laminated structure portion remains unremoved. With the method, the micro movable element according to the first example may be produced properly.

Example 3

According to a preferred embodiment of a third example, the removing step includes a first etching step for performing anisotropic dry etching for the material substrate on the side of the first conductor layer and a second etching step for performing anisotropic dry etching for the material substrate on the side of the second conductor layer. In this case, it is preferable that the etching conditions at the first etching step are different from the etching conditions at the second etching step. The etching conditions are etching time, gas pressure inside the chamber of an etching apparatus, applied electric power, etc.

According to another preferred embodiment of the third example, a laser beam is irradiated to portions from which the insulating film covering the first and second driving electrodes is desired to be removed. In this case, it is preferable that the irradiation direction of the laser beam is inclined with respect to the thickness direction of the material substrate. It is also preferable to use the excimer laser beam as the laser beam.

First Embodiment

Figure 2:
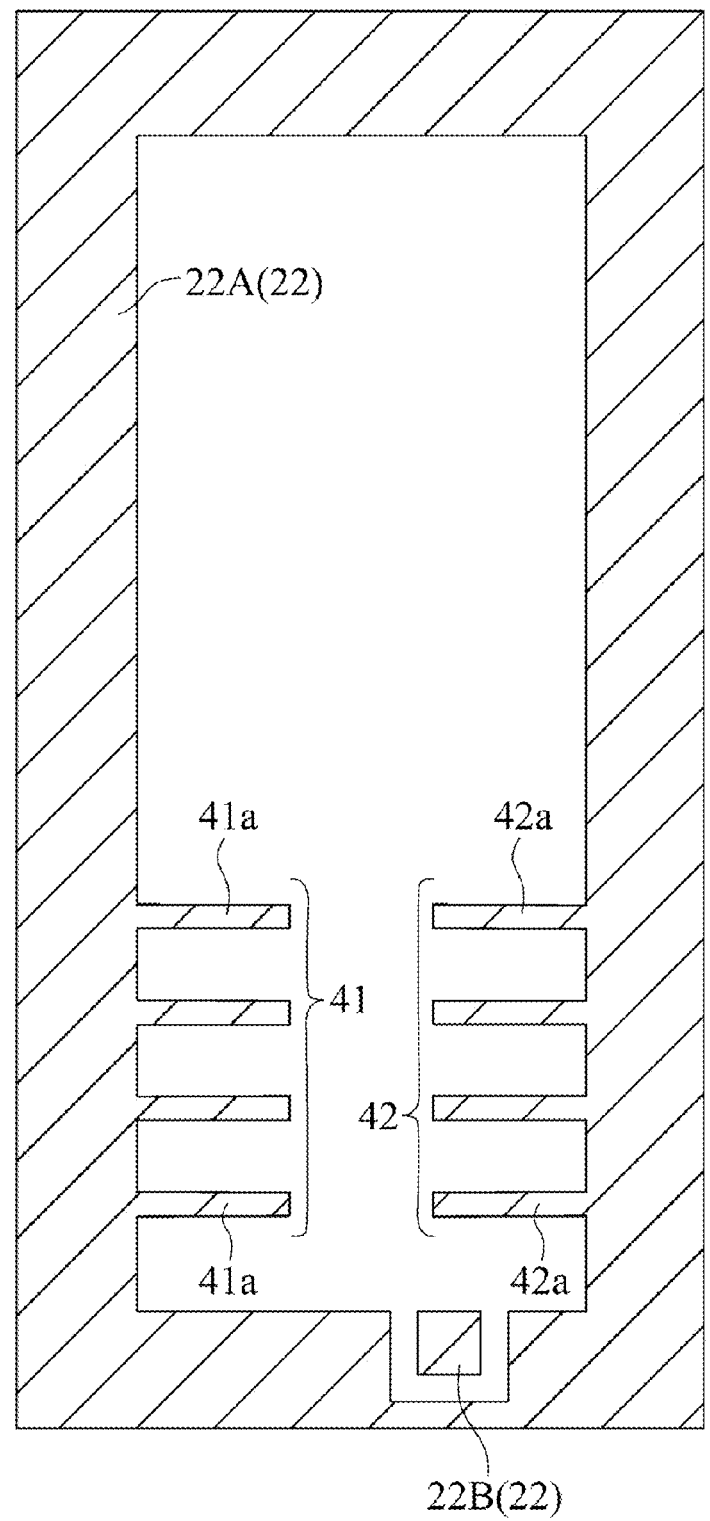
FIG. 2 is a partially omitted plan view of the micro movable element illustrated in FIG. 1.
Figure 3:
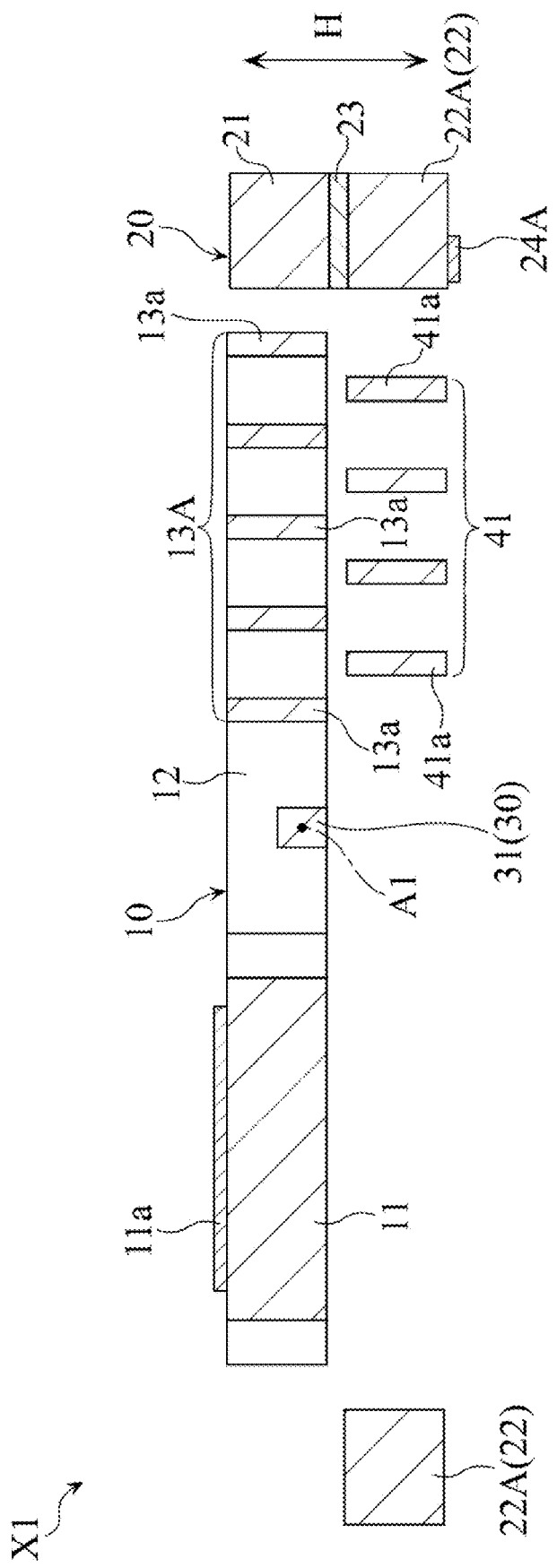
FIG. 3 is a sectional view taken on line III-III of FIG. 1.
Figure 4:
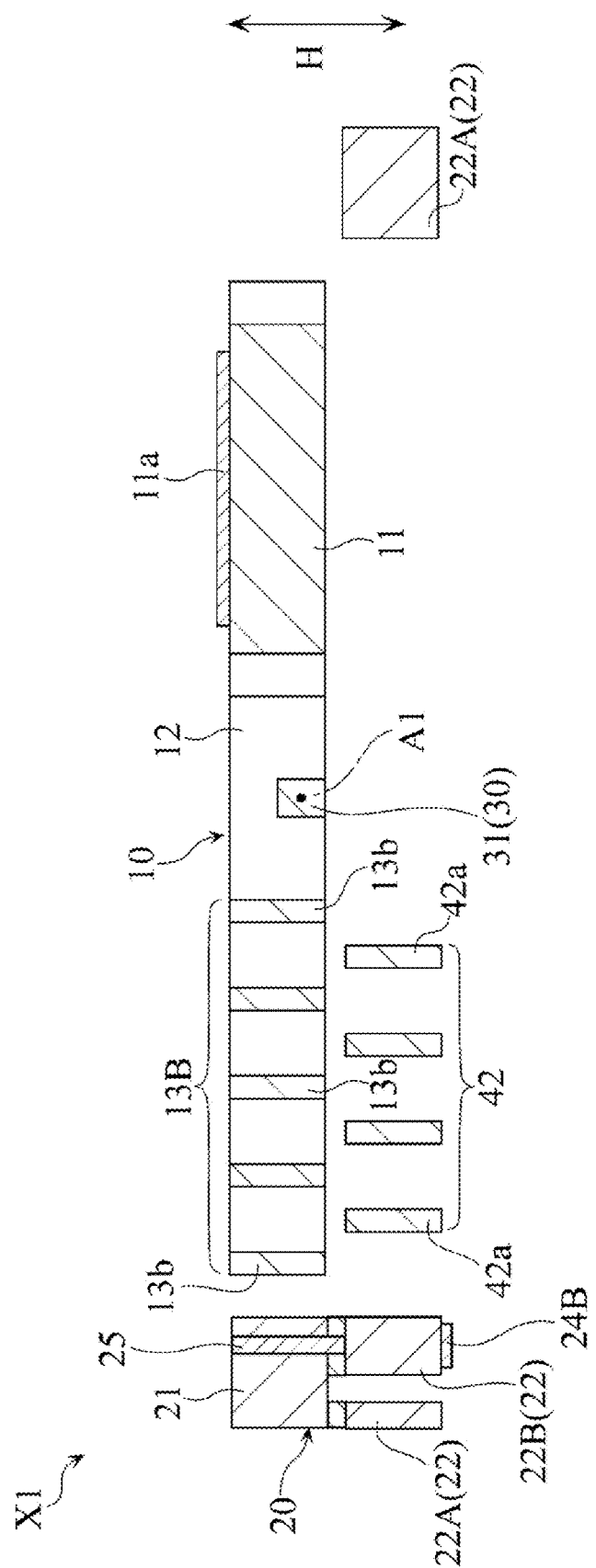
FIG. 4 is a sectional view taken on line IV-IV of FIG. 1.
Figure 5:
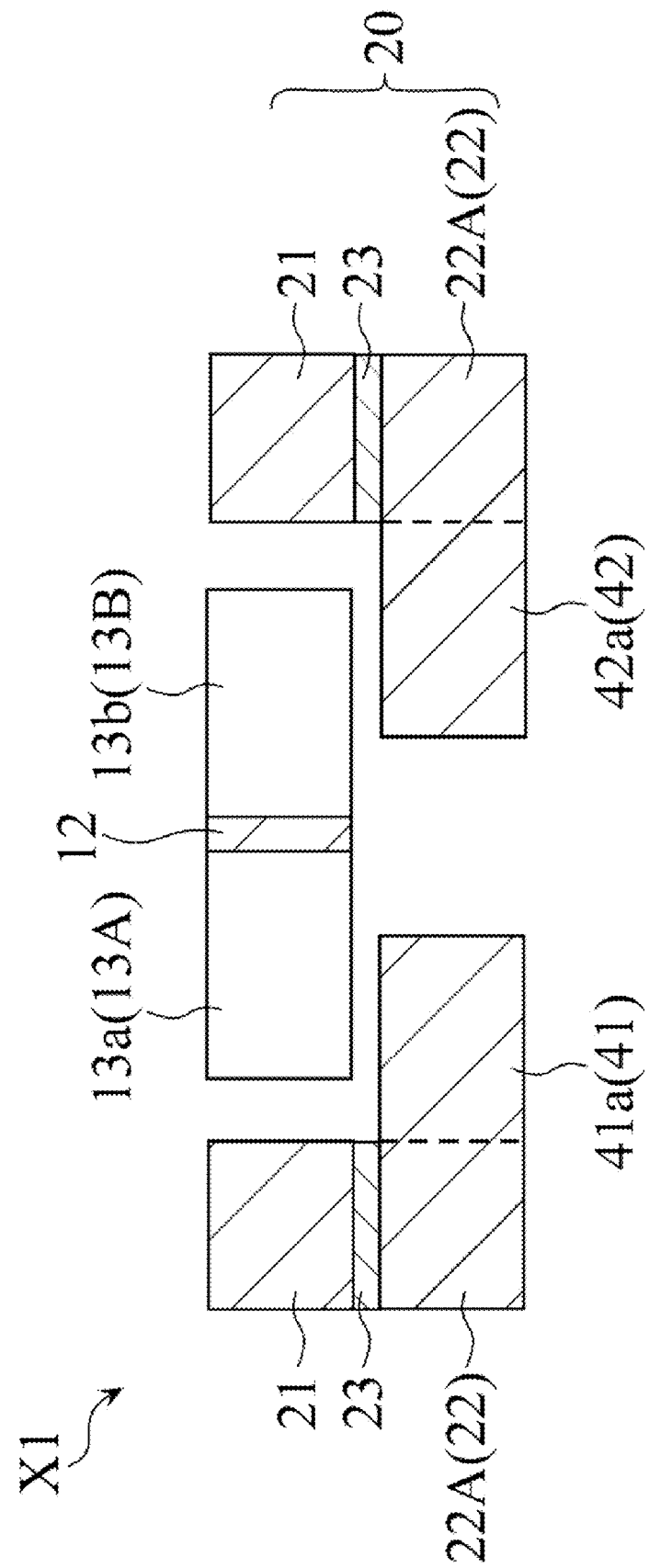
FIG. 5 is a sectional view taken on line V-V of FIG. 1.
Figure 6:
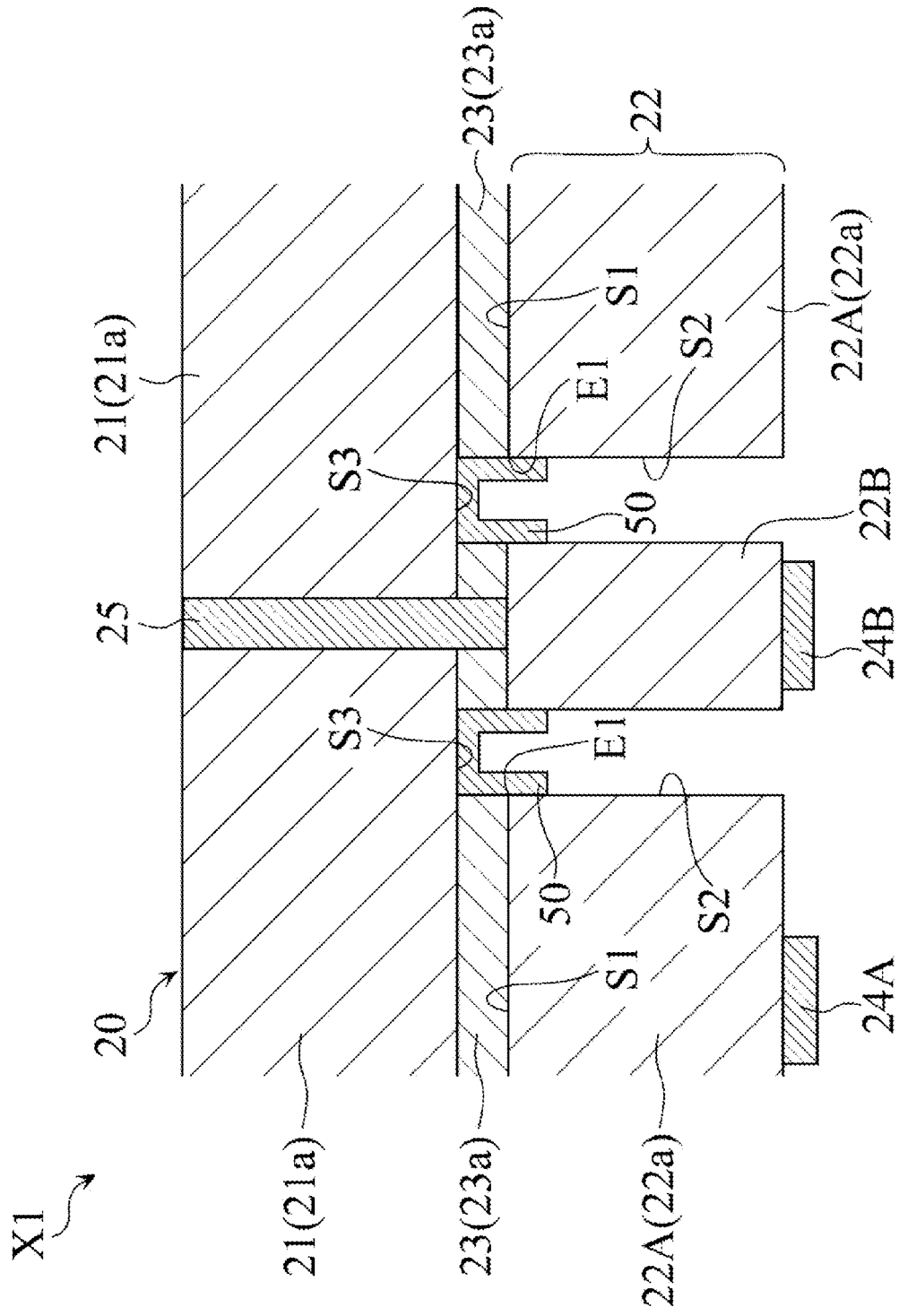
FIG. 6 is an enlarged sectional view taken on line VI-VI of FIG. 1.
Figure 7:
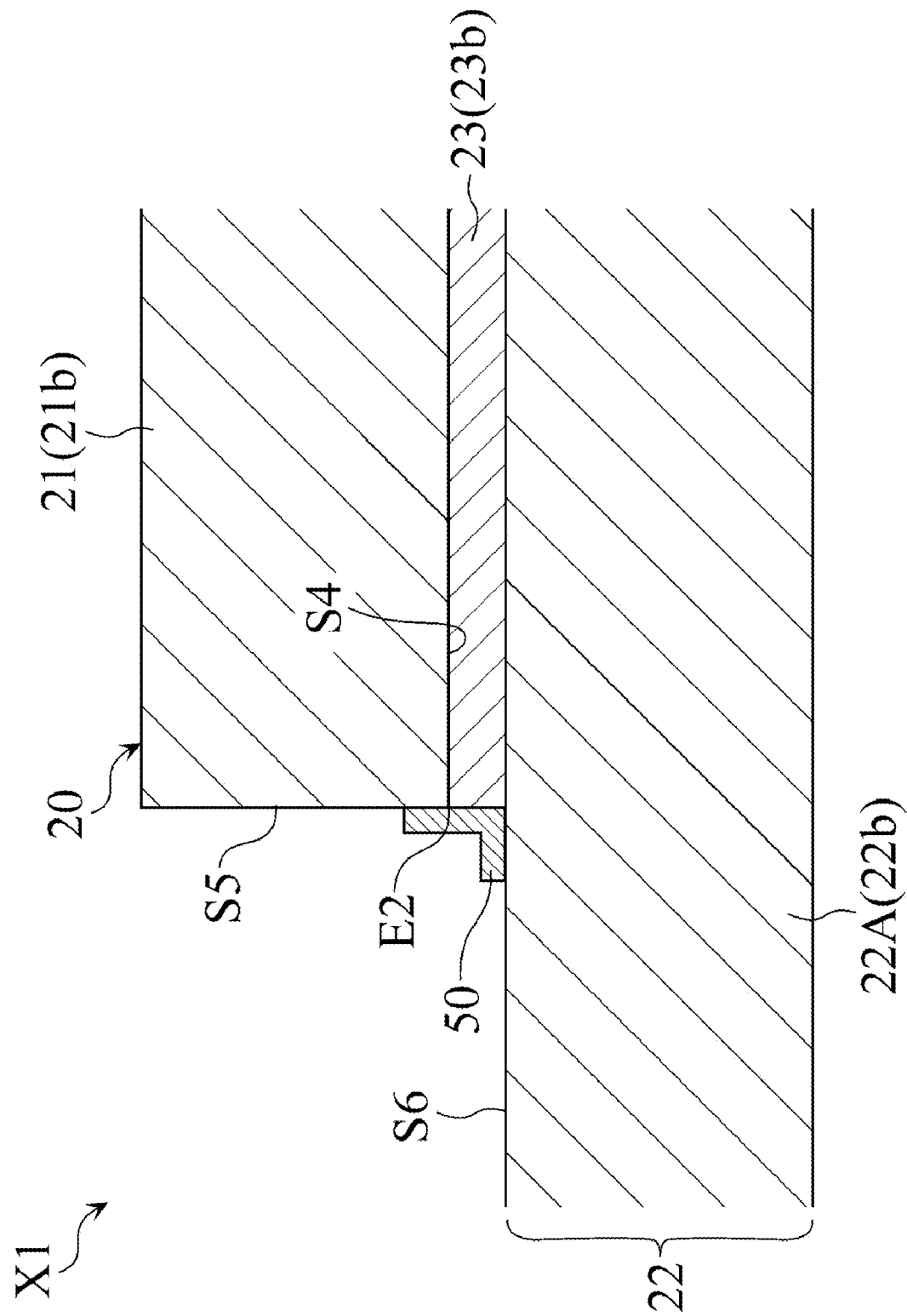
FIG. 7 is an enlarged sectional view taken on line VII-VII of FIG. 1.

FIGS. 1 to 7 illustrate a micro movable element X1 according to a first embodiment. FIG. 1 is a plan view of the micro movable element X1, FIG. 2 is a partially omitted plan view of the micro movable element X1, and FIGS. 3, 4 and 5 are sectional views taken on line III-III, line IV-IV and line V-V of FIG. 1, respectively. FIGS. 6 and 7 are enlarged sectional views taken on line VI-VI and line VII-VII of FIG. 1, respectively.

The micro movable element X1 is a micromirror element equipped with a rocking portion 10, a frame 20, a torsion connection portion 30, comb electrodes 41 and 42 and an insulating film 50. The micro movable element X1 is produced by processing a material substrate serving as the so-called SOI (silicon-on-insulator) substrate using the bulk micromachining technology, such as the MEMS technology. The material substrate has a laminated structure comprising first and second silicon layers and an intermediate insulating layer disposed between the silicon layers, and electrical conductivity is imparted to the silicon layers by impurity doping. The above-mentioned portions except for the insulating film 50 in the micro movable element X1 are portions mainly derived from the first silicon layer and/or the second silicon layer. However, in FIG. 1, for the sake of clarification of the drawing, the portions derived from the first silicon layer and protruding upright from the intermediate insulating layer toward the front side of the sheet of the drawing are hatched with oblique lines. Furthermore, FIG. 2 illustrates a structure derived from the second silicon layer of the micro movable element X1.

The rocking portion 10 has a mirror-supporting portion 11, an arm portion 12 and comb electrodes 13A and 13B.

The mirror-supporting portion 11 is a portion derived from the first silicon layer, and its surface is provided with a mirror face 11a having a light-reflecting function. The mirror face 11a has, for example, a laminated structure having a Cr layer formed on the first silicon layer and an Au layer formed thereon. The length L1 of the mirror-supporting portion 11 illustrated in FIG. 1 is, for example, 20 to 300 μm.

The arm portion 12 is a portion mainly derived from the first silicon layer and extends from the mirror-supporting portion 11. The length L2 of the arm portion 12 illustrated in FIG. 1 is, for example, 10 to 100 μm.

The comb electrode 13A includes multiple electrode teeth 13a. The respective multiple electrode teeth 13a extend from the arm portion 12 and are arranged in parallel while being spaced mutually in the extension direction of the arm portion 12. The comb electrode 13B includes multiple electrode teeth 13b. The respective multiple electrode teeth 13b extend from the arm portion 12 on the opposite side of the electrode teeth 13a and are arranged in parallel while being spaced mutually in the extension direction of the arm portion 12. The electrode teeth 13a and 13b are portions mainly derived from the first silicon layer. In this embodiment, the extension directions of the electrode teeth 13a and 13b are orthogonal to the extension direction of the arm portion 12 as illustrated in FIG. 1. The comb electrode 13A including the electrode teeth 13a is electrically connected to the comb electrode 13B including the electrode teeth 13b via the arm portion 12.

The frame 20 has a laminated structure including a first layer portion 21, a second layer portion 22 and an insulating layer 23 disposed therebetween. The first layer portion 21 is a portion derived from the first silicon layer. The second layer portion 22 is a portion derived from the second silicon layer and has a shape enclosing the rocking portion 10. In addition, the second layer portion 22 includes a main portion 22A and a land portion 22B separated from this main portion 22A by a space as illustrated in FIG. 2. An electrode pad 24A for external connection is provided on the surface of the main portion 22A as illustrated in FIG. 3, and an electrode pad 24B for external connection is provided on the surface of the land portion 22B as illustrated in FIGS. 4 and 6. The land portion 22B is electrically connected to the first layer portion 21 via a conductive plug 25 passing through the insulating layer 23. Furthermore, the length L3 of the frame 20 illustrated in FIG. 1 is, for example, 5 to 50 μm.

The torsion connection portion 30 includes a pair of torsion bars 31. Each torsion bar 31 is a portion mainly derived from the first silicon layer and is connected to the arm portion 12 of the rocking portion 10 and the first layer portion 21 of the frame 20 so as to link these portions. The arm portion 12 is electrically connected to the first layer portion 21 via the torsion bars 31. Furthermore, the thickness of the torsion bar 31 is thinner than that of the arm portion 12 and also thinner than that of the first layer portion 21 of the frame 20 in the thickness direction H of the element as illustrated in FIGS. 3 and 4. The torsion connection portion 30 and the pair of torsion bars 31 configured as described above are used to determine the axial center line A1 of the rotation operation of the rocking portion 10 and the mirror-supporting portion 11. The axial center line A1 orthogonally intersects the direction of the arrow D illustrated in FIG. 1, that is, the extension direction of the arm portion 12. Hence, the extension directions of the above-mentioned electrode teeth 13a and 13b extending from the arm portion 12 in a direction orthogonal to the extension direction of the arm portion 12 are parallel to the axial center line A1. It is preferable that the axial center line A1 passes through the center of gravity of the rocking portion 10 or its proximity.

In this embodiment, one set of torsion bars formed on the first silicon layer and arranged in parallel may also be provided instead of the respective torsion bars 31. In this case, it is preferable that the interval of the one set of torsion bars increases gradually in the direction from the frame 20 to the arm portion 12. In the micro movable element X1, it may be possible that the axial center line A1 is determined by providing two sets of two torsion bars arranged in parallel as described above instead of the pair of torsion bars 31. This is similarly applicable to micro movable elements described later.

The comb electrode 41 is a portion that cooperates with the comb electrode 13A to generate an electrostatic attractive force and includes multiple electrode teeth 41a derived from the second silicon layer. The respective multiple electrode teeth 41a extend from the second layer portion 22 of the frame 20 and are arranged in parallel while being spaced mutually in the extension direction of the arm portion 12. In this embodiment, the extension direction of the electrode teeth 41a is orthogonal to the extension direction of the arm portion and is parallel to the axial center line A1 as illustrated in FIG. 1.

The drive mechanism of the element has the comb electrode 41 and the comb electrode 13A. The comb electrodes 13A and 41 are positioned at heights different from each other as illustrated in FIGS. 3 and 5, for example, when the rocking portion 10 is not operating. In addition, the comb electrodes 13A and 41 are disposed so that their electrode teeth 13a and 41a are displaced so as not to make mutual contact when the rocking portion 10 is operating.

The comb electrode 42 is a portion that cooperates with the comb electrode 13B to generate an electrostatic attractive force and includes multiple electrode teeth 42a derived from the second silicon layer. The respective multiple electrode teeth 42a extend from the second layer portion 22 of the frame 20 and are spaced mutually in the extension direction of the arm portion 12. The comb electrode 42 including the electrode teeth 42a is electrically connected to the comb electrode 41 including the electrode teeth 41a via the main portion 22A of the second layer portion 22 of the frame 20. In this embodiment, the extension direction of the electrode teeth 42a is orthogonal to the extension direction of the arm portion 12 and is parallel to the axial center line A1 as illustrated in FIG. 1.

The drive mechanism of the element has the comb electrode 42 and the comb electrode 13B. The comb electrodes 13B and 42 are positioned at heights different from each other as illustrated in FIGS. 4 and 5, for example, when the rocking portion 10 is not operating. In addition, the comb electrodes 13B and 42 are disposed so that their electrode teeth 13b and 42a are displaced so as not to make mutual contact when the rocking portion 10 is operating.

The micro movable element X1 includes a partly laminated structure portion according to this embodiment as illustrated in FIGS. 6 and 7.

The partly laminated structure portion illustrated in FIG. 6 has a conductor portion 21a, a conductor portion 22a and an intermediate insulating portion 23a. The first layer portion 21 of the frame 20 includes the conductor portion 21*a*. The main portion 22A of the second layer portion 22 includes the conductor portion 22*a*. The intermediate insulating layer 23 includes the intermediate insulating portion 23*a*. The conductor portion 21*a* (the first layer portion 21) is electrically connected to the comb electrodes 13A and 13B via the torsion bars 31 and the arm portion 12 of the rocking portion 10. The torsion connection portion 30 includes the torsion bars 31. The conductor portion 22*a* (the main portion 22A of the second layer portion 22) is electrically connected to the comb electrodes 41 and 42. The conductor portion 21*a* is electrically isolated from the conductor portion 22*a*. Furthermore, the conductor portion 22*a* has an opposed face S1 opposed to the conductor portion 21*a*, a side face S2 and an edge portion E1 forming the boundary therebetween. The conductor portion 21*a* has an extending face S3 extending beyond the edge portion E1 of the conductor portion 22*a*. The insulating film 50 is provided so as to cover the edge portion E1 of the conductor portion 22*a*.

The partly laminated structure portion illustrated in FIG. 7 has a conductor portion 21*b*, a conductor portion 22*b* and an intermediate insulating portion 23*b*. The first layer portion 21 of the frame 20 includes the conductor portion 21*b*. The main portion 22A of the second layer portion 22 includes the conductor portion 22*b*. The intermediate insulating layer 23 includes the intermediate insulating portion 23*b*. The conductor portion 21*b* (the first layer portion 21) is electrically connected to the comb electrodes 13A and 13B via the torsion bars 31 and the arm portion 12 of the rocking portion 10. The torsion connection portion 30 includes the torsion bars 31. The conductor portion 22*b* (the main portion 22A of the second layer portion 22) is electrically connected to the comb electrodes 41 and 42. The conductor portion 21*b* is electrically isolated from the conductor portion 22*b*. Furthermore, the conductor portion 21*b* has an opposed face S4 opposed to the conductor portion 22*b*, a side face S5 and an edge portion E2 forming the boundary therebetween. The conductor portion 22*b* has an extending face S6 extending beyond the edge portion E2 of the conductor portion 21*b*. The insulating film 50 is provided so as to cover the edge portion E2 of the conductor portion 21*b*.

The insulating film 50 is provided so as to cover the edge portion (a portion in which a level difference is formed between a portion derived from the first silicon layer and a portion derived from the second silicon layer and in which a potential difference is generated between the portion derived from the first silicon layer and the portion derived from the second silicon layer in this embodiment) of the partly laminated structure portion included in the micro movable element X1 as illustrated in FIGS. 6 and 7. The insulating film 50 is made of, for example, parylene, silicon oxide or silicon nitride. The thickness of the insulating film 50 is, for example, 10 to 500 nm.

Figure 11A:
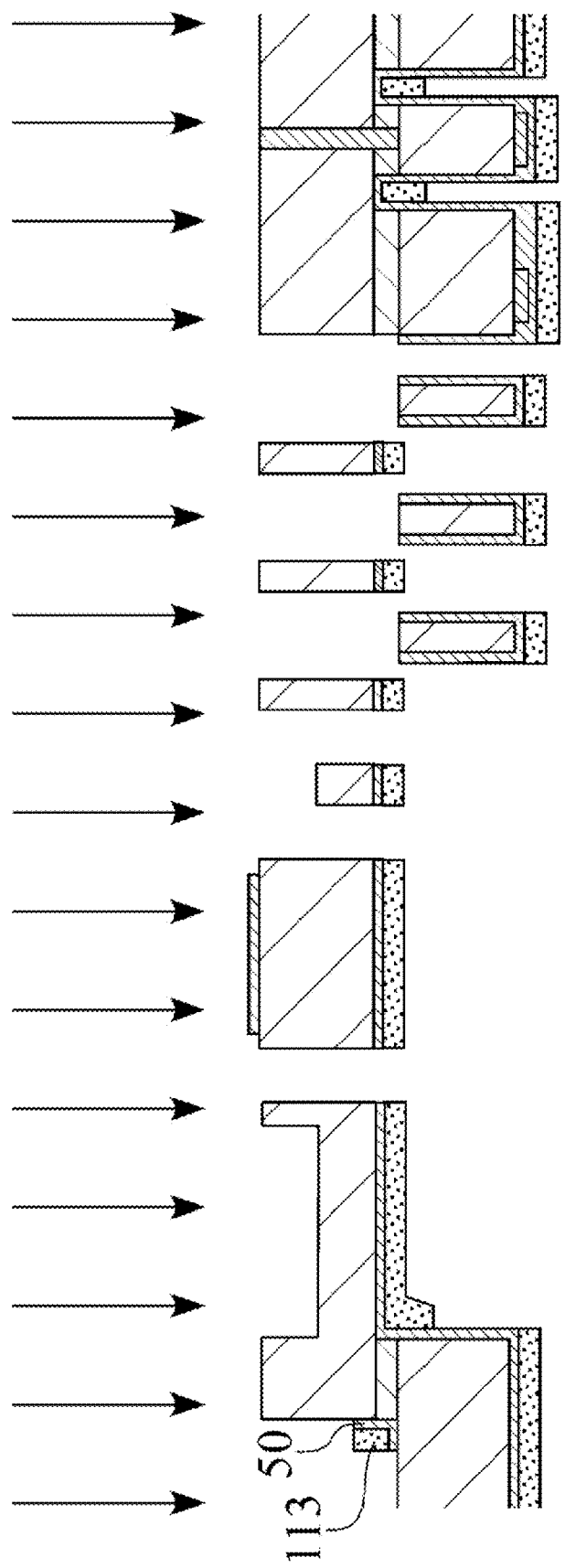
FIGS. 11A to 11C illustrate steps subsequent to those illustrated in FIG. 10A to 10C.
Figure 11B:
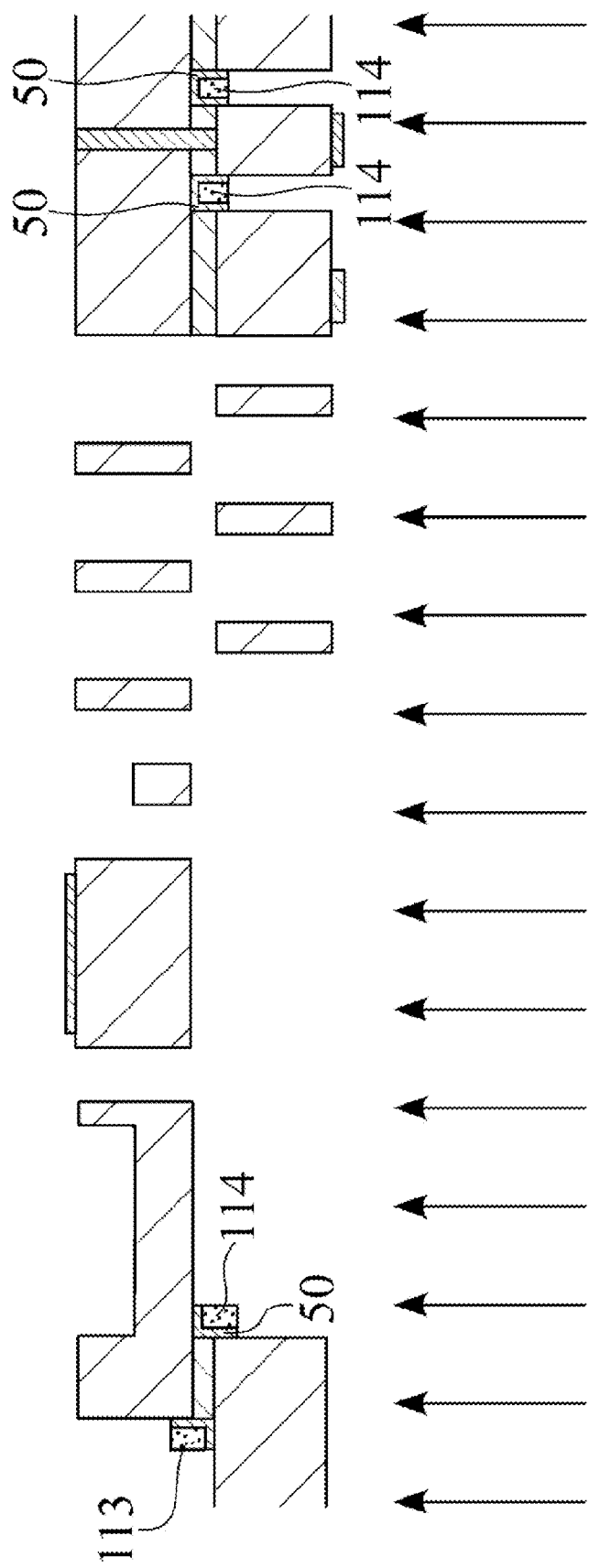
Figure 11C:
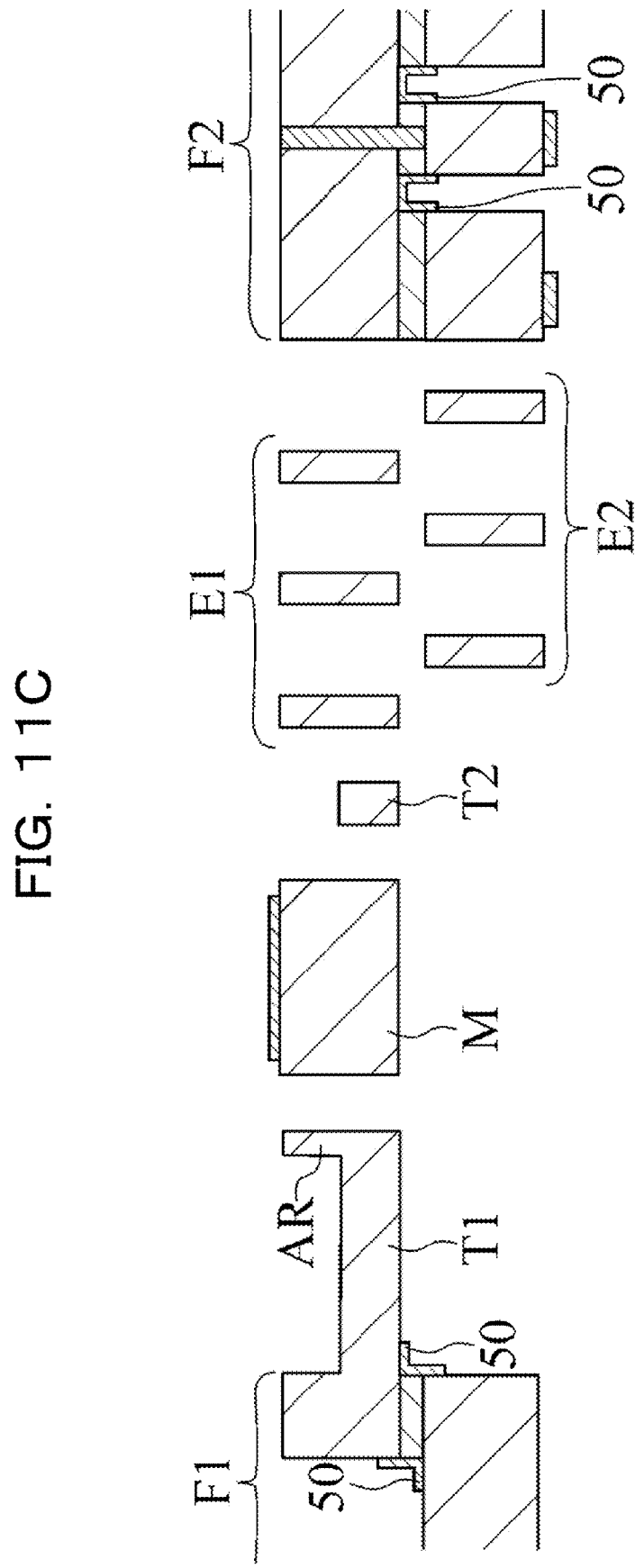

FIGS. 8A to 8D to FIGS. 11A to 11C illustrate an example of a method for producing the micro movable element X1. This method is a method for producing the micro movable element X1 using the bulk micromachining technology. In FIGS. 8A to 8D to FIGS. 11A to 11C, the process for forming a mirror-supporting portion M, an arm portion AR, frames F1 and F2, torsion bars T1 and T2 and a pair of comb electrodes E1 and E2 illustrated in FIG. 11C is illustrated as changes in one cross-section. The one cross-section is obtained by modeling the multiple cross-sections included in one micro movable element forming compartment in a material substrate (a wafer having a multilayer structure) to be processed and by representing them as a continuous cross-section. The mirror-supporting portion M corresponds to part of the mirror-supporting portion 11. The arm portion AR corresponds to part of the arm portion 12 and represents the transverse cross-section of the arm portion 12. The frames F1 and F2 respectively correspond to the frame 20 and represent the transverse cross-section of the frame 20. The torsion bar T1 corresponds to the torsion bar 31 and represents the cross-section of the torsion bar 31 in the extension direction thereof. The torsion bar T2 corresponds to the torsion bar 31 and represents the transverse cross-section of the torsion bar 31. The comb electrode E1 corresponds to parts of the comb electrodes 13A and 13B and represents the transverse cross-sections of the electrode teeth 13*a* and 13*b*. The comb electrode E2 corresponds to parts of the comb electrodes 41 and 42 and represents the transverse cross-sections of the electrode teeth 41*a* and 42*a*.

In the production of the micro movable element X1, first, a material substrate 100 illustrated in FIG. 8A is prepared. The material substrate 100 is an SOI substrate having a laminated structure including silicon layers 101 and 102 and an insulating layer 103 disposed between the silicon layers 101 and 102. The silicon layers 101 and 102 are made of a silicon material to which electrical conductivity is imparted by impurity doping. As impurities, p-type impurities, such as B, and n-type impurities, such as P and Sb, may be adopted. The insulating layer 103 is made of, for example, silicon oxide. The thickness of the silicon layer 101 is, for example, 10 to 100 μm, the thickness of the silicon layer 102 is, for example, 50 to 500 μm, and the thickness of the insulating layer 103 is, for example, 0.3 to 3 μm. Furthermore, the above-mentioned conductive plug 25 is formed so as to be embedded in the material substrate 100. The conductive plug 25 may be formed, for example, by forming a plug-forming concave portion passing through the silicon layer 101 and the insulating layer 103 and then by filling the concave portion with a conductive material.

Next, as illustrated in FIG. 8B, the mirror face 11*a* is formed on the silicon layer 101, and the electrode pads 24A and 24B are formed on the silicon layer 102. When the mirror face 11*a* is formed, first, for example, a Cr film (50 nm) is formed on the silicon layer 101 and then an Au film (200 nm) is formed thereon using the sputtering method. Next, the mirror face 11*a* is pattern-formed by sequentially etching these metal films via a mask. As an etching solution for Au, it is possible to use an aqueous potassium iodide-iodine solution, for example. As an etching solution for Cr, it is possible to use the mixture solution of an aqueous ceric ammonium nitrate solution and perchloric acid, for example. The electrode pads 24A and 24B are formed by forming a film of a conductive material on the surface of the silicon layer 102 using the sputtering method and then by etching the film of the conductive material via a mask.

Next, as illustrated in FIG. 8C, an oxide film pattern 110 and a resist pattern 111 are formed on the silicon layer 101, and an oxide film pattern 112 is then formed on the silicon layer 102. The oxide film pattern 110 has a pattern shape corresponding to the rocking portion 10 (the mirror-supporting portion M, the arm portion AR and the comb electrode E1) and the frame 20 (the frames F1 and F2). The oxide film pattern 110 configured as described above is formed using the CVD method, for example. The resist pattern 111 has a pattern shape corresponding to both the torsion bars 31 (the torsion bars T1 and T2). The resist pattern 111 configured as described above may be formed by forming a film of photoresist on the silicon layer 101 using the spin-coating method, by exposing the photoresist to light through a mask and by developing the photoresist using a developing solution. Furthermore, an oxide film pattern 112 has a pattern shape corresponding to the frame 20 (the frames F1 and F2) and the comb electrodes 41 and 42 (the comb electrode E2).

Next, as illustrated in FIG. 8D, the silicon layer 101 is etched to a given depth according to the DRIE (deep reactive ion etching) method by using the oxide film pattern 110 and the resist pattern 111 as masks. The given depth is a depth corresponding to the thickness of the torsion bars T1 and T2, for example, 5 μm. In the DRIE method, proper anisotropic etching may be carried out in the Bosch process in which the etching performed using SF6 gas and the side wall protection performed using C4F8 gas are repeated alternately. Even in the DRIE method described later, the Bosch process described above may be adopted. Degradation occurring in the oxide film pattern 110 and the resist pattern 111 during the etching treatment is not illustrated for the sake of simplicity of the drawing.

Figure 9A:
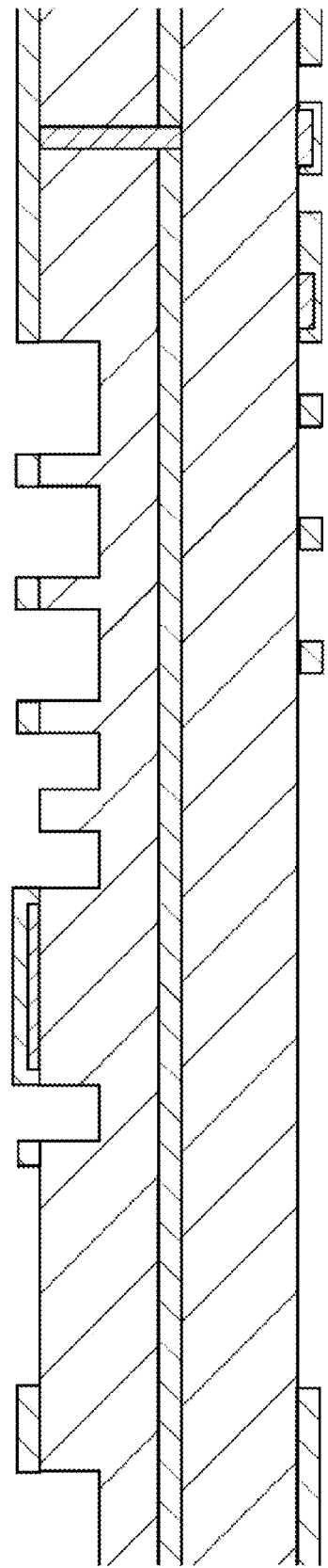

Next, as illustrated in FIG. 9A, the resist pattern 111 is removed by reacting a removing solution therewith. As the removing solution, it is possible to use AZ remover 700 (made by AZ Electronic Materials), for example.

Next, as illustrated in FIG. 9B, the silicon layer 101 is etched until the insulating layer 103 is reached while the torsion bars T1 and T2 are formed so as to remain according to the DRIE method by using the oxide film pattern 110 as a mask. By this etching treatment, parts of the rocking portion 10 (the mirror-supporting portion M, the arm portion AR and the comb electrode E1), both the torsion bars 31 (the torsion bars T1 and T2) and the frame 20 (the frames F1 and F2) are formed. Degradation occurring in the oxide film pattern 110 during the etching treatment is not illustrated for the sake of simplicity of the drawing.

Next, as illustrated in FIG. 9C, the silicon layer 102 is etched until the insulating layer 103 is reached according to the DRIE method by using the oxide film pattern 112 as a mask. By this etching treatment, part of the frame 20 (the frames F1 and F2) and the comb electrodes 41 and 42 (the comb electrode E2) are formed. Degradation occurring in the oxide film pattern 112 during the etching treatment is not illustrated for the sake of simplicity of the drawing.

Figure 9D:
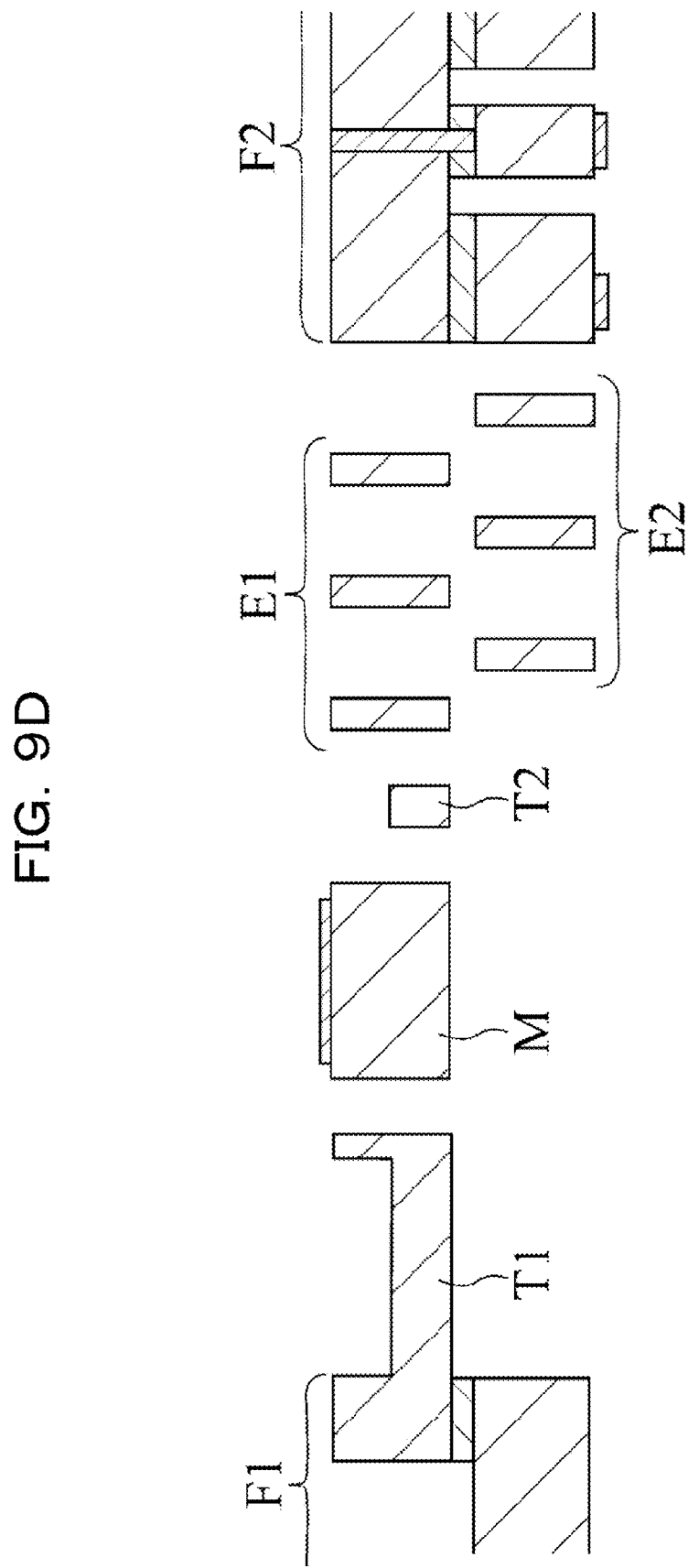

Next, as illustrated in FIG. 9D, the sites and the oxide film patterns 110 and 112 exposed on the insulating layer 103 are removed. As a removing method, it is possible to adopt dry etching or wet etching, for example. In the case that dry etching is adopted, it is possible to adopt, for example, CF4 and CHF3, as etching gases. In the case that wet etching is adopted, it is possible to use, for example, buffered hydrofluoric acid (BHF) containing hydrofluoric acid and ammonium fluoride, as an etching solution. At this step, a so-called undercut is apt to occur between the portions derived from the silicon layers 101 and 102 in the above-mentioned partly laminated structure portion included in the micro movable element X1.

Figure 10A:
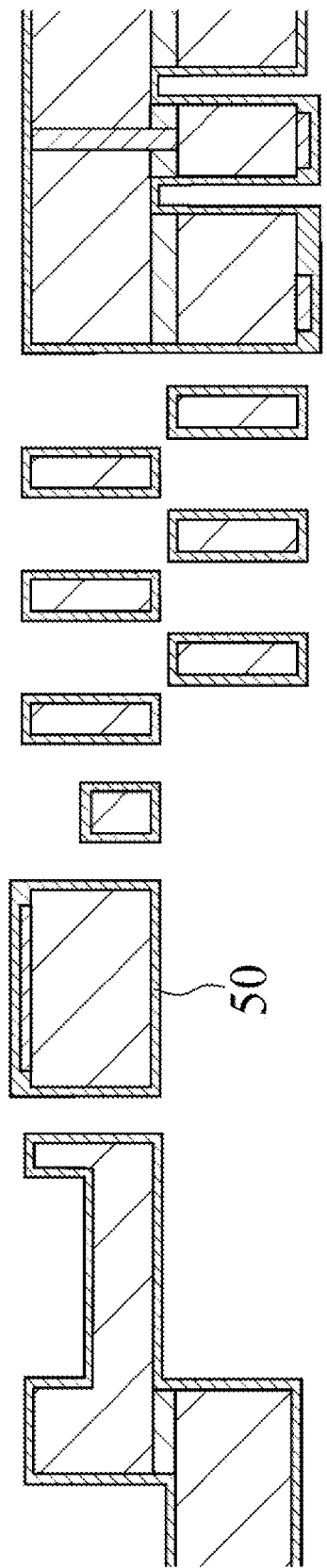

Next, as illustrated in FIG. 10A, the insulating film 50 is formed. More specifically, the insulating film 50 may be formed by forming a film of an insulating material using the thin-film forming technology. For example, in the case that parylene is used as the material of the insulating film 50, the insulating film 50 may be formed properly using the CVD method. More specifically, the insulating film 50 may be formed from polymeric para-xylylene resin by polymerizing para-xylylene monomer on the surface of an element using the CVD method. Since the insulating film 50 formed of this kind of a parylene film is generated by polymerizing a gas of a low-molecular-weight monomer on the surface of a substance, the insulating film 50 becomes a uniform coating film (conformal coating film) being thin and having a shape following the minute uneven shape of the surface of the substance. For example, in the case that silicon oxide is adopted as the material of the insulating film 50, the insulating film 50 may be formed properly by performing the oxygen plasma treatment.

Figure 10B:
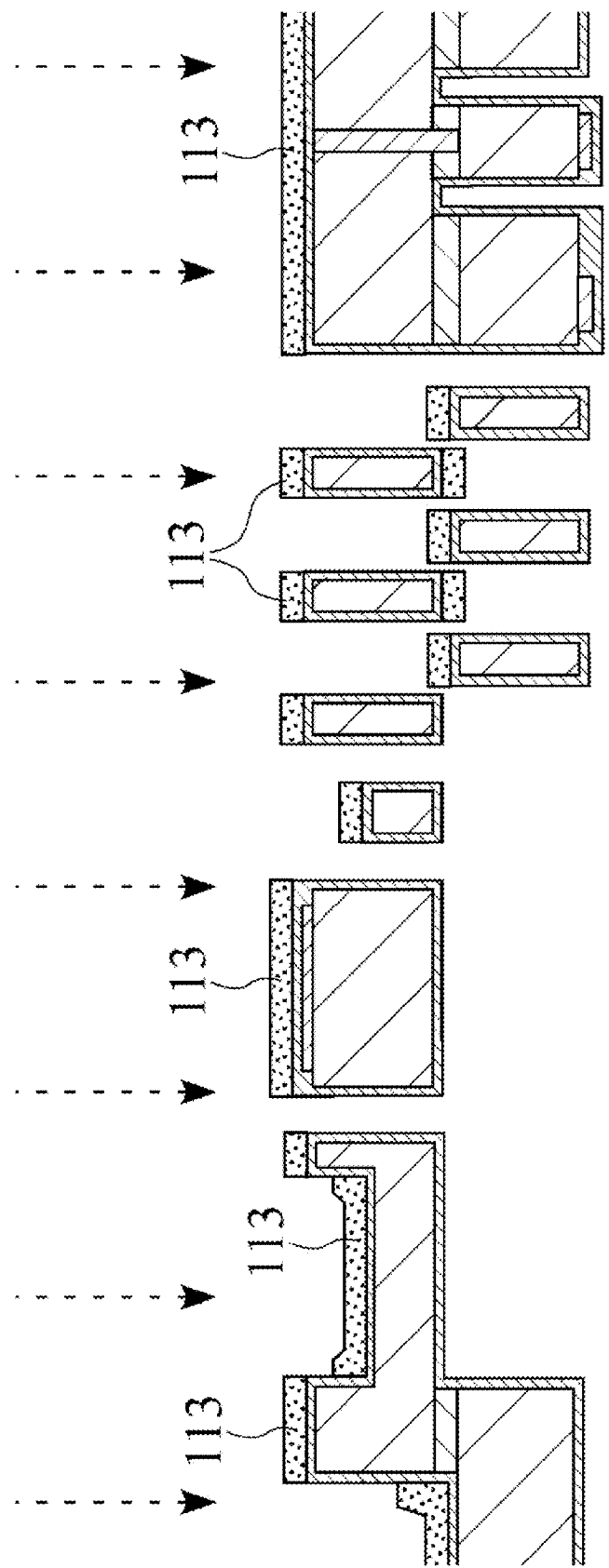

Next, as illustrated in FIG. 10B, a resist mask 113 is formed by spraying a photoresist in one direction. At this step, the resist mask 113 is apt to be formed thick at the level difference portion of the partly laminated structure portion. As a photoresist that may form a resist mask using the spraying method, it is possible to use AZ6112 (made by AZ Electronic Materials), for example.

Next, as illustrated in FIG. 10C, a resist mask 114 is formed by spraying a photoresist in another direction. At this step, the resist mask 114 is apt to be formed thick at the level difference portion of the partly laminated structure portion.

Next, as illustrated in FIG. 11A, part of the resist mask is removed by etching and part of the insulating film 50 is also removed by etching by carrying out the RIE (reactive ion etching) method using oxygen plasma or the like in one direction. At this step, the etching treatment is carried out so that part of the resist mask 113 formed sufficiently thickly at the level difference portion of the partly laminated structure portion at the step described above referring to FIG. 10B remains.

Next, as illustrated in FIG. 11B, part of the resist mask is removed by etching and part of the insulating film 50 is also removed by etching by carrying out the RIE method in another direction. At this step, the etching treatment is carried out so that part of the resist mask 114 formed sufficiently thickly at the level difference portion of the partly laminated structure portion at the step described above referring to FIG. 10C remains. Furthermore, the etching conditions at this step are made different from the etching conditions at the previous step as necessary. For example, at this step, the etching conditions, such as etching time, gas pressure inside the chamber of an etching apparatus and applied electric power, different from those at the previous step are adopted, and the etching rate and anisotropy are adjusted, whereby it is possible to carry out a desired etching treatment suited for this step.

Next, as illustrated in FIG. 11C, the remaining resist masks 113 and 114 are removed. As a result, the insulating film 50 is formed so as to remain in the partly laminated structure portion included in the micro movable element X1.

The mirror-supporting portion M, the arm portion AR, the frames F1 and F2, the torsion bars T1 and T2 and one set of the comb electrodes E1 and E2 are formed and the insulating film 50 is also formed by carrying out the sequence of the above-mentioned steps, whereby the micro movable element X1 is produced.

In the micro movable element X1, the rocking portion 10 including the mirror-supporting portion 11 is rotationally displaced around the axial center line A1 by applying potentials to the comb electrodes 13A, 13B, 41 and 42 as necessary. The potentials to be applied to the comb electrodes 13A and 13B are applied via the electrode pad 24B, the land portion 22B of the second layer portion 22 of the frame 20, the conductive plug 25, the first layer portion 21 of the frame 20, the torsion connection portion 30 including both the torsion bars 31, and the arm portion 12. The comb electrodes 13A and 13B are connected to the ground, for example. On the other hand, the potentials to be applied to the comb electrodes 41 and 42 are applied via the electrode pad 24A and the main portion 22A of the second layer portion 22 of the frame 20.

When a desired electrostatic attractive force is generated between the comb electrodes 13A and 41 and between the comb electrodes 13B and 42 by applying potentials to the comb electrodes 13A, 13B, 41 and 42, the comb electrode 13A is pulled into the comb electrode 41, and the comb electrode 13B is pulled into the comb electrode 42. Hence, the rocking portion 10 including the mirror-supporting portion 11 is rocked around the axial center line A1 and rotationally displaced to an angle at which the electrostatic attractive force is balanced with the total of the torsion-resisting forces of the torsion bars 31. In this balanced state, the comb electrodes 13A and 41 are oriented as illustrated in FIG. 12 and the comb electrodes 13B and 42 are also oriented similarly, for example. The rotational displacement amount of the rocking operation is controlled by adjusting the potentials applied to the comb electrodes 13A, 13B, 41 and 42. Furthermore, when the electrostatic attractive force between the comb electrodes 13A and 41 and the electrostatic attractive force between the comb electrodes 13B and 42 are eliminated, the respective torsion bars 31 return to their original states, and the rocking portion 10 including the mirror-supporting portion 11 is oriented as illustrated in FIGS. 3 and 4. The reflection direction of the light reflected using the mirror face 11a provided on the mirror-supporting portion 11 is changed as necessary by the above-mentioned rocking operation of the rocking portion 10 including the mirror-supporting portion 11.

In the micro movable element X1, in the case that a potential difference is generated between the first conductor portion (the conductor portion 22a in the partly laminated structure portion illustrated in FIG. 6 or the conductor portion 21b in the partly laminated structure portion illustrated in FIG. 7) and the second conductor portion (the conductor portion 21a in the partly laminated structure portion illustrated in FIG. 6 or the conductor portion 22b in the partly laminated structure portion illustrated in FIG. 7), the insulating film 50 provided for the partly laminated structure portion suppresses discharge from occurring between the edge portion (the edge portion E1 in the partly laminated structure portion illustrated in FIG. 6 or the edge portion E2 in the partly laminated structure portion illustrated in FIG. 7) of the first conductor portion and the second conductor portion including its extending face (the extending face S3 in the partly laminated structure portion illustrated in FIG. 6 or the extending face S6 in the partly laminated structure portion illustrated in FIG. 7). The insulating film 50 configured as described above suppresses the edge portion from being eluted by the heat generated at the time of discharge and from forming an electrically-conducting path for bridging the distance between the first and second conductor portions, thereby suppressing current from flowing through such an electrically-conducting path (current leakage) in the case that a potential difference is generated between the first and second conductor portions when the element is driven.

In addition, in the case that a potential difference is generated between the first and second conductor portions, the insulating film 50 of the micro movable element X1 suppresses a fraction of the first conductor portion from peeling off from the side face near the edge portion of the first conductor portion. The insulating film 50 configured as described above suppresses current leakage between the first and second conductor portions owing to the movement of the fraction or the bridging of the distance between the first and second conductor portions via the fraction.

Furthermore, in the micro movable element X1, the comb electrodes 13A, 13B, 41 and 42 for generating an electrostatic attractive force serving as a driving force is not covered with the insulating film. For this reason, the charging described above with respect to the micro movable element Y does not occur in the micro movable element X1. In the micro movable element X1 configured as described above, a stable driving force may be generated easily using the comb electrodes 13A, 13B, 41 and 42 serving as driving electrodes. Hence, the micro movable element X1 is suited to accurately control the driving force.

As described above, the micro movable element X1 is suited to suppress current leakage from occurring and also suited to accurately control the driving force generated between the driving electrodes.

Second Embodiment

Figure 13:
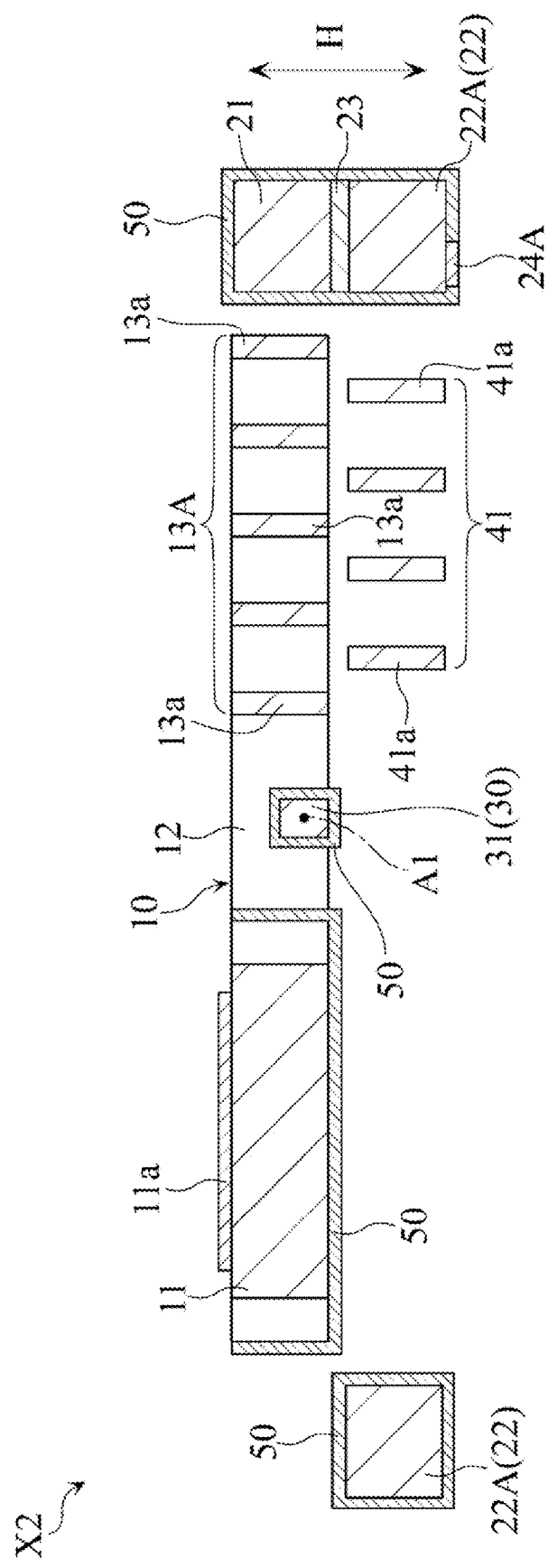
FIG. 13 is a sectional view of a micro movable element according to a second embodiment.
Figure 14:
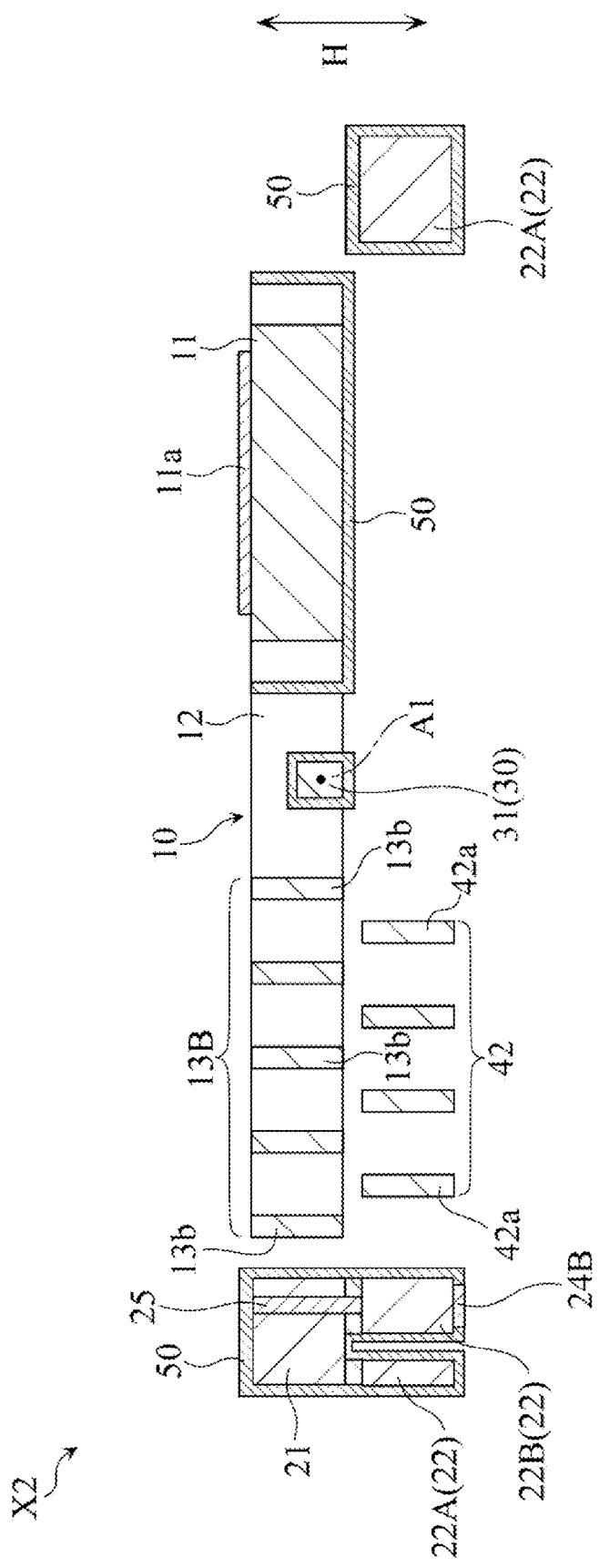
FIG. 14 is another sectional view of the micro movable element according to the second embodiment.
Figure 15:
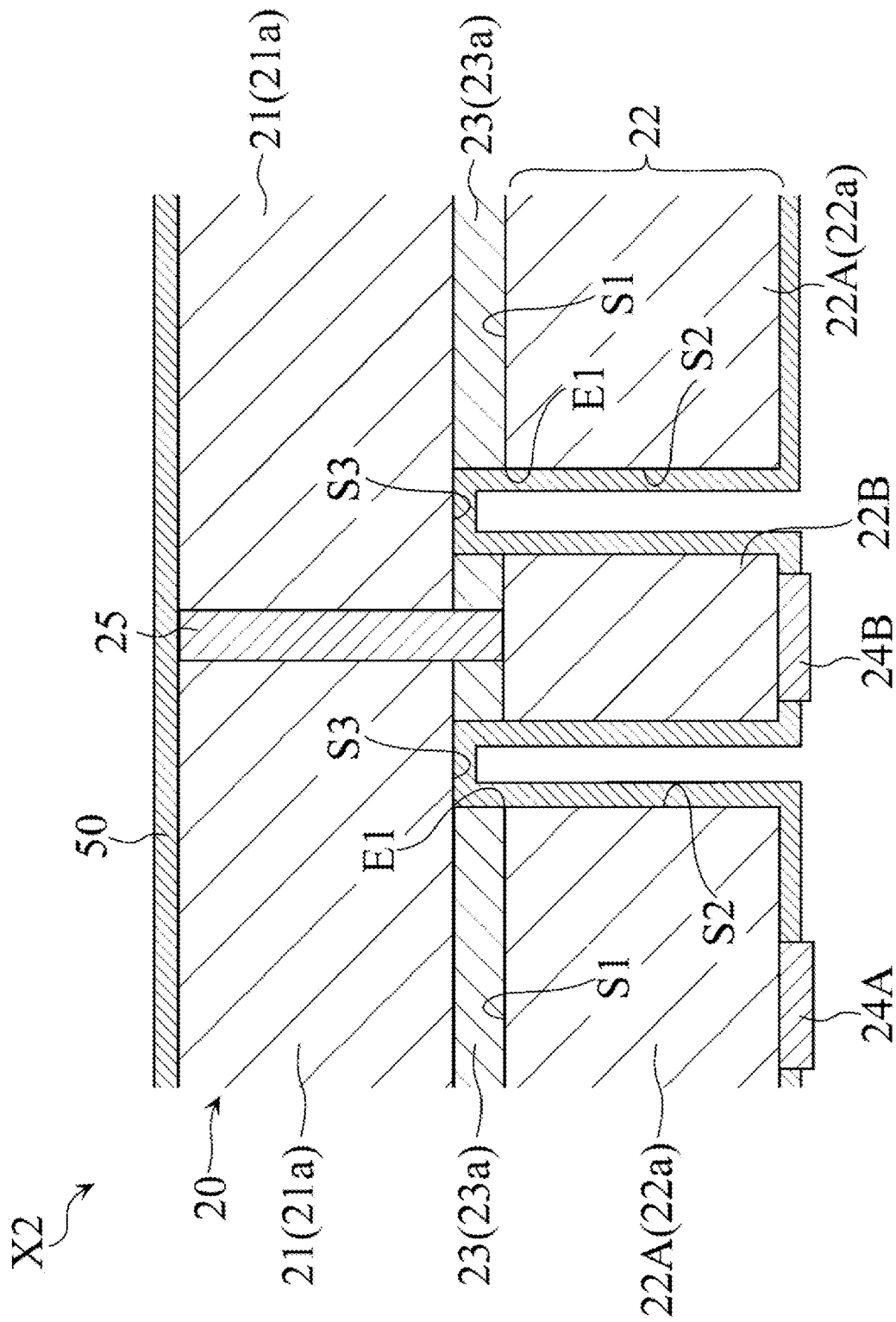
FIG. 15 is still another sectional view of the micro movable element according to the second embodiment.

FIGS. 13 to 16 illustrate a micro movable element X2 according to a second embodiment. FIG. 13 is a sectional view of the micro movable element X2, corresponding to FIG. 3 illustrating the above-mentioned micro movable element X1. FIG. 14 is another sectional view of the micro movable element X2, corresponding to FIG. 4 illustrating the above-mentioned micro movable element X1. FIG. 15 is still another sectional view of the micro movable element X2, corresponding to FIG. 6 illustrating the above-mentioned micro movable element X1. FIG. 16 is yet still another sectional view of the micro movable element X2, corresponding to FIG. 7 illustrating the above-mentioned micro movable element X1.

The micro movable element X2 is a micro movable element equipped with the rocking portion 10, the frame 20, the torsion connection portion 30 and the comb electrodes 41 and 42 as in the case of the micro movable element X1. However, the regions on which the insulating film 50 is formed are different from those in the micro movable element X1. In the micro movable element X2, the insulating film 50 does not cover the face of the mirror-supporting portion 11 on which the mirror face 11a is formed, the comb electrodes 13A, 13B, 41 and 42 and the electrode pads 24A and 24B on the surface of the second layer portion 22 of the frame 20.

In the production of the micro movable element X2 configured as described above, the sequence of the steps described above referring to FIGS. 8A to 10A for the production of the micro movable element X1 is carried out first.

Figure 17A:
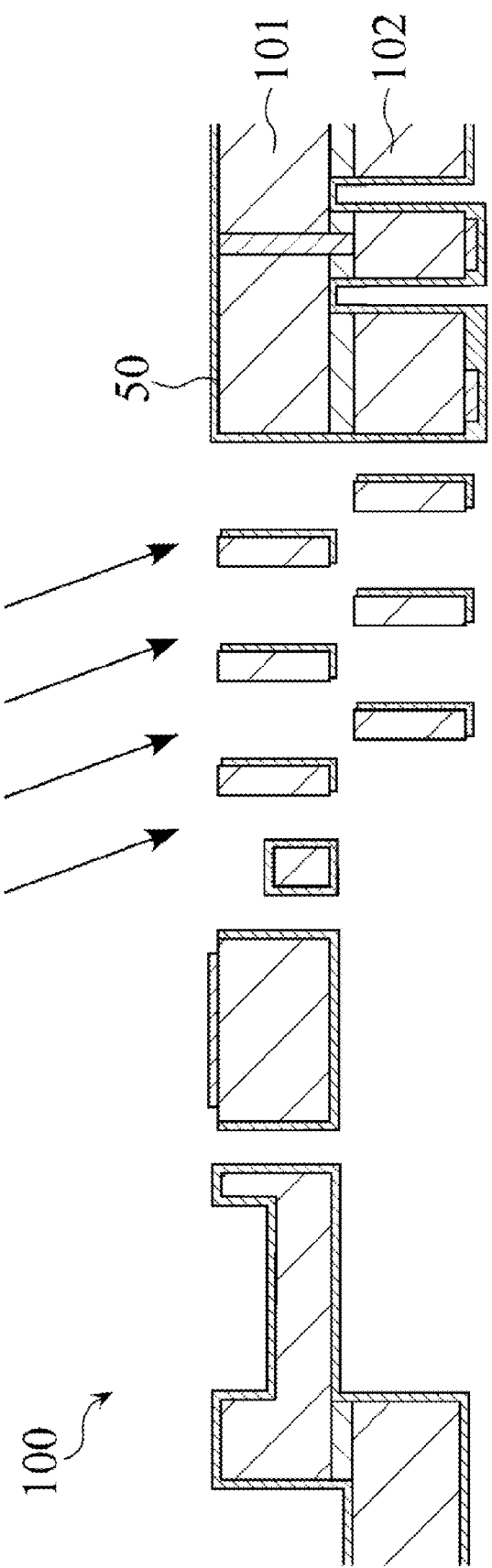
FIGS. 17A and 17B illustrate some steps in a method for producing the micro movable element according to the second embodiment.
Figure 18:
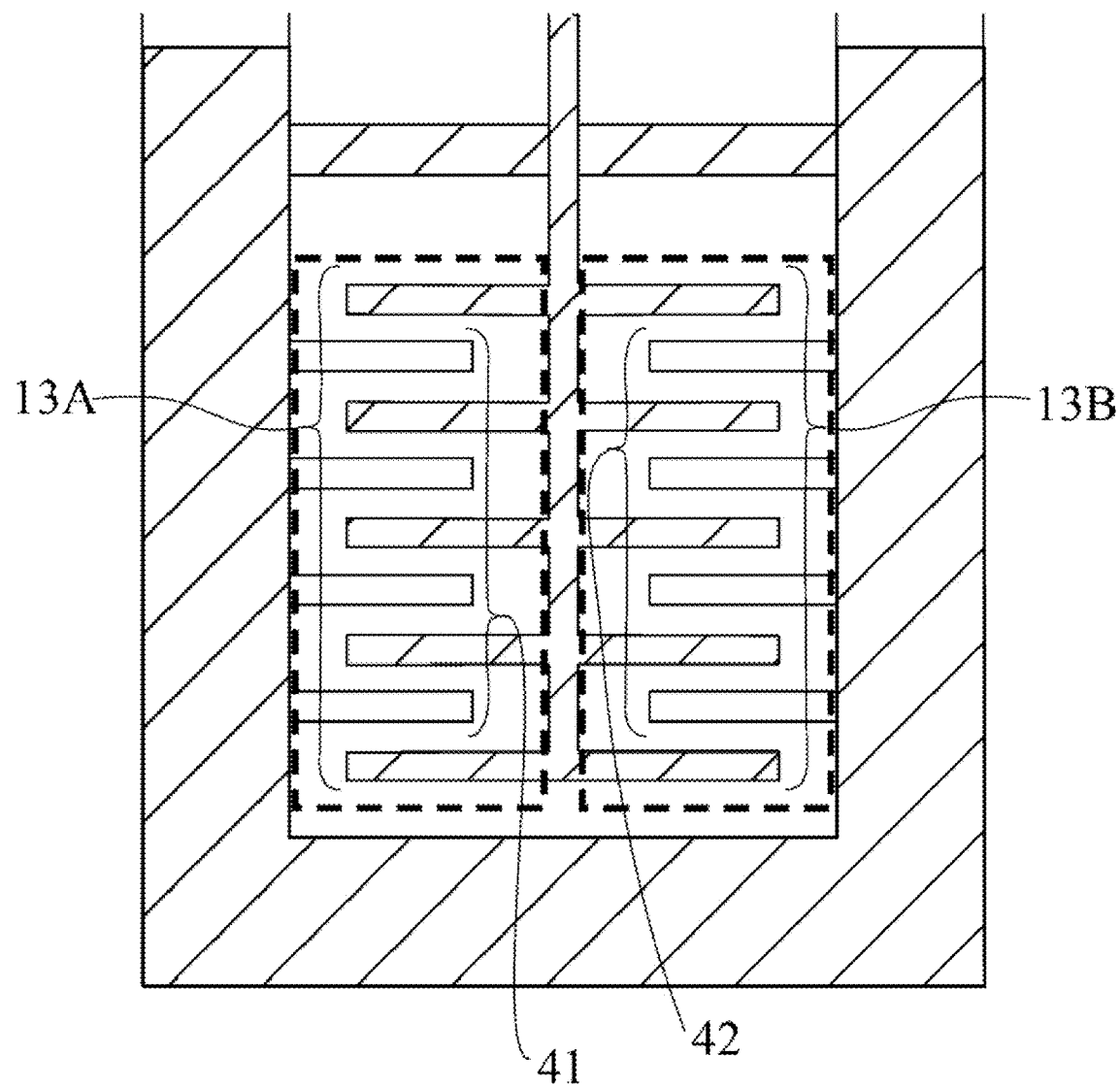
FIG. 18 is a plan view illustrating irradiation regions near comb electrodes at a laser beam irradiation step in the method for producing the micro movable element according to the second embodiment.

Next, as illustrated in FIG. 17A, the insulating film 50 is partially removed by irradiating a laser beam to the silicon layer 101 of the material substrate 100. More specifically, a laser beam is irradiated to regions, from which the insulating film 50 is desired to be removed, via a mask (not illustrated) having openings, thereby removing the insulating film 50 from the irradiated sites. FIG. 18 is a plan view of the element, in which the laser beam irradiated regions at this step are indicated so as to be enclosed by broken lines. The laser beam irradiation in a micro movable element forming compartment may be carried out once or in multiple times. It is preferable to use the excimer laser beam as the laser beam. It is also preferable that the laser beam irradiation to at least the comb electrodes E1 and E2 (the comb electrodes 13A, 13B, 41 and 42) is inclined with respect to the thickness direction of the material substrate 100 as indicated by inclined arrows in FIG. 17A. The irradiation direction is inclined to properly remove the insulating film 50 covering the side faces of the comb electrodes E1 and E2.

Figure 17B:
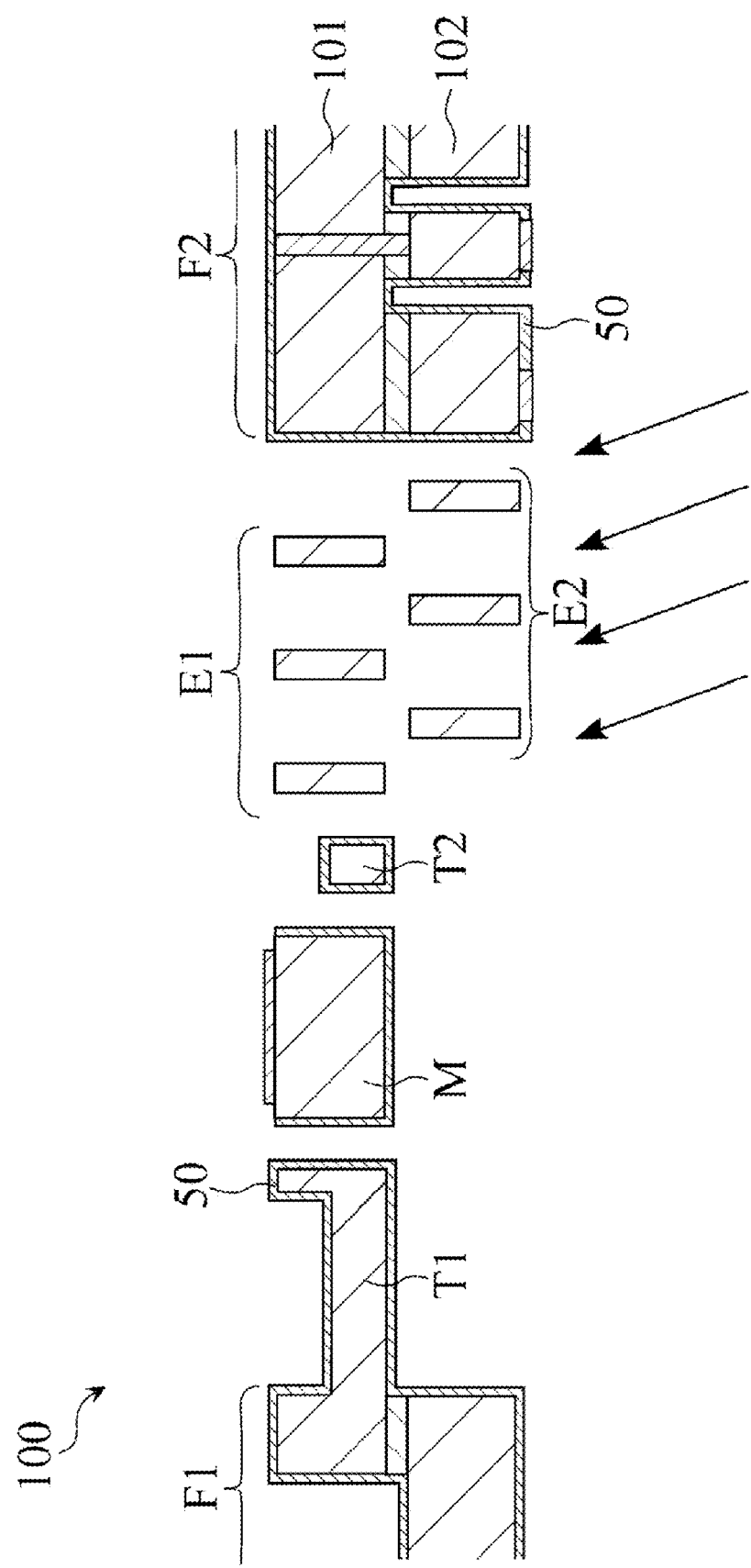

Next, as illustrated in FIG. 17B, the insulating film 50 is partially removed by irradiating a laser beam to the silicon layer 102 of the material substrate 100. More specifically, a laser beam is irradiated to regions, from which the insulating film 50 is desired to be removed, via a mask (not illustrated) having openings, thereby removing the insulating film 50 from the irradiated sites. It is preferable that the laser beam irradiation to at least the comb electrodes E1 and E2 (the comb electrodes 13A, 13B, 41 and 42) is inclined with respect to the thickness direction of the material substrate 100 as indicated by inclined arrows in FIG. 17B. The irradiation direction is inclined to properly remove the insulating film 50 covering the side faces of the comb electrodes E1 and E2.

The mirror-supporting portion M, the arm portion AR, the frames F1 and F2, the torsion bars T1 and T2 and one set of the comb electrodes E1 and E2 are formed and the insulating film 50 is also formed so as to remain by carrying out the sequence of the above-mentioned steps, whereby the micro movable element X2 may be produced.

The micro movable element X2 configured as described above may perform rocking operation in a way similar to that for the micro movable element X1.

Furthermore, in the micro movable element X2, the edge portions of the partly laminated structure portion are covered with the insulating film 50, but the comb electrodes 13A, 13B, 41 and 42 are not covered with the insulating film 50. Hence, because of reasons similar to those described above with respect to the micro movable element X1, the micro movable element X2 is suited to suppress current leakage from occurring and also suited to accurately control the driving force generated between the driving electrodes when the element is driven.

Third Embodiment

Figure 19:
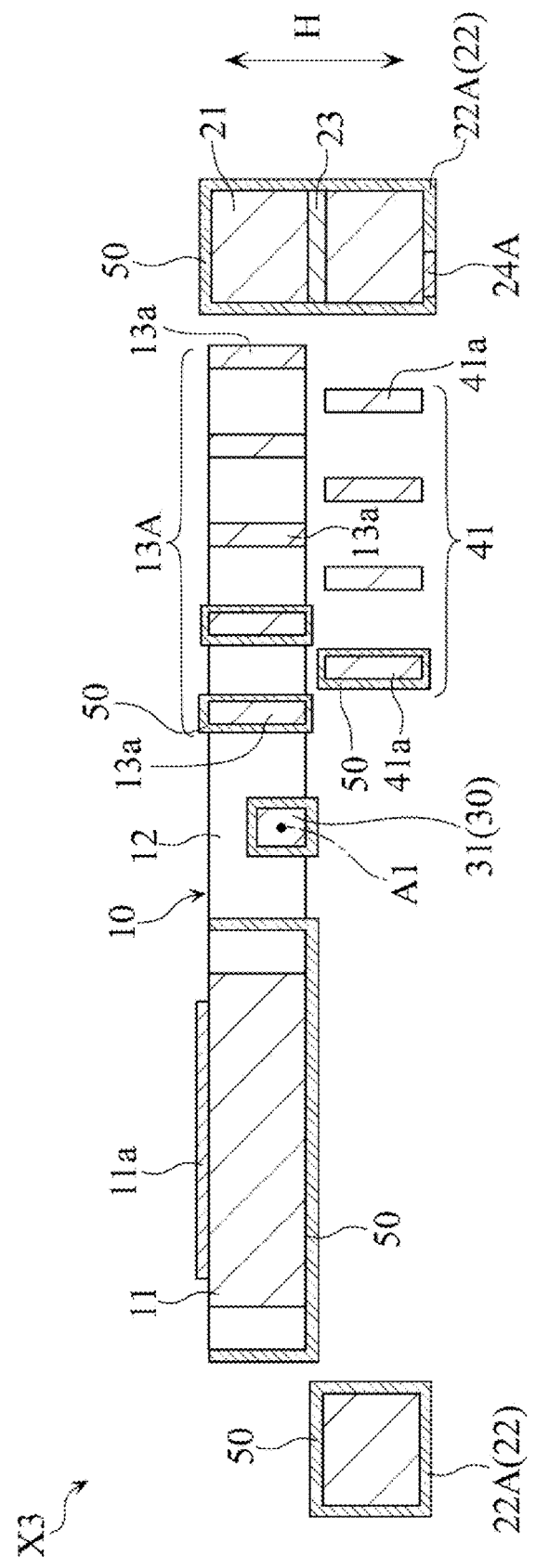
FIG. 19 is a sectional view of a micro movable element according to a third embodiment.
Figure 20:
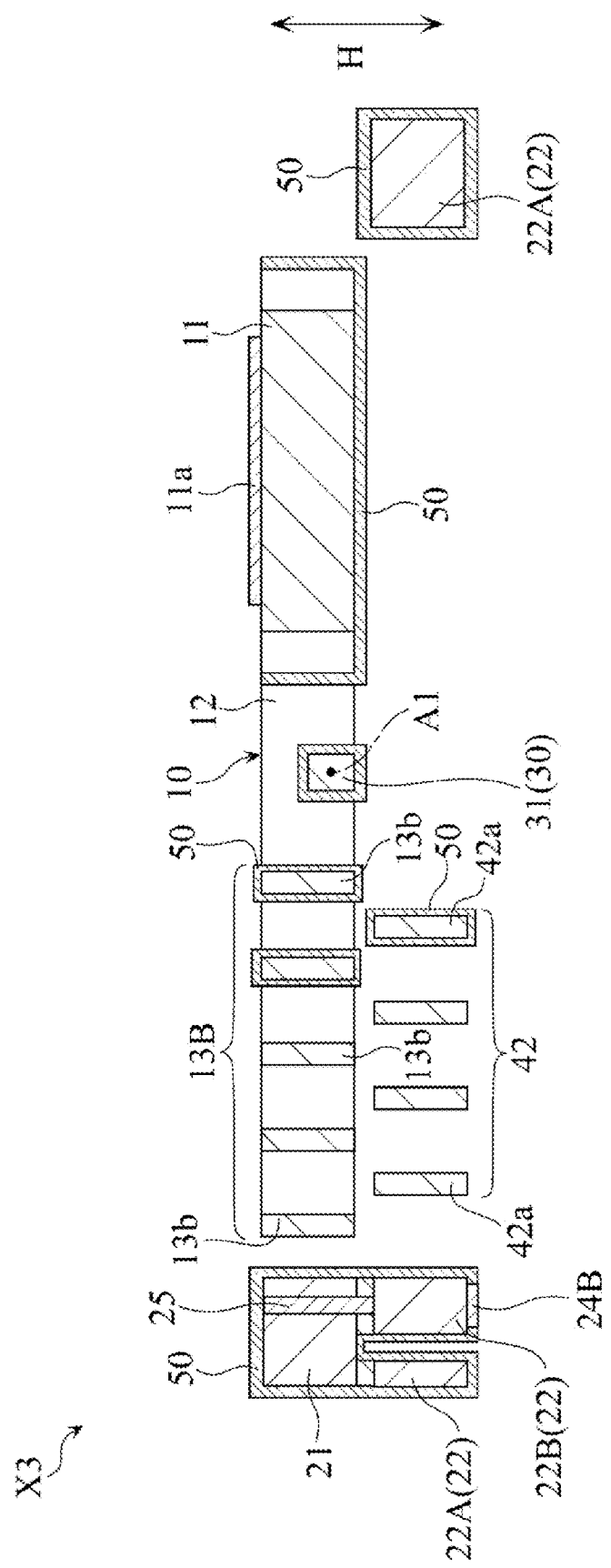
FIG. 20 is another sectional view of the micro movable element according to the third embodiment.

FIGS. 19 to 20 illustrate a micro movable element X3 according to a third embodiment. FIG. 19 is a sectional view of the micro movable element X3, corresponding to FIG. 3 illustrating the above-mentioned micro movable element X1 and also corresponding to FIG. 13 illustrating the above-mentioned micro movable element X2. FIG. 20 is another sectional view of the micro movable element X3, corresponding to FIG. 4 illustrating the above-mentioned micro movable element X1 and also corresponding to FIG. 14 illustrating the above-mentioned micro movable element X2.

The micro movable element X3 is a micro movable element equipped with the rocking portion 10, the frame 20, the torsion connection portion 30 and the comb electrodes 41 and 42 as in the case of the micro movable elements X1 and X2. However, the regions on which the insulating film 50 is formed are different from those in the micro movable elements X1 and X2. In the micro movable element X3, the insulating film 50 does not cover the face of the mirror-supporting portion 11 on which the mirror face 11a is formed, parts of the comb electrodes 13A, 13B, 41 and 42 and the electrode pads 24A and 24B on the surface of the second layer portion 22 of the frame 20. Furthermore, in the micro movable element X3, some of the electrode teeth 13a on the side of the axial center line A1 among the multiple electrode teeth 13a of the comb electrode 13A are covered with the insulating film 50, some of the electrode teeth 13b on the side of the axial center line A1 among the multiple electrode teeth 13b of the comb electrode 13B are covered with the insulating film 50, some of the electrode teeth 41a on the side of the axial center line A1 among the multiple electrode teeth 41a of the comb electrode 41 are covered with the insulating film 50, and some of the electrode teeth 42a on the side of the axial center line A1 among the multiple electrode teeth 42a of the comb electrode 42 are covered with the insulating film 50.

Figure 21:
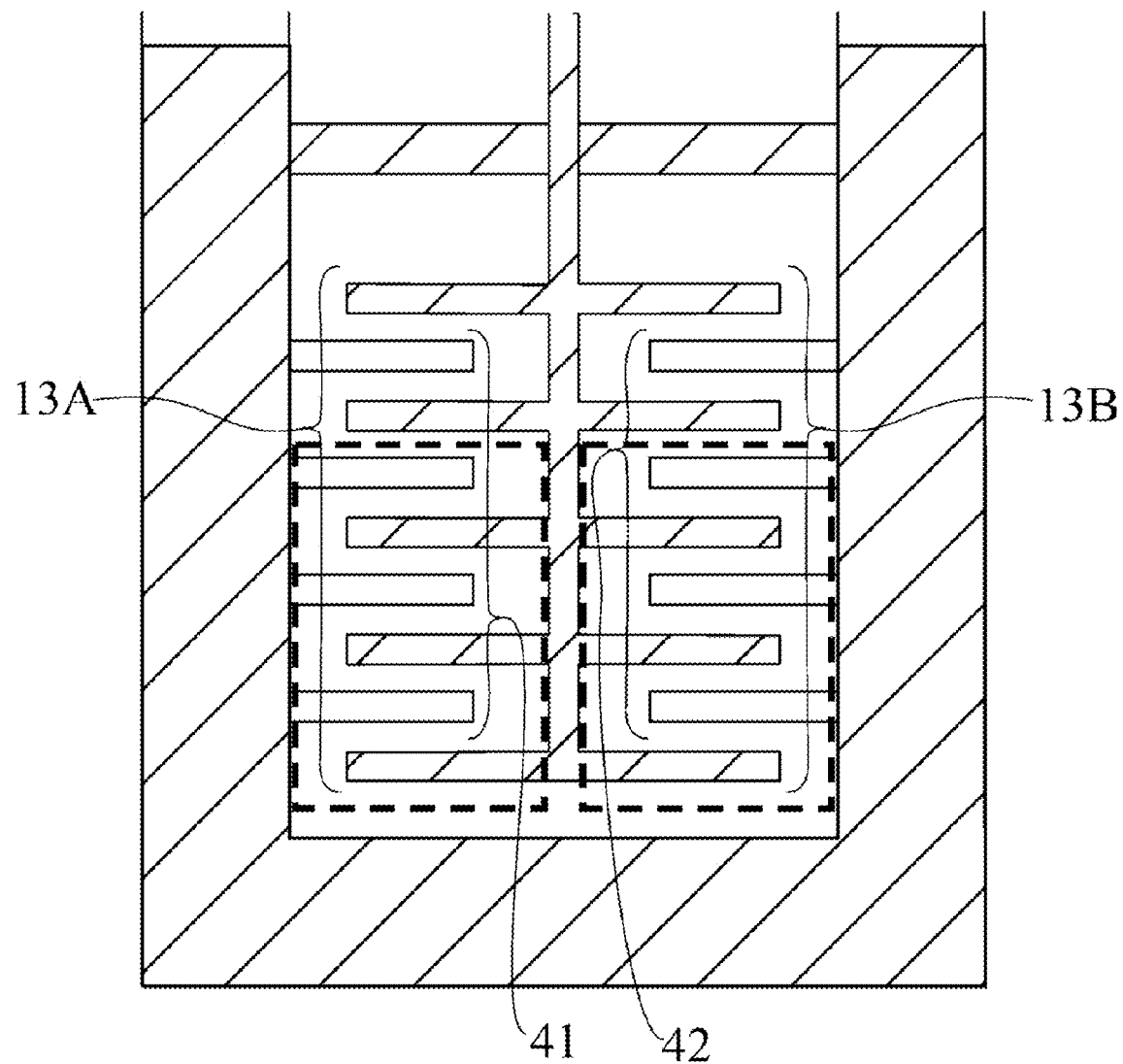
FIG. 21 is a plan view illustrating irradiation regions near comb electrodes at a laser beam irradiation step in a method for producing the micro movable element according to the third embodiment.

The micro movable element X3 configured as described above may be produced in a way similar to that for the micro movable element X2 except that the regions illustrated in FIG. 18 and irradiated at the laser beam irradiation step described above referring to FIGS. 17A and 17B are changed to the regions illustrated in FIG. 21 (the regions enclosed by broken lines).

Figure 22:
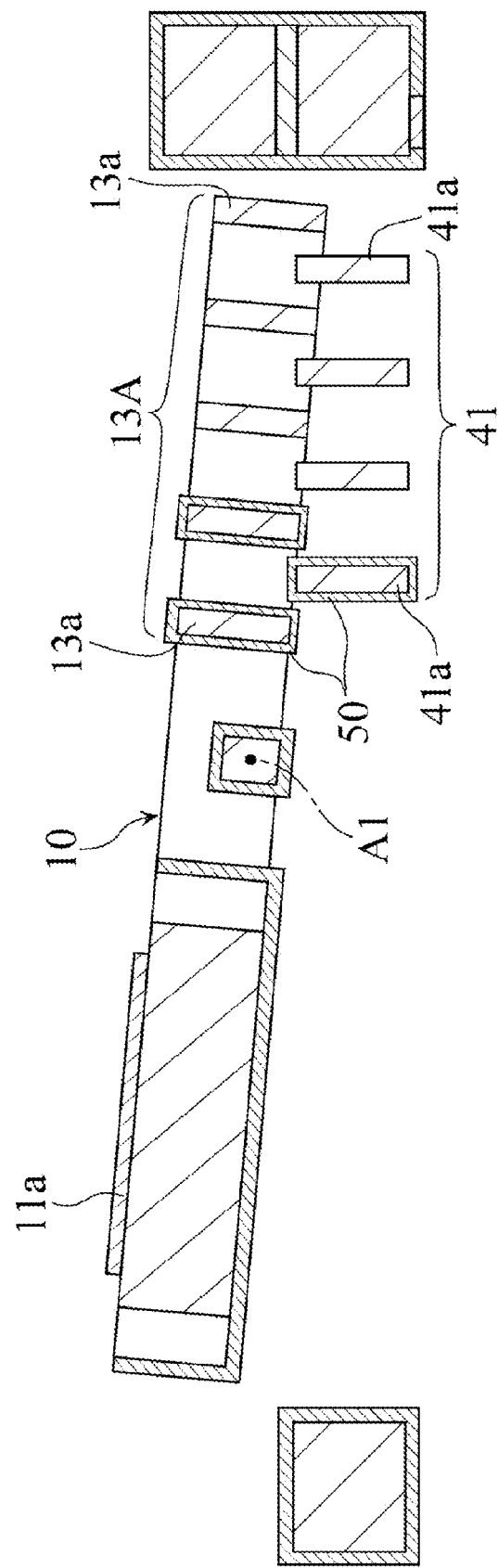
FIG. 22 illustrates the micro movable element illustrated in FIG. 19 at the time of driving.

The micro movable element X3 produced as described above may be driven, for example, as illustrated in FIG. 22 in a way similar to that for the micro movable element X1.

Furthermore, in the micro movable element X3, the edge portions of the partly laminated structure portion are covered with the insulating film 50, but parts of the comb electrodes 13A, 13B, 41 and 42 are not covered with the insulating film 50. Hence, because of reasons similar to those described above with respect to the micro movable element X1, the micro movable element X3 is suited to suppress current leakage from occurring and also suited to accurately control the driving force generated between the driving electrodes when the element is driven. As the electrode teeth 13a, 14a, 41a and 42a of the comb electrodes 13A, 13B, 41 and 42 are disposed closer to the axial center line A1, the extent to which the electrode teeth substantially overlap with those opposed thereto at the time of driving is smaller. Even if the electrode teeth configured as described above are coated with the insulating film 50, the extent of the charging generated on the insulating film 50 is considerably small in many cases. In such a case, it may be possible that some of the electrode teeth inside a single comb electrode are covered with an insulating film as in the case of the micro movable element X3.

Fourth Embodiment

Figure 23:
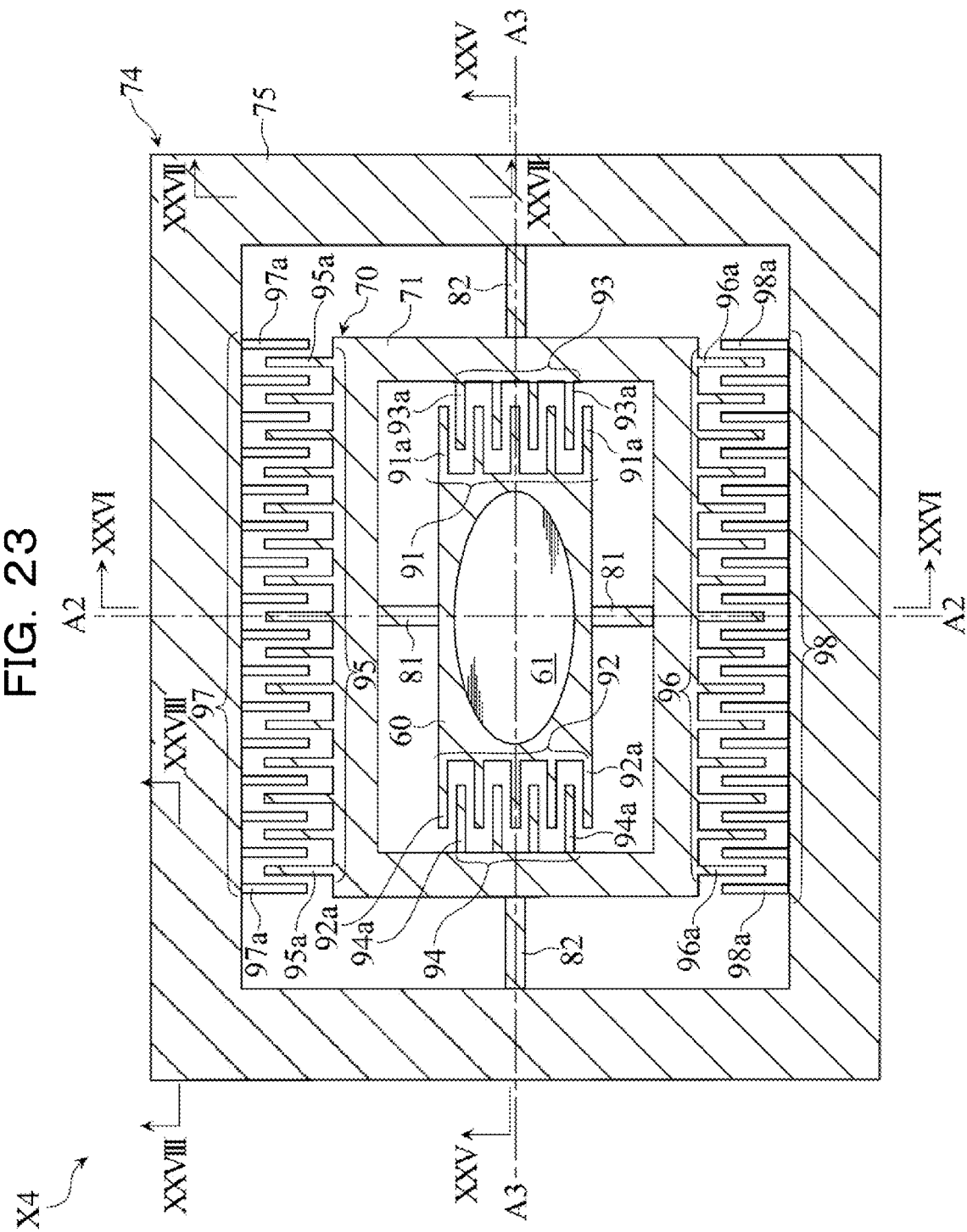
FIG. 23 is a plan view of a micro movable element according to a fourth embodiment.
Figure 24:
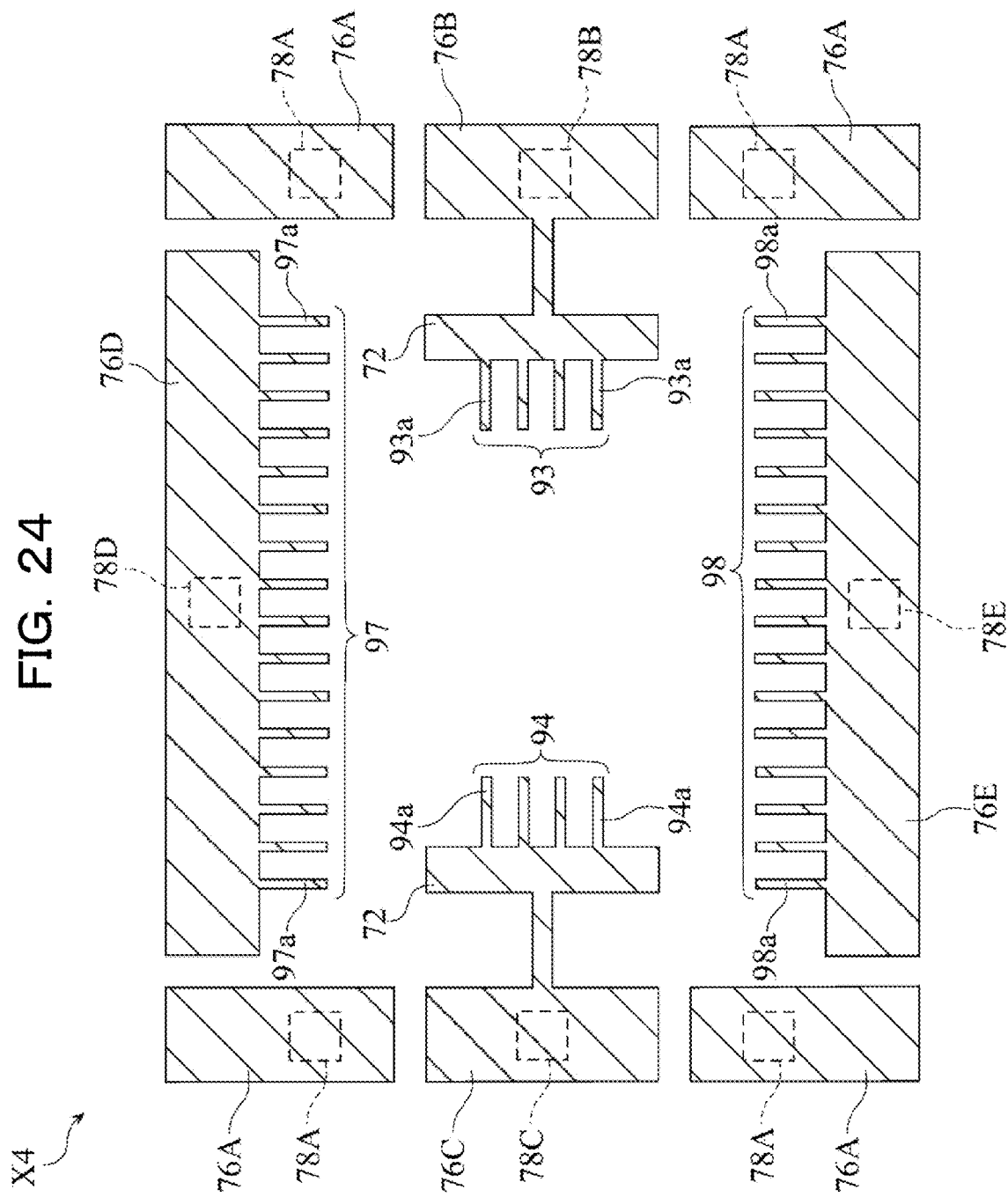
FIG. 24 is a partially omitted plan view of the micro movable element illustrated in FIG. 23.
Figure 25:
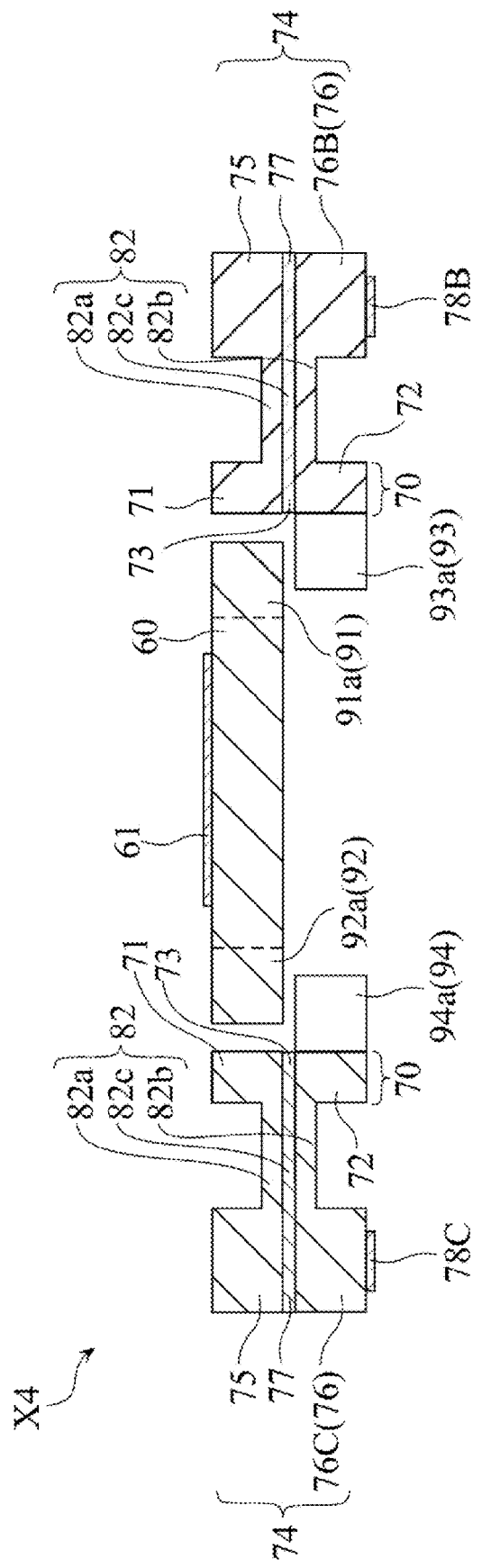
FIG. 25 is a sectional view taken on line XXV-XXV of FIG. 23.
Figure 26:
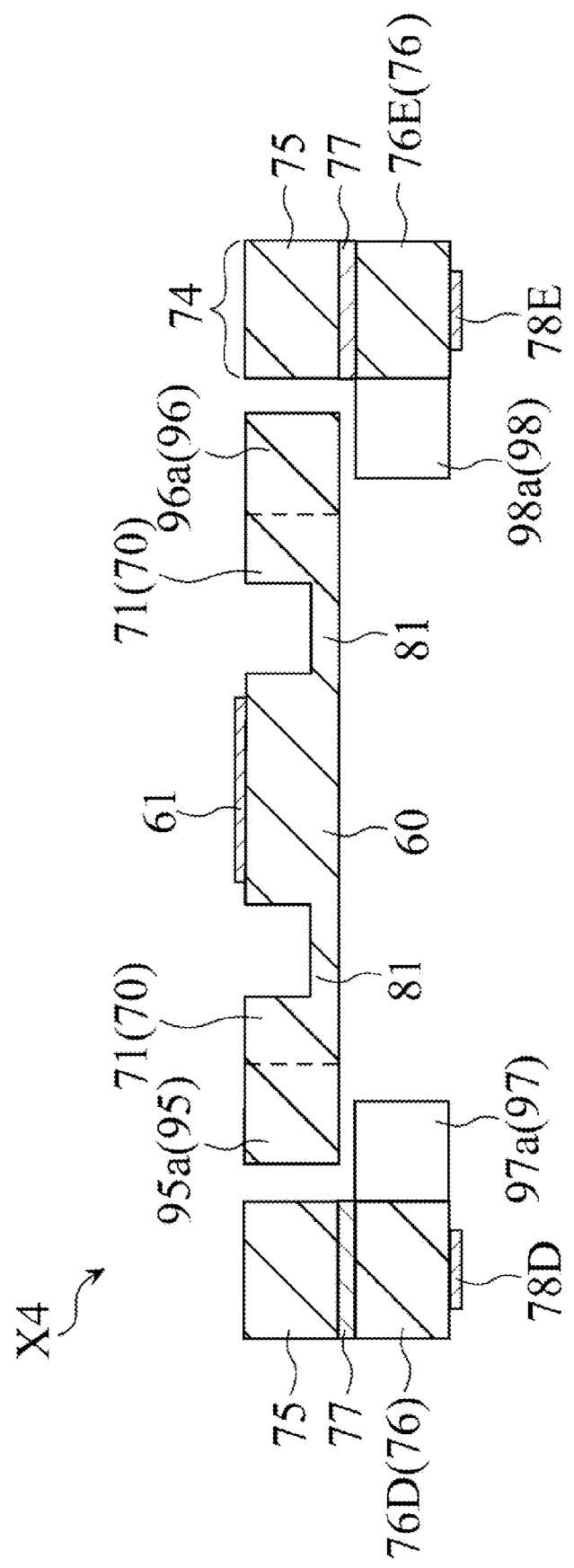
FIG. 26 is a sectional view taken on line XXVI-XXVI of FIG. 23.
Figure 27:
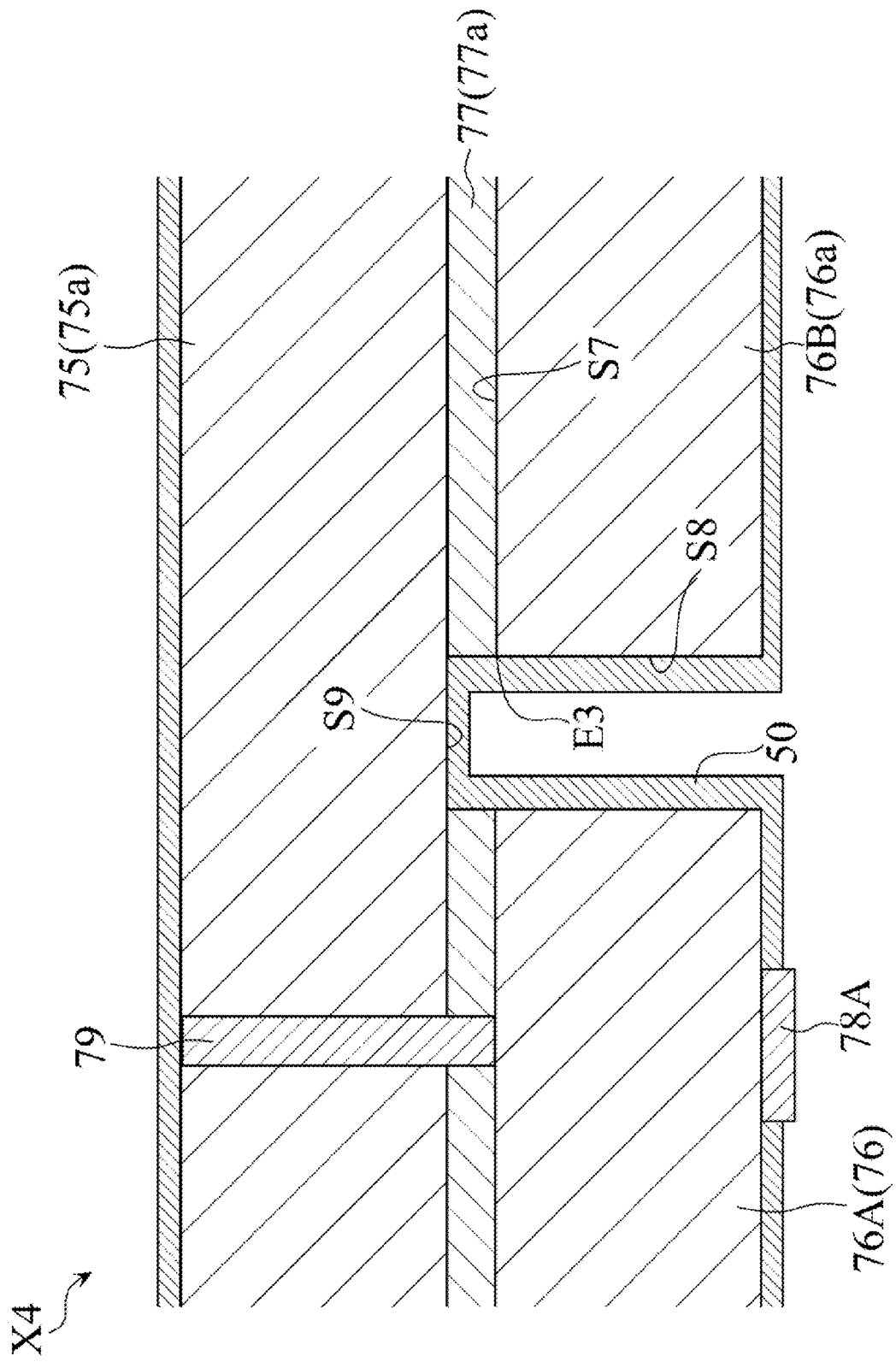
FIG. 27 is a sectional view taken on line XXVII-XXVII of FIG. 23.
Figure 28:
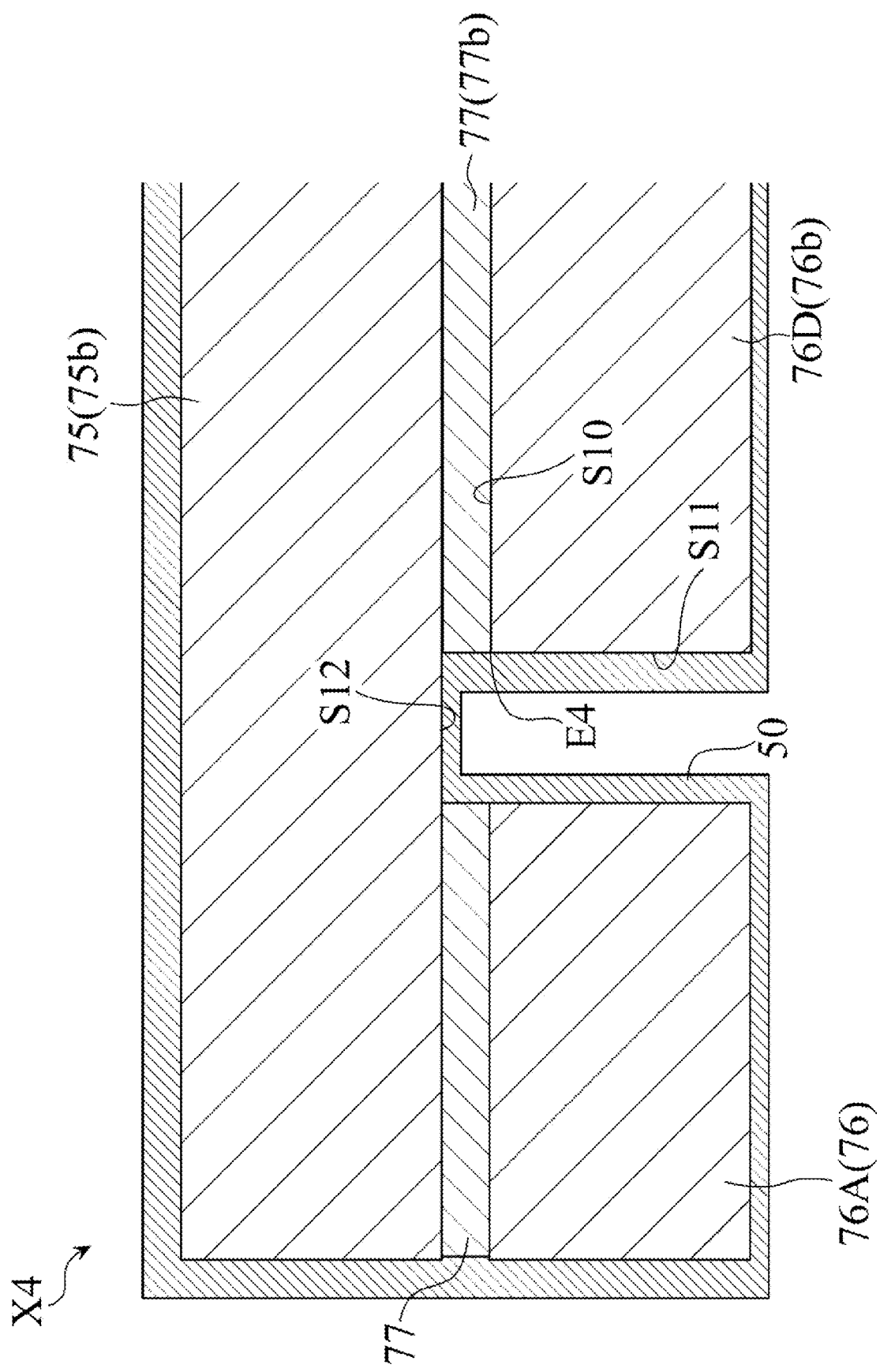
FIG. 28 is an enlarged sectional view taken on line XXVIII-XXVIII of FIG. 23.

FIGS. 23 to 28 illustrate a micro movable element X4 according to a fourth embodiment. FIG. 23 is a plan view of the micro movable element X4. FIG. 24 is a partially omitted plan view of the micro movable element X4. FIGS. 25 and 26 are sectional views taken on line XXV-XXV and line XXVI-XXVI of FIG. 23, respectively. FIGS. 27 and 28 are enlarged sectional views taken on line XXVII-XXVII and line XXVIII-XXVIII of FIG. 23, respectively.

The micro movable element X4 is a micromirror element equipped with a movable function portion 60, an inner frame 70, an outer frame 74, a pair of torsion bars 81, a pair of torsion bars 82, comb electrodes 91, 92, 93, 94, 95, 96, 97 and 98 and an insulating film 50. The micro movable element X4 is produced by processing a material substrate serving as an SOI substrate using the bulk micromachining technology, such as the MEMS technology. The material substrate has a laminated structure comprising first and second silicon layers and an intermediate insulating layer disposed between the silicon layers, and electrical conductivity is imparted to the silicon layers by impurity doping. The above-mentioned portions except for the insulating film 50 in the micro movable element X4 are portions mainly derived from the first silicon layer and/or the second silicon layer. However, in FIG. 23, for the sake of clarification of the drawing, the portions derived from the first silicon layer and protruding upright from the intermediate insulating layer toward the front side of the sheet of the drawing are hatched with oblique lines. Furthermore, FIG. 24 illustrates a structure derived from the second silicon layer of the micro movable element X4.

The movable function portion 60 is a portion derived from the first silicon layer, and its surface is provided with a mirror face 61 having a light-reflecting function. The mirror face 61 has, for example, a laminated structure having a Cr layer formed on the first silicon layer and an Au layer formed thereon.

The inner frame 70 has a laminated structure including a first layer portion 71, a second layer portion 72 and an insulating layer 73 disposed therebetween as illustrated in FIG. 25. The first layer portion 71 is a portion derived from the first silicon layer and has a shape enclosing the movable function portion 60 as illustrated in FIG. 23. The second layer portion 72 is a portion derived from the second silicon layer.

The outer frame 74 has a shape enclosing the inner frame 70 as illustrated in FIG. 23, and has a laminated structure including a first layer portion 75, a second layer portion 76 and an insulating layer 77 disposed therebetween as illustrated in FIGS. 25 and 26. The first layer portion 75 is a portion derived from the first silicon layer. The second layer portion 76 is a portion derived from the second silicon layer. The second layer portion 76 includes land portions 76A, 76B, 76C, 76D and 76E that are separated mutually by a space as illustrated in FIG. 24. Electrode pads 78A, 78B, 78C, 78D and 78E for external connection are provided on the surfaces of the land portions 76A, 76B, 76C, 76D and 76E, respectively. The land portion 76A is electrically connected to the first layer portion 75 via a conductive plug 79 passing through the insulating layer 77.

Each of the pair of torsion bars 81 is thinner than that of the movable function portion 60 as well illustrated in FIG. 26 and is connected to the movable function portion 60 and the first layer portion 71 of the inner frame 70. The pair of torsion bars 81 determines the axial center line A2 of the rotation operation of the movable function portion 60.

Each of the pair of torsion bars 82 has a laminated structure including a first layer portion 82a derived from the first silicon layer, a second layer portion 82b derived from the second silicon layer and an insulating layer 82c disposed therebetween as illustrated in FIG. 25. The first layer portion 82a is electrically isolated from the second layer portion 82b using the insulating layer 82c. The first layer portion 82a of each of the pair of torsion bars 82 is connected to the first layer portion 71 of the inner frame 70 and the first layer portion 75 of the outer frame 74. The second layer portion 82b of one of the torsion bars 82 is connected to one of the second layer portions 72 of the inner frame 70 and to the land portion 76B of the second layer portion 76 of the outer frame 74. The second layer portion 82b of the other torsion bar 82 is connected to the other second layer portions 72 of the inner frame 70 and the land portion 76C of the second layer portion 76 of the outer frame 74. The pair of torsion bars 82 configured as described above determines the axial center line A3 of the rotation operation of the inner frame 70 and the rotation operation of the movable function portion 60 associated therewith.

The comb electrode 91 is a portion derived from the first silicon layer and includes multiple electrode teeth 91a extending from the movable function portion 60. The electrode teeth 91a are arranged in parallel while being spaced mutually in the direction of the axial center line A2. The comb electrode 92 is a portion derived from the first silicon layer and includes multiple electrode teeth 92a extending from the movable function portion 60 on the opposite side of the electrode teeth 91a of the comb electrode 91. The electrode teeth 92a are arranged in parallel while being spaced mutually in the direction of the axial center line A2.

The comb electrode 93 is a portion that cooperates with the comb electrode 91 to generate an electrostatic attractive force and includes multiple electrode teeth 93a derived from the second silicon layer. The respective multiple electrode teeth 93a extend from one of the second layer portions 72 of the inner frame 70 toward the inside of the element and are arranged in parallel while being spaced mutually in the direction of the axial center line A2. The drive mechanism of the element has the comb electrode 93 and the comb electrode 91. The comb electrodes 91 and 93 are positioned at heights different from each other as illustrated in FIG. 25, for example, when the movable function portion 60 is not operating. In addition, the comb electrodes 91 and 93 are disposed so that their electrode teeth 91a and 93a are displaced so as not to make mutual contact when the movable function portion 60 is operating.

The comb electrode 94 is a portion that cooperates with the comb electrode 92 to generate an electrostatic attractive force and includes multiple electrode teeth 94a derived from the second silicon layer. The respective multiple electrode teeth 94a extend from the other second layer portion 72 of the inner frame 70 toward the inside of the element and are arranged in parallel while being spaced mutually in the direction of the axial center line A2. The drive mechanism of the element has the comb electrode 94 and the comb electrode 92. The comb electrodes 92 and 94 are positioned at heights different from each other as illustrated in FIG. 25, for example, when the movable function portion 60 is not operating. In addition, the comb electrodes 92 and 94 are disposed so that their electrode teeth 92a and 94a are displaced so as not to make mutual contact when the movable function portion 60 is operating.

The comb electrode 95 is a portion derived from the first silicon layer and includes multiple electrode teeth 95a extending from the first layer portion 71 of the inner frame 70 to the outside of the element. The electrode teeth 95a are arranged in parallel while being spaced mutually in the direction of the axial center line A3. The comb electrode 96 is a portion derived from the first silicon layer and includes multiple electrode teeth 96a extending from the first layer portion 71 of the inner frame 70 on the opposite side of the electrode teeth 95a of the comb electrode 95. The electrode teeth 96a are arranged in parallel while being spaced mutually in the direction of the axial center line A3.

The comb electrode 97 is a portion that cooperates with the comb electrode 95 to generate an electrostatic attractive force and includes multiple electrode teeth 97a derived from the second silicon layer. The respective multiple electrode teeth 97a extend from the land portion 76D of the second layer portion 76 of the outer frame 74 toward the inside of the element and are arranged in parallel while being spaced mutually in the direction of the axial center line A3. The drive mechanism of the element has the comb electrode 97 and the comb electrode 95. The comb electrodes 95 and 97 are positioned at heights different from each other as illustrated in FIG. 26, for example, when the inner frame 70 is not operating. In addition, the comb electrodes 95 and 97 are disposed so that their electrode teeth 95a and 97a are displaced so as not to make mutual contact when the element is operating.

The comb electrode 98 is a portion that cooperates with the comb electrode 96 to generate an electrostatic attractive force and includes multiple electrode teeth 98a derived from the second silicon layer. The respective multiple electrode teeth 98a extend from the land portion 76E of the second layer portion 76 of the outer frame 74 toward the inside of the element and are arranged in parallel while being spaced mutually in the direction of the axial center line A3. The drive mechanism of the element has the comb electrode 98 and the comb electrode 96. The comb electrodes 96 and 98 are positioned at heights different from each other as illustrated in FIG. 26, for example, when the inner frame 70 is not operating. In addition, the comb electrodes 96 and 98 are disposed so that their electrode teeth 96a and 98a are displaced so as not to make mutual contact when the element is operating.

In the micro movable element X4, the insulating film 50 does not cover the face of the movable function portion 60 on which the mirror face 61 is formed, the comb electrodes 91, 92, 93, 94, 95, 96, 97 and 98 and the electrode pads 78A to 78E on the surface of the second layer portion 76 of the outer frame 74. The insulating film 50 is not illustrated in figures other than FIGS. 27 and 28 for the sake of simplicity of the drawings.

The micro movable element X4 includes a partly laminated structure portion according to this embodiment as illustrated in FIGS. 27 and 28, for example.

The partly laminated structure portion illustrated in FIG. 27 has a conductor portion 75a, a conductor portion 76a and an intermediate insulating portion 77a. The first layer portion 75 of the outer frame 74 includes the conductor portion 75a. The land portion 76B of the second layer portion 76 includes the conductor portion 76a. The intermediate insulating layer 77 includes the intermediate insulating portion 77a. The conductor portion 75a (the first layer portion 75) is electrically connected to the comb electrode 91 via the first layer portion 82a of the torsion bar 82, the first layer portion 71 of the inner frame 70, the torsion bar 81 and the movable function portion 60. The conductor portion 76a (the land portion 76B of the second layer portion 76) is electrically connected to the comb electrode 93 via the second layer portion 82b of the torsion bar 82 and the second layer portion 72 of the inner frame 70. The conductor portion 75a is electrically isolated from the conductor portion 76a. Furthermore, the conductor portion 76a has an opposed face S7 opposed to the conductor portion 75a, a side face S8 and an edge portion E3 forming the boundary therebetween. The conductor portion 75a has an extending face S9 extending beyond the edge portion E3 of the conductor portion 76a. The insulating film 50 is provided so as to cover the edge portion E3 of the conductor portion 76a.

The partly laminated structure portion illustrated in FIG. 28 has a conductor portion 75b, a conductor portion 76b and an intermediate insulating portion 77b. The first layer portion 75 of the outer frame 74 includes the conductor portion 75b. The land portion 76D of the second layer portion 76 includes the conductor portion 76b. The intermediate insulating layer 77 includes the intermediate insulating portion 77b. The conductor portion 75b (the first layer portion 75) is electrically connected to the comb electrode 95 via the first layer portion 82a of the torsion bar 82 and the first layer portion 71 of the inner frame 70. The conductor portion 76b (the land portion 76D of the second layer portion 76) is electrically connected to the comb electrode 97. The conductor portion 75b is electrically isolated from the conductor portion 76b. Furthermore, the conductor portion 76b has an opposed face S10 opposed to the conductor portion 75b, a side face S11 and an edge portion E4 forming the boundary therebetween. The conductor portion 75b has an extending face S12 extending beyond the edge portion E4 of the conductor portion 76b. The insulating film 50 is provided so as to cover the edge portion E4 of the conductor portion 76b.

The insulating film 50 is provided so as to cover the edge portion (a portion in which a level difference is formed between a portion derived from the first silicon layer and a portion derived from the second silicon layer and in which a potential difference is generated between the portion derived from the first silicon layer and the portion derived from the second silicon layer in this embodiment) of the partly laminated structure portion included in the micro movable element X4 as illustrated in FIGS. 27 and 28. The insulating film 50 is made of, for example, parylene, silicon oxide or silicon nitride. The thickness of the insulating film 50 is, for example, 10 to 500 nm.

In the micro movable element X4, the movable function portion 60 may be rotationally displaced around the axial center line A2 by applying potentials to the comb electrodes 91, 92, 93 and 94 as necessary. The potentials to be applied to the comb electrodes 91 and 92 may be applied via the electrode pad 78A, the land portion 76A of the second layer portion 76 of the outer frame 74, the conductive plug 79, the first layer portion 75 of the outer frame 74, the first layer portions 82a of both the torsion bars 82, the first layer portion 71 of the inner frame 70, both the torsion bars 81 and the movable function portion 60. The comb electrodes 91 and 92 are connected to the ground, for example. The potential to be applied to the comb electrode 93 may be applied via the electrode pad 78B, the land portion 76B of the second layer portion 76 of the outer frame 75, the second layer portion 82b of one of the torsion bars 82 and one of the second layer portions 72 of the inner frame 70. The potential to be applied to the comb electrode 94 may be applied via the electrode pad 78C, the land portion 76C of the second layer portion 76 of the outer frame 75, the second layer portion 82b of the other torsion bar 82 and the other second layer portion 72 of the inner frame 70.

In the micro movable element X4, the inner frame 70 may be rotationally displaced and the movable function portion 60 may also be rotationally displaced while being associated with the displacement of the inner frame 70 around the axial center line A3 by applying potentials to the comb electrodes 95, 96, and 98 as necessary. The potentials to be applied to the comb electrodes 95 and 96 may be applied via the electrode pad 78A, the land portion 76A of the second layer portion 76 of the outer frame 74, the conductive plug 79, the first layer portion 75 of the outer frame 74, the first layer portions 82a of both the torsion bars 82 and the first layer portion 71 of the inner frame 70. The comb electrodes 95 and 96 are connected to the ground, for example. The potential to be applied to the comb electrode 97 may be applied via the electrode pad 78D and the land portion 76D of the second layer portion 76 of the outer frame 75. The potential to be applied to the comb electrode 98 may be applied via the electrode pad 78E and the land portion 76E of the second layer portion 76 of the outer frame 75.

In the micro movable element X4, the reflection direction of the light reflected using the mirror face 61 provided on the movable function portion 60 may be changed as necessary by the rocking operations of the movable function portion 60 and the inner frame 70 owing to the rotational displacements thereof around the axial center lines A2 and A3.

The micro movable element X4 is configured as a sensing device, such as an acceleration sensor or an angular velocity sensor. In the case that the micro movable element X4 is a sensing device, it is not necessary to provide the mirror face on the movable function portion 60.

When the micro movable element X4 configured as a sensing device is driven, for example, the movable portions (the movable function portion 60, the inner frame 70 and the comb electrodes 91 to 96) are rocked around the axial center line A3 at a certain frequency or cycle. This rocking operation may be attained by alternately repeating the voltage application across the comb electrodes 95 and 97 and the voltage application across the comb electrodes 96 and 98. In this embodiment, for example, the comb electrodes 95 and 96 are connected to the ground, and the potential application to the comb electrode 97 and the potential application to the comb electrode 98 are repeated alternately, thereby rocking the movable portions.

For example, in a state in which the movable portions are rocked or vibrated as described above, if an angular velocity or acceleration is exerted to the micro movable element X4 including the movable function portion 60, the movable function portion 60 is rotationally displaced around the axial center line A2 together with the comb electrodes 91 and 92.

As a result, the relative positions of the comb electrodes 91 and 93 are changed, and the electrostatic capacitance between the comb electrodes 91 and 93 is changed. In addition, the relative positions of the comb electrodes 92 and 94 are changed, and the electrostatic capacitance between the comb electrodes 92 and 94 is changed. The rotational displacement amount of the movable function portion 60 is detected on the basis of the change in electrostatic capacitance (for example, on the basis of the difference between the two electrostatic capacitances). On the basis of the result of the detection, it is possible to calculate the angular velocity or acceleration exerted to the micro movable element X4 including the movable function portion 60.

In the micro movable element X4, in the case that a potential difference is generated between the first conductor portion (the conductor portion 76a in the partly laminated structure portion illustrated in FIG. 27 or the conductor portion 76b in the partly laminated structure portion illustrated in FIG. 28) and the second conductor portion (the conductor portion 75a in the partly laminated structure portion illustrated in FIG. 27 or the conductor portion 75b in the partly laminated structure portion illustrated in FIG. 28), the insulating film 50 provided for the partly laminated structure portion contributes to suppress discharge between the edge portion of the first conductor portion (the edge portion E3 in the partly laminated structure portion illustrated in FIG. 27 or the edge portion E4 in the partly laminated structure portion illustrated in FIG. 28) and the second conductor portion and its extending face (the extending face S9 in the partly laminated structure portion illustrated in FIG. 27 or the extending face S12 in the partly laminated structure portion illustrated in FIG. 28). The insulating film 50 configured as described above suppresses the edge portion from being eluted by the heat generated at the time of discharge and from forming an electrically-conducting path for bridging the distance between the first and second conductor portions, thereby suppressing current from flowing through such an electrically-conducting path (current leakage) in the case that a potential difference is generated between the first and second conductor portions when the element is driven.

In addition, in the case that a potential difference is generated between the first and second conductor portions, the insulating film 50 of the micro movable element X4 suppresses a fraction of the first conductor portion from peeling off from the side face near the edge portion of the first conductor portion. The insulating film 50 configured as described above suppresses current leakage between the first and second conductor portions owing to the movement of the fraction or the bridging of the distance between the first and second conductor portions via the fraction.

Furthermore, in the micro movable element X4, the comb electrodes 91 to 98 for generating an electrostatic attractive force serving as a driving force are not covered with the insulating film. For this reason, the charging described with respect to the micro movable element Y does not occur in the micro movable element X4. In the micro movable element X4 configured as described above, a stable driving force may be easily generated using the comb electrodes 91 to 98 serving as driving electrodes. Hence, the micro movable element X4 is suited to accurately control the driving force.

As described above, the micro movable element X4 is suited to suppress current leakage from occurring and also suited to accurately control the driving force generated between the driving electrodes.

The micro movable elements X1 to X4 configured as described above may be adopted as micromirror elements for use in optical switching apparatuses.

Fifth Embodiment

Figure 29:
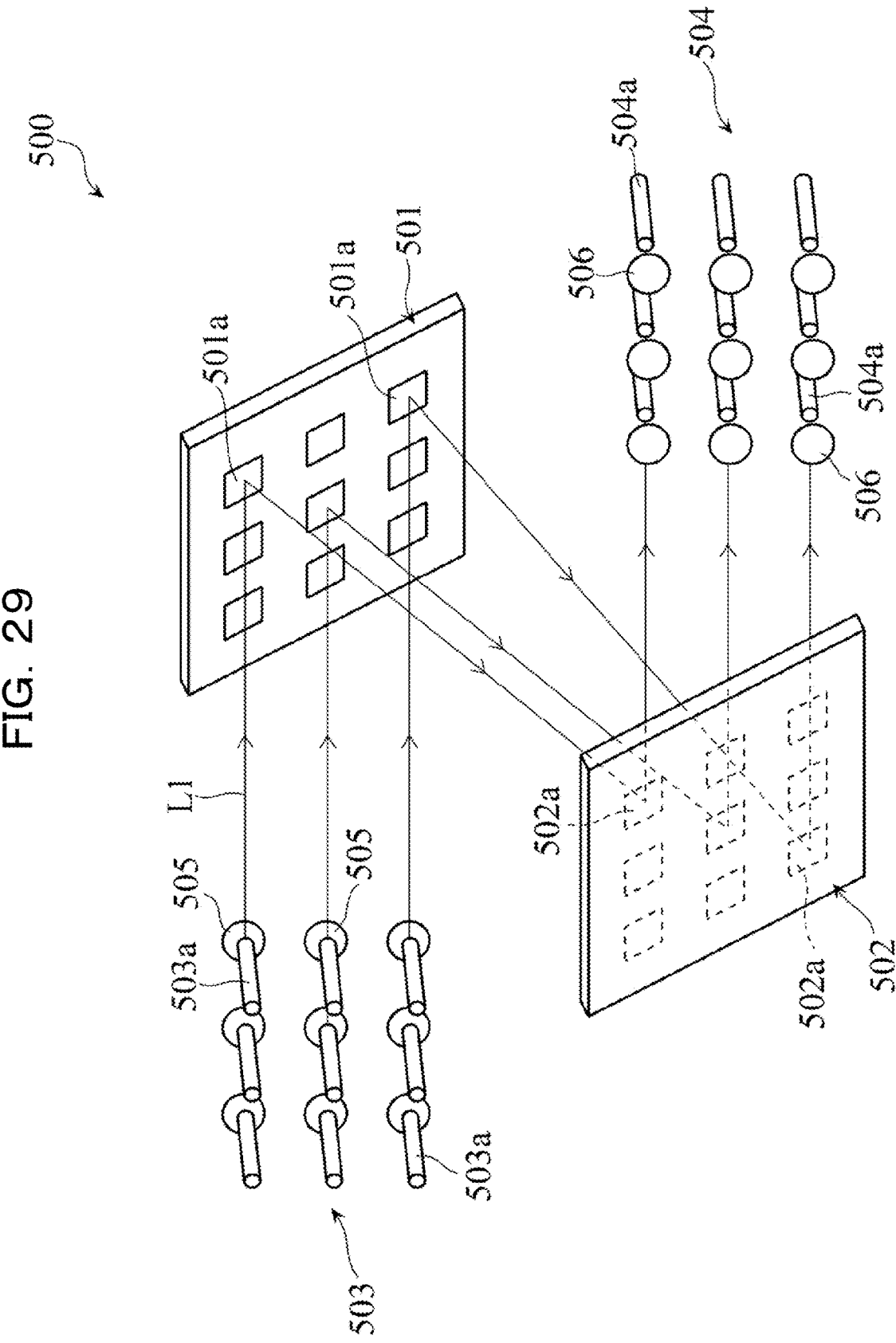
FIG. 29 illustrates a fifth embodiment.

FIG. 29 illustrates the schematic configuration of an optical switching apparatus 500 of a space optical coupling type according to a fifth embodiment. The optical switching apparatus 500 is equipped with a pair of micromirror array units 501 and 502, an input fiber array 503, an output fiber array 504 and multiple micro lenses 505 and 506. The input fiber array 503 is formed of a given number of input fibers 503a, and the micromirror array unit 501 is provided with multiple micromirror elements 501a respectively corresponding to the input fibers 503a. The output fiber array 504 is formed of a given number of output fibers 504a, and the micromirror array unit 502 is provided with multiple micromirror elements 502a respectively corresponding to the output fibers 504a. Each of the micromirror elements 501a and 502a has a mirror face for reflecting light, and the direction of the mirror face may be controlled. Each of micromirror elements 501a and 502a has the structure of either one of the above-mentioned micro movable elements X1 to X4. Each of the multiple micro lenses 505 is disposed so as to be opposed to the end portion of each of the input fibers 503a. Furthermore, each of the multiple micro lenses 506 is disposed so as to be opposed to the end portion of each of the output fibers 504a.

In the optical switching apparatus 500, the light beams L1 emitted from the input fibers 503a pass through the corresponding micro lenses 505, become mutually parallel and are directed to the micromirror array unit 501. The light beams L1 are reflected by the corresponding micromirror elements 501a and deflected toward the micromirror array unit 502. At this time, the mirror face of the micromirror element 501a is oriented in the direction in which the light beam L1 enters a desired micromirror element 502a. Next, the light beam L1 is reflected by the micromirror element 502a and deflected toward the output fiber array 504. At this time, the mirror face of the micromirror element 502a is oriented in the direction in which the light beam L1 enters a desired output fiber 504a.

In the optical switching apparatus 500, the light beam L1 emitted from each input fiber 503a is deflected by the micromirror array units 501 and 502 and reaches the desired output fiber 504a as described above. In other words, the input fibers 503a and the output fibers 504a are connected in a one-to-one relationship. The output fiber 504a to which the light beam L1 is transmitted is switched by changing the deflection angles of the micromirror elements 501a and 502a as necessary.

Large capacity, high speed, high reliability, etc. for switching operations are regarded as the characteristics required for an optical switching apparatus that is used to switch the transmission path of an optical signal transmitted via an optical fiber serving as a transmission medium from a fiber to another fiber. From these viewpoints, it is preferable to use a micromirror element produced using the micromachining technology as a switching element incorporated in the optical switching apparatus. The reason for this preference is that the micromirror element may perform switching so that an optical signal may be directly switched between the optical transmission path on the input side and the optical transmission path on the output side of an optical switching apparatus without converting the optical signal into an electrical signal, thereby being ideally suited to obtain the above-mentioned characteristics.

Sixth Embodiment

Figure 30:
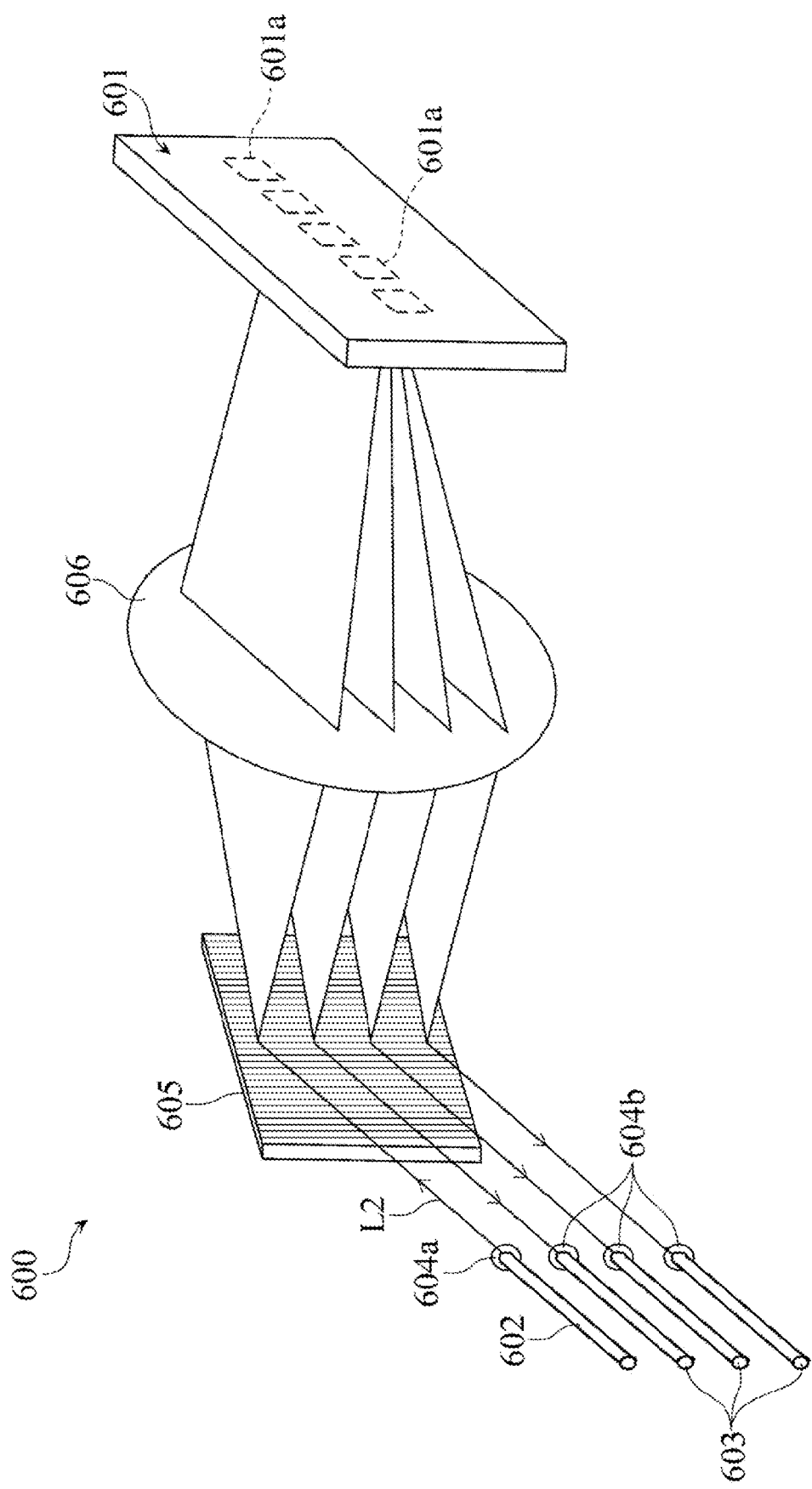
FIG. 30 illustrates a sixth embodiment.

FIG. 30 illustrates the schematic configuration of an optical switching apparatus 600 of a wavelength selection type according to a sixth embodiment. The optical switching apparatus 600 is equipped with a micromirror array unit 601, one input fiber 602, three output fibers 603, multiple micro lenses 604a and 604b, a spectrometer 605 and a condenser lens 606. The micromirror array unit 601 has multiple micromirror elements 601a, and the multiple micromirror elements 601a are disposed in a row on the micromirror array unit 601, for example. Each micromirror element 601a has a mirror face for light reflection, and the direction of the mirror face may be controlled. The micromirror element 601a has the structure of either one of the above-mentioned micro movable elements X1 to X4. The micro lens 604a is disposed so as to be opposed to the end portion of the input fiber 602. The micro lens 604b is disposed so as to be opposed to the end portion of the output fiber 603. The spectrometer 605 is a reflection diffraction grating in which the intensity of diffraction of the reflected light is different depending on the wavelength.

In the optical switching apparatus 600, the light beam L2 (having mixed multiple wavelengths) emitted from the input fiber 602 passes through the micro lens 604a and becomes parallel. The light beam L2 is reflected by the spectrometer 605 (at this time, reflected at different angles for respective wavelengths). The reflected light beam passes through the condenser lens 606. At that time, in the micromirror array unit 601, the light beam is condensed to the micromirror elements 601a corresponding to the wavelengths. The light beam having each wavelength is reflected by the corresponding micromirror element 601a. At this time, the mirror face of the micromirror element 601a is oriented in the direction in which the light beam having the corresponding wavelength is transmitted to a desired output fiber 603. The light beam reflected by the micromirror element 601a then enters the selected output fiber 603 via the condenser lens 606, the spectrometer 605 and the micro lens 604b. As a result, the light beam having the desired wavelength may be selected from the light beam L2 using the optical switching apparatus 600.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although the embodiments of the present invention have been described in detail, it should be understood that the various changes, substitutions, and alterations could be made hereto without departing from the spirit and scope of the invention.

What is claimed is:

1. A micro movable element comprising:
   a movable portion,
   a first driving electrode for driving said movable portion,
   a second driving electrode for driving said movable portion,
   a first conductor portion electrically connected to said first driving electrode,
   a second conductor portion electrically connected to said second driving electrode,
   an intermediate insulating portion disposed between said first conductor portion and said second conductor portion, and
   a partly laminated structure portion including said first conductor portion, said intermediate insulating portion and said second conductor portion, wherein
   said first conductor portion has an opposed face making contact with said intermediate insulating portion, a side face adjacent to said opposed face and an edge portion forming the boundary between said opposed face and said side face, at least part of said edge portion opposed to said second conductor portion is covered with an insulating film, and at least parts of said first and second driving electrodes are not covered with an insulating film.

2. The micro movable element according to claim 1, further comprising:
   a partly laminated structure portion including a third conductor portion electrically connected to said first driving electrode, a fourth conductor portion electrically connected to said second driving electrode, and an intermediate insulating portion disposed between said third and fourth conductor portions, wherein
   said fourth conductor portion has an opposed face opposed to said third conductor portion, a side face and an edge portion forming the boundary between said opposed face and said side face,
   said third conductor portion has an extending face extending beyond said edge portion of said fourth conductor portion, and
   at least part of said edge portion of said fourth conductor portion is covered with an insulating film.

3. The micro movable element according to claim 1, wherein said first and second driving electrodes are comb electrodes, each formed of multiple electrode teeth arranged in parallel.

4. The micro movable element according to claim 3, further comprising:
   a frame and a connection portion for connecting said frame to said movable portion and for determining the axial center line of the rotation operation of said movable portion, wherein
   said movable portion has an arm portion extending in a direction orthogonal to said axial center line, and
   said multiple electrode teeth of said first driving electrode extend from said arm portion while being spaced mutually in the extension direction of said arm portion, and some of said electrode teeth on the side of said axial center line among said multiple electrode teeth are covered with an insulating film.

5. The micro movable element according to claim 1, wherein said first and second driving electrodes are not covered with an insulating film.

6. The micro movable element according to claim 1, wherein said insulating film is a parylene film, a silicon oxide film or a silicon nitride film.

7. The micro movable element according to claim 1, configured as a micromirror element, an acceleration sensor or an angular velocity sensor.

8. An optical switching apparatus equipped with said micro movable element according to claim 1 configured as a micromirror element.

9. A micro movable element producing method comprising:
   an insulating film forming step of forming an insulating film on the surface of a micro movable element including:
   a movable portion,
   a first driving electrode for driving said movable portion,
   a second driving electrode for driving said movable portion,
   a first conductor portion electrically connected to said first driving electrode,
   a second conductor portion electrically connected to said second driving electrode, an intermediate insulating portion disposed between said first conductor portion and said second conductor portion, and a partly laminated structure portion including said first conductor portion, said intermediate insulating portion and said second conductor portion, said first conductor portion having an opposed face making contact with said intermediate insulating portion, a side face adjacent to said opposed face and an edge portion forming the boundary between said opposed face and said side face, and said second conductor portion having an extending face extending beyond said edge portion of said first conductor portion, and a removing step of removing said insulating film formed in said insulating film forming step from at least parts of said first and second driving electrodes, while said insulating film remains unremoved in at least part of said edge portion.

10. The micro movable element producing method according to claim 9, wherein said removing step comprises a first etching step for performing anisotropic dry etching for the material substrate of said micro movable element on the side of said first conductor layer and a second etching step for performing anisotropic dry etching for said material substrate on the side of said second conductor layer.

11. The micro movable element producing method according to claim 10, wherein the etching conditions at said first etching step are different from the etching conditions at said second etching step.

12. The micro movable element producing method according to claim 9, wherein a laser beam is irradiated to sites from which said insulating film covering said first and second driving electrodes is desired to be removed.

13. The micro movable element producing method according to claim 12, wherein the irradiation direction of said laser beam is inclined with respect to the thickness direction of said material substrate.

* * * * *